United States Patent
Okazaki

(10) Patent No.: US 9,560,042 B2
(45) Date of Patent: Jan. 31, 2017

(54) INFORMATION PROCESSING APPARATUS AND CONTROL METHOD

(71) Applicant: FUJITSU LIMITED, Kawasaki-shi, Kanagawa (JP)

(72) Inventor: Takeshi Okazaki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 386 days.

(21) Appl. No.: 14/215,236

(22) Filed: Mar. 17, 2014

(65) Prior Publication Data

US 2014/0201827 A1 Jul. 17, 2014

Related U.S. Application Data

(63) Continuation of application No. PCT/JP2011/072264, filed on Sep. 28, 2011.

(51) Int. Cl.
*G06F 21/00* (2013.01)
*H04L 29/06* (2006.01)
(Continued)

(52) U.S. Cl.
CPC .......... *H04L 63/0861* (2013.01); *G06F 1/169* (2013.01); *G06F 1/1616* (2013.01); *G06F 1/1684* (2013.01);
(Continued)

(58) Field of Classification Search
CPC ...... H04L 63/0861; G06F 21/83; G06F 3/017; G06F 1/169; G06F 3/04883; G06F 3/03547; G06F 21/81; G06F 21/32; G06F 1/1684; G06F 1/1616; G06F 2203/0338; G06F 1/26

See application file for complete search history.

(56) References Cited

U.S. PATENT DOCUMENTS 6,980,669 B1    12/2005   Uchida
9,141,150 B1*   9/2015   Trundle ................ G06F 1/1694
(Continued)

FOREIGN PATENT DOCUMENTS

JP     09-269907     10/1997
JP     2000-200113     7/2000
(Continued)

OTHER PUBLICATIONS

Notification of Transmittal of Translation of the International Preliminary Report on Patentability (Form PCT/IB/338, Form PCT/IB/373 & Form PCT/ISA/237), PCT/JP2011/072264, 6 pages, dated Apr. 10, 2014.
(Continued)

*Primary Examiner* — Jeffrey Pwu
*Assistant Examiner* — William Corum, Jr.
(74) *Attorney, Agent, or Firm* — Fujitsu Patent Center

(57) ABSTRACT

An information processing apparatus includes, a processor configured to execute a process including, determining whether a relationship between biometric information acquired from a living body and biometric information stored in a storage unit satisfies a predetermined standard, creating first authentication information by detecting predetermined operation when the relationship between the biometric information acquired from the living body and the biometric information stored in the storage unit does not satisfy the predetermined standard, comparing the first authentication information and second authentication information stored in the storage unit, and activating the information processing apparatus when the first authentication information and the second authentication information match.

3 Claims, 39 Drawing Sheets

(51) Int. Cl.
    *G06F 1/16*     (2006.01)
    *G06F 21/32*     (2013.01)
    *G06F 21/81*     (2013.01)
    *G06F 3/01*     (2006.01)
    *G06F 3/0488*     (2013.01)
    *G06F 3/0354*     (2013.01)
    *G06F 21/83*     (2013.01)
    *G06F 1/26*     (2006.01)

(52) U.S. Cl.
    CPC ........... *G06F 3/017* (2013.01); *G06F 3/03547* (2013.01); *G06F 3/04883* (2013.01); *G06F 21/32* (2013.01); *G06F 21/81* (2013.01); *G06F 21/83* (2013.01); *G06F 1/26* (2013.01); *G06F 2203/0338* (2013.01)

(56) References Cited

U.S. PATENT DOCUMENTS

| | | | |
|---|---|---|---|
| 2010/0162386 A1* | 6/2010 | Li et al. | 726/19 |
| 2010/0180127 A1* | 7/2010 | Li et al. | 713/186 |
| 2012/0030755 A1* | 2/2012 | Hatano | 726/19 |
| 2012/0164978 A1* | 6/2012 | Conti | G06F 21/32 455/411 |
| 2012/0196573 A1* | 8/2012 | Sugiyama | 455/411 |
| 2012/0201431 A1* | 8/2012 | Komura | G06K 9/00006 382/115 |
| 2013/0132856 A1* | 5/2013 | Binyamin et al. | 715/740 |
| 2014/0162598 A1* | 6/2014 | Villa-Real | 455/411 |

FOREIGN PATENT DOCUMENTS

| | | |
|---|---|---|
| JP | 2001-092554 | 4/2001 |
| JP | 2001-167053 | 6/2001 |
| JP | 2002-222022 | 8/2002 |
| JP | 2004-284424 | 10/2004 |
| JP | 2006-301785 | 11/2006 |
| JP | 2007-304646 | 11/2007 |
| JP | 2009-015377 | 1/2009 |
| JP | 2009-175859 | 8/2009 |
| JP | 2009-178474 | 8/2009 |
| WO | 2011/043422 | 4/2011 |

OTHER PUBLICATIONS

International Search Report, mailed in connection with PCT/JP2011/072264 and mailed Oct. 25, 2011.

JPOA—The Notice of Reason for Rejection of Japanese Patent Application 2013-535723 dated Feb. 3, 2015, with English translation of the relevant part, p. 1, line 15 to p. 3 of the Office Action.

* cited by examiner

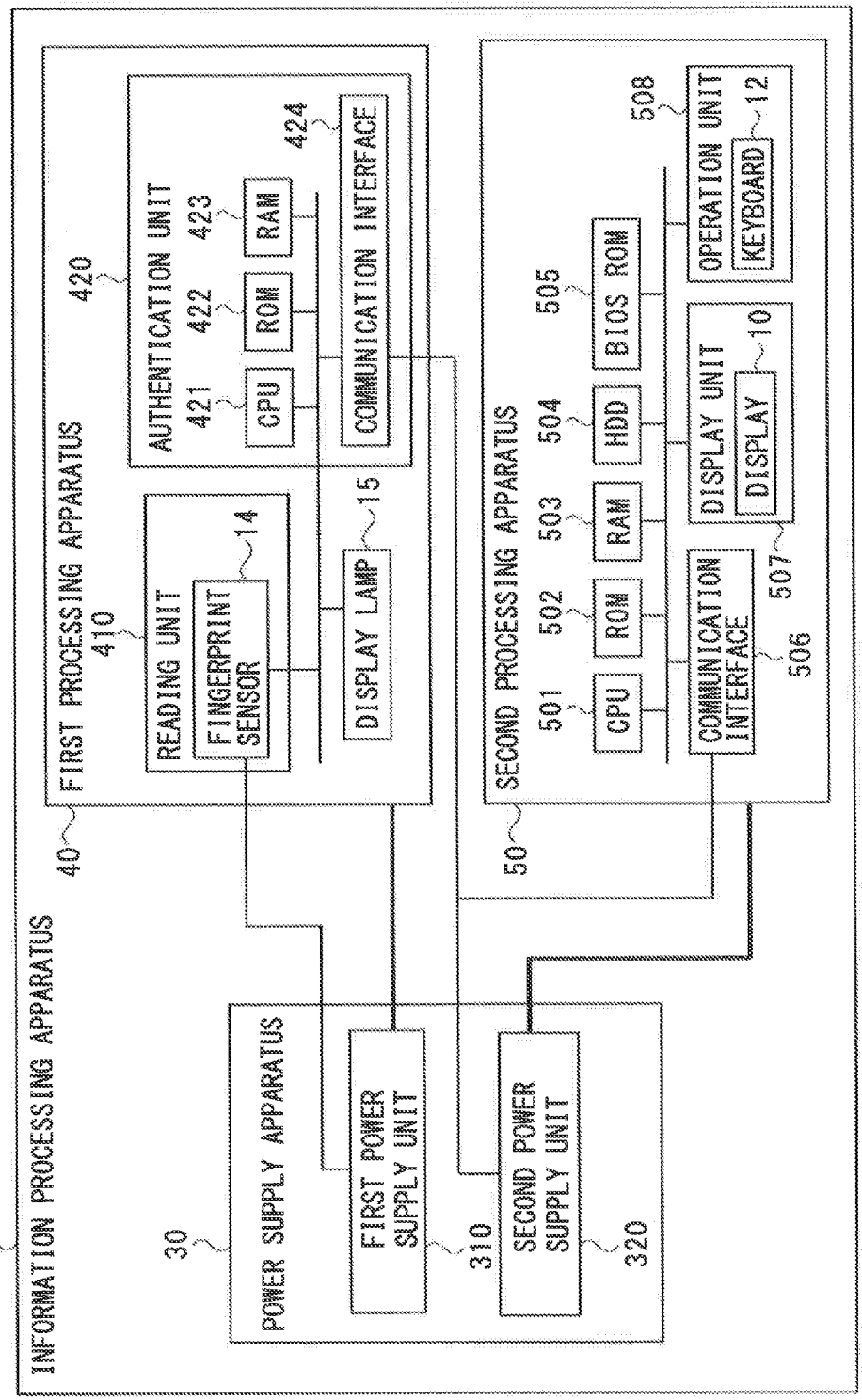

FIG. 10

| SCROLLING OPERATION (1) | TAPPING OPERATION (1) | SCROLLING OPERATION (2) | TAPPING OPERATION (2) | SCROLLING OPERATION (3) | TAPPING OPERATION (3) | SCROLLING OPERATION (4) | TAPPING OPERATION (4) | AUTHENTICATION INFORMATION |
|---|---|---|---|---|---|---|---|---|
| 1 | A | 2 | B | 3 | A | 4 | B | 1A2B3A4B |

| 71 | 90 | 91 | 92 | 93 | 94 | 95 | 96 | 97 | 98 |
|---|---|---|---|---|---|---|---|---|---|
| 0 | ○ | × | × | × | × | × | × | × | × |
| 1 | × | × | × | × | × | × | × | × | × |
| 2 | × | × | × | × | × | × | × | × | × |
| 3 | × | ○ | × | × | × | × | × | × | × |
| 4 | × | × | × | × | × | × | × | × | × |

FIG. 14B

| 71 | 90 | 91 | 92 | 93 | 94 | 95 | 96 | 97 | 98 |
|---|---|---|---|---|---|---|---|---|---|
| 0 | ○ | × | × | × | × | × | × | × | × |
| 1 | × | × | × | × | × | × | × | × | × |
| 2 | × | × | × | × | × | × | × | × | × |
| 3 | × | × | × | × | × | × | × | × | × |
| 4 | × | × | ○ | × | × | × | × | × | × |

FIG. 14C

| 71 | | 90 | 91 | 92 | 93 | 94 | 95 | 96 | 97 | 98 |
|---|---|---|---|---|---|---|---|---|---|---|
| 0 | | ○ | × | × | × | × | × | × | × | × |
| 1 | | × | × | × | × | × | × | × | × | × |
| 2 | | × | × | × | × | × | × | × | × | × |
| 3 | | × | ○ | ○ | × | × | × | × | × | × |
| 4 | | × | × | × | × | × | × | × | × | × |

FIG. 14D

| 71 | | 90 | 91 | 92 | 93 | 94 | 95 | 96 | 97 | 98 |
|---|---|---|---|---|---|---|---|---|---|---|
| 0 | | ○ | × | × | × | × | × | × | × | × |
| 1 | | × | × | × | × | × | × | × | × | × |
| 2 | | × | × | × | × | × | × | × | × | × |
| 3 | | × | × | × | × | × | × | × | × | × |
| 4 | | × | × | × | × | × | × | × | × | × |

FIG. 15

| IDENTIFICATION CODE | KEY INFORMATION | BIOMETRIC FEATURE DATA |
|---|---|---|
| 01 | 1B2A5B3A | A |
| 02 | 1B2A5B3B | B |
| 03 | 3B7B4A8A | C |
| 04 | 3B7B4A8B | D |

FIG. 16

| IDENTIFICATION CODE | ID | PASSWORD |
|---|---|---|
| 01 | TANAKA | 12345678 |
| 02 | TANAKA | 12345679 |
| 03 | SATO | 11111111 |
| 04 | SATO | 11111110 |

FIG. 17

| IDENTIFICATION CODE | PASSWORD |
|---|---|
| 01 | 87654321 |
| 02 | |
| 03 | |
| 04 | |

79

| FIRST TIME | SECOND TIME | THIRD TIME | AVERAGE VALUE | DETERMINATION |
|---|---|---|---|---|
| 0.9 | 0.5 | 0.7 | 0.7 | OK |
| 0.6 | 0.6 | 0.8 | 0.67 | NG |

FIG. 32
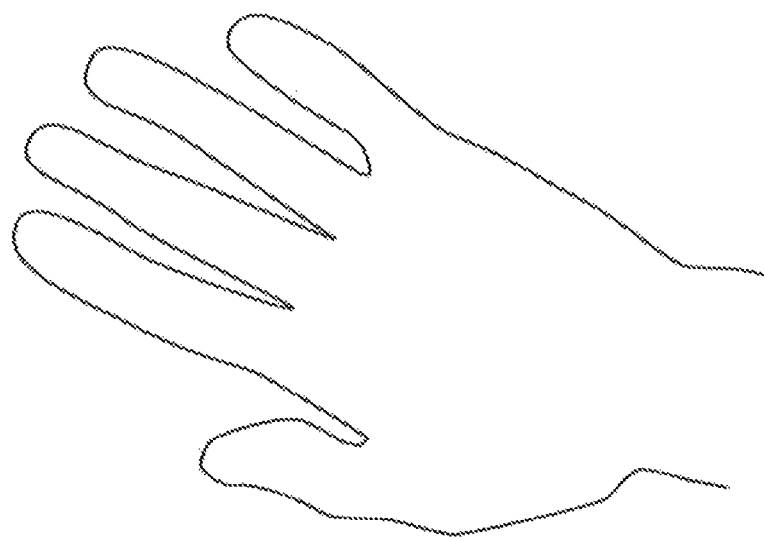
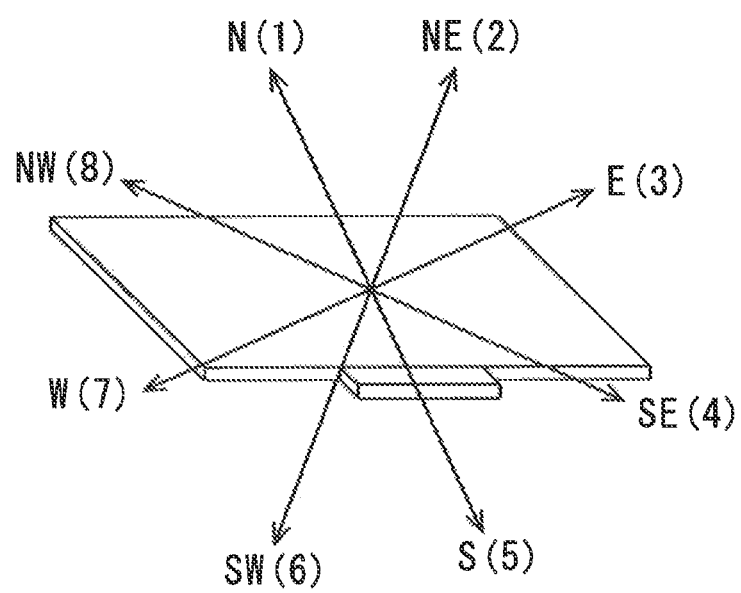

INFORMATION PROCESSING APPARATUS AND CONTROL METHOD

CROSS-REFERENCE TO RELATED APPLICATION

This application is a continuation application of International Application PCT/JP2011/072264 filed on Sep. 28, 2011 and designated the U.S., the entire contents of which are incorporated herein by reference.

FIELD

The embodiments herein relate to an information processing apparatus, a control method, and a program.

BACKGROUND

In recent years, more safe security systems are investigated in a wide range of fields, from crime prevention measures of general houses to personal information protection, theft prevention of vehicles, and broadly, world-scale measures. Therefore, biometrics (living body) authentication that can use biometric features of persons to identify individuals is drawing attention as means for personal authentication.

A method is known in which supply of power to a fingerprint detection circuit is started when a power supply switch is turned on, and supply of main power to the entire information processing apparatus is started if the person is recognized as the owner by matching of fingerprint patterns as a result of fingerprint verification by a fingerprint verification unit.

[Patent document 1] Japanese Laid-open Patent Publication No. 2001-92554
[Patent document 2] Japanese Laid-open Patent Publication No. 2009-15377
[Patent document 3] Japanese Laid-open Patent Publication No. 2006-301785
[Patent document 4] Japanese Laid-open Patent Publication No. 2000-200113
[Patent document 5] Japanese Laid-open Patent Publication No. 2007-304646
[Patent document 6] Japanese Laid-open Patent Publication No. 2002-222022

SUMMARY

According to an aspect of the embodiments, an information processing apparatus includes: a processor configured to execute a process including: determining whether a relationship between biometric information acquired from a living body and biometric information stored in a storage unit satisfies a predetermined standard; creating first authentication information by detecting predetermined operation when the relationship between the biometric information acquired from the living body and the biometric information stored in the storage unit does not satisfy the predetermined standard; comparing the first authentication information and second authentication information stored in the storage unit; and activating the information processing apparatus when the first authentication information and the second authentication information match, wherein the predetermined operation includes tapping operation, in which the living body moves from a first area to a second area different from the first area, and then the living body moves from the second area to the first area, and scrolling operation, in which the living body moves in a predetermined direction from the first area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2 is a diagram illustrating a configuration example of the information processing apparatus 1 according to the first embodiment.

FIG. 10 is a diagram illustrating an example of a key creation table 70.

FIG. 14A is a diagram illustrating an example of a direction determination table 71.

FIG. 14B is a diagram illustrating an example of the direction determination table 71.

FIG. 14C is a diagram illustrating an example of the direction determination table 71.

FIG. 14D is a diagram illustrating an example of the direction determination table 71.

FIG. 15 is a diagram illustrating an example of a biometric information feature database 68 stored in the ROM 422.

FIG. 16 is a diagram illustrating an example of the first password database 78 stored in the HDD 504.

FIG. 17 is a diagram illustrating an example of the second password database 79 stored in the BIOS ROM 505.

FIG. 32 is an explanatory view of scrolling operation.

DESCRIPTION OF EMBODIMENTS

There is a problem that the information processing apparatus is not activated if the person is not recognized as the owner of the information processing apparatus by biometric authentication such as fingerprint verification. Hereinafter, an information processing apparatus according to embodiments will be described with reference to the drawings. Configurations of the following embodiments are illustrative, and the present information processing apparatus is not limited to the configurations of the embodiments.

First Embodiment

Figure 1:
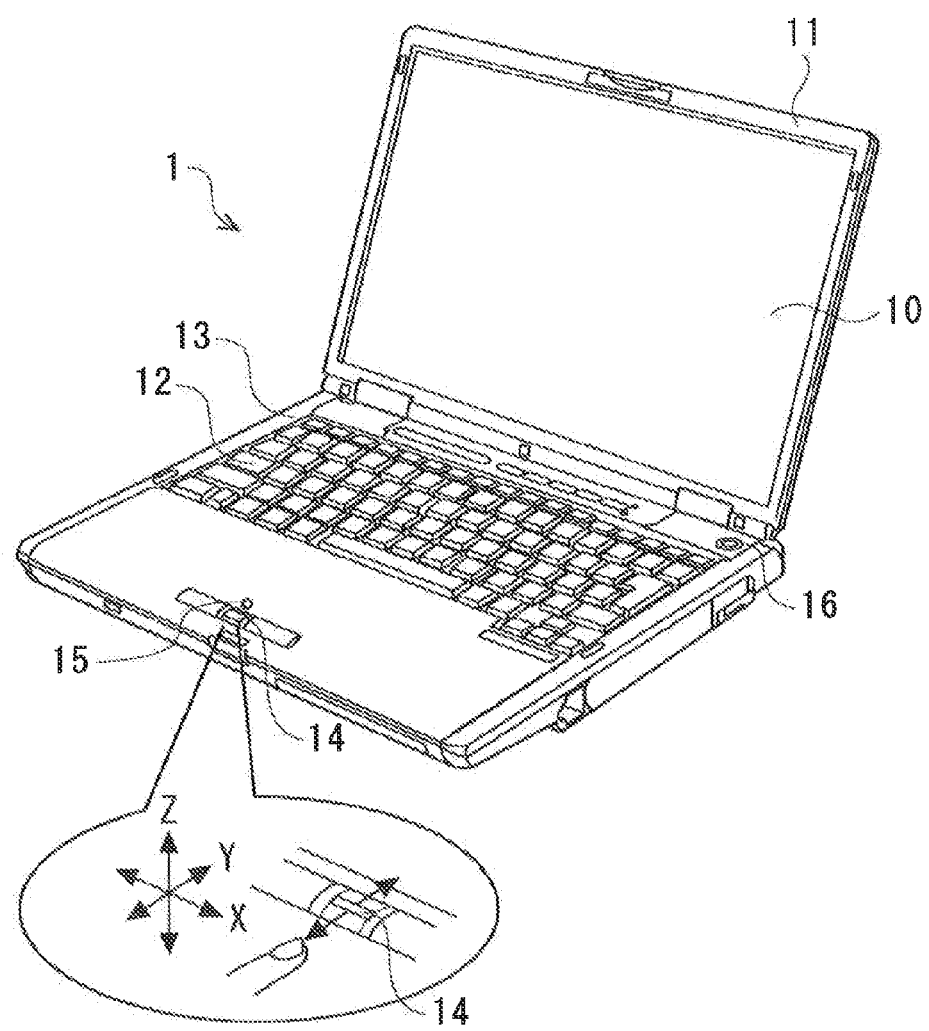
FIG. 1 is an external view of an information processing apparatus 1 according to a first embodiment.

Hereinafter, an information processing apparatus 1 according to a first embodiment will be described with reference to FIGS. 1 to 18. FIG. 1 is an external view of the information processing apparatus 1 according to the first embodiment. Although the information processing apparatus 1 is, for example, a notebook personal computer, the information processing apparatus 1 is not limited to the notebook personal computer, and the information processing apparatus 1 may be a laptop personal computer, a PDA (Personal Digital Assistance), a smartphone, a tablet terminal, a mobile phone, an electronic book, or the like.

As illustrated in FIG. 1, the information processing apparatus 1 includes a display 10, a display housing 11, a keyboard 12, a keyboard housing 13, a fingerprint sensor 14, a display lamp 15, and a power supply button 16.

The display 10 is, for example, an LCD (Liquid Crystal Display) panel, a plasma display panel, an electroluminescence panel, or the like. The display lamp 15 is, for example, an LED (Light Emitting Diode). The fingerprint sensor 14 is an apparatus that reads a fingerprint of a user to convert the read fingerprint to image data. A detection system, such as a capacitance system, an optical system, an electrolytic system, and a heat-sensitive system, may be adopted for the fingerprint sensor 14. A fingerprint reading system of the fingerprint sensor 14 may be a slide type (sweep type) or a surface type (non-sweep type).

When a fingertip (pad of first joint of finger) touches a surface of the fingerprint sensor 14, the fingerprint sensor 14 detects a living body. For example, if the fingerprint sensor 14 is a capacitance system, an electrode is embedded on the surface of the fingerprint sensor 14. When the fingertip touches the surface of the fingerprint sensor 14, charge according to the distance between the fingertip and the electrode is accumulated on the electrode, and the fingerprint sensor 14 detects the living body. The fingerprint sensor 14 is an example of a detection unit.

When the fingertip is moved in a direction Y orthogonal to a longitudinal direction X of the fingerprint sensor 14 in a state that the fingertip is in contact with the surface of the fingerprint sensor 14, the fingerprint sensor 14 reads the fingerprint. In a case of the fingerprint sensor 14 of a slide type, the fingerprint sensor 14 has a strip shape. The fingerprint sensor 14 reads an image of a finger moving on the surface of the fingerprint sensor 14 as a plurality of strip-shaped fingerprint images. The plurality of read strip-shaped fingerprint images are reconstructed to form a fingerprint image of the entire fingerprint.

A feature point of biometric information is extracted from the fingerprint image read by the fingerprint sensor 14, and the extracted feature point of the biometric information and a registered feature point of biometric information are verified. If the extracted feature point of the biometric information and the registered feature point of the biometric information satisfy a predetermined standard, the biometric authentication (user authentication) is OK (successful). More specifically, the user who has touched the fingerprint sensor 14 is authenticated as an owner of the information processing apparatus 1 or as a person permitted by the owner to use the information processing apparatus 1 (hereinafter, described as owner or the like of the information processing apparatus 1). When the biometric authentication is OK, the display lamp 15 lights a green color as a display indicating that the biometric authentication is OK.

If the biometric authentication is OK, emulation of pressing operation of the power supply button 16 is automatically performed. More specifically, the information processing apparatus 1 executes a process similar to when the power supply button 16 is pressed in a state that the power supply of the information processing apparatus 1 is OFF or in a state that the information processing apparatus 1 is resting or standby. For example, in the state that the power supply of the information processing apparatus 1 is OFF, the power supply is supplied to each unit of the information processing apparatus 1, and the information processing apparatus 1 enters an activation state (a startup status). If a BIOS (Basic Input Output System) password or an OS (Operating System) log-on password is to be input at the activation, a password associated with the fingerprint information is read by a single sign-on (SSO) process. A BIOS activation screen or a desktop screen is displayed on the display 10, and the information processing apparatus 1 enters the activation state.

If the extracted feature point of the biometric information and the registered feature point of the biometric information do not satisfy the predetermined standard, the biometric authentication is NG. When the biometric authentication is NG, the display lamp 15 lights a red color as a display indicating that the biometric authentication is NG. When the biometric authentication is NG, the fingerprint sensor 14 is switched to a mode that can detect tapping operation and scrolling operation. The display lamp 15 lights a blue color as a display indicating that the fingerprint sensor 14 is switched to the mode that can detect the tapping operation and the scrolling operation. The user acknowledges that the display lamp 15 is lighting the blue color.

The user performs the tapping operation by bringing the fingertip into contact with the surface of the fingerprint sensor 14 and then separating the fingertip from the surface of the fingerprint sensor 14. Furthermore, the user performs the scrolling operation by bringing the fingertip into contact with the surface of the fingerprint sensor 14 and then moving the fingertip in a predetermined direction in a state that the fingertip is in contact with the surface of the fingerprint sensor 14.

If the tapping operation and the scrolling operation performed by the user match with registered tapping operation and scrolling operation, emulation of pressing operation of the power supply button 16 is automatically performed. More specifically, the information processing apparatus 1 executes a process similar to when the power supply button 16 is pressed in a state that the power supply of the information processing apparatus 1 is OFF or in a state that the information processing apparatus 1 is resting or standby, and the information processing apparatus 1 is activated. If a BIOS password or an OS long-on password is to be input at the activation, the information processing apparatus 1 executes a process similar to when the biometric authentication is OK. Pre-registration of the tapping operation and the scrolling operation is performed in a state that the information processing apparatus 1 is activated. If the tapping operation and the scrolling operation performed by the user do not match with the registered tapping operation and scrolling operation, the user performs the tapping operation and the scrolling operation again.

FIG. 2 is a diagram illustrating a configuration example of the information processing apparatus 1 according to the first embodiment. As illustrated in FIG. 2, the information processing apparatus 1 includes a power supply apparatus 30, a first processing apparatus 40, and a second processing apparatus 50.

The power supply apparatus 30 includes a first power supply unit 310 and a second power supply unit 320. The power supply apparatus 30 may be attained by a power circuit component such as a power microcomputer and a power amplifier. The first power supply unit 310 supplies power to the first processing apparatus 40. The second power supply unit 320 supplies power to the second processing apparatus 50. The power may be supplied to the power supply apparatus 30 from the outside of the information processing apparatus 1, or a secondary battery may be separately arranged on the information processing apparatus 1 to supply power to the power supply apparatus 30 from the secondary battery.

The first processing apparatus 40 includes a reading unit 410, an authentication unit 420, and the display lamp 15. The reading unit 410 includes the fingerprint sensor 14. The authentication unit 420 includes a CPU (Central Processing Unit) 421, a ROM (Read Only Memory) 422, a RAM (Random Access Memory) 423, and a communication interface 424. The CPU 421, the ROM 422, the RAM 423, and the communication interface 424 are connected to each other through a bus.

Figure 3A:
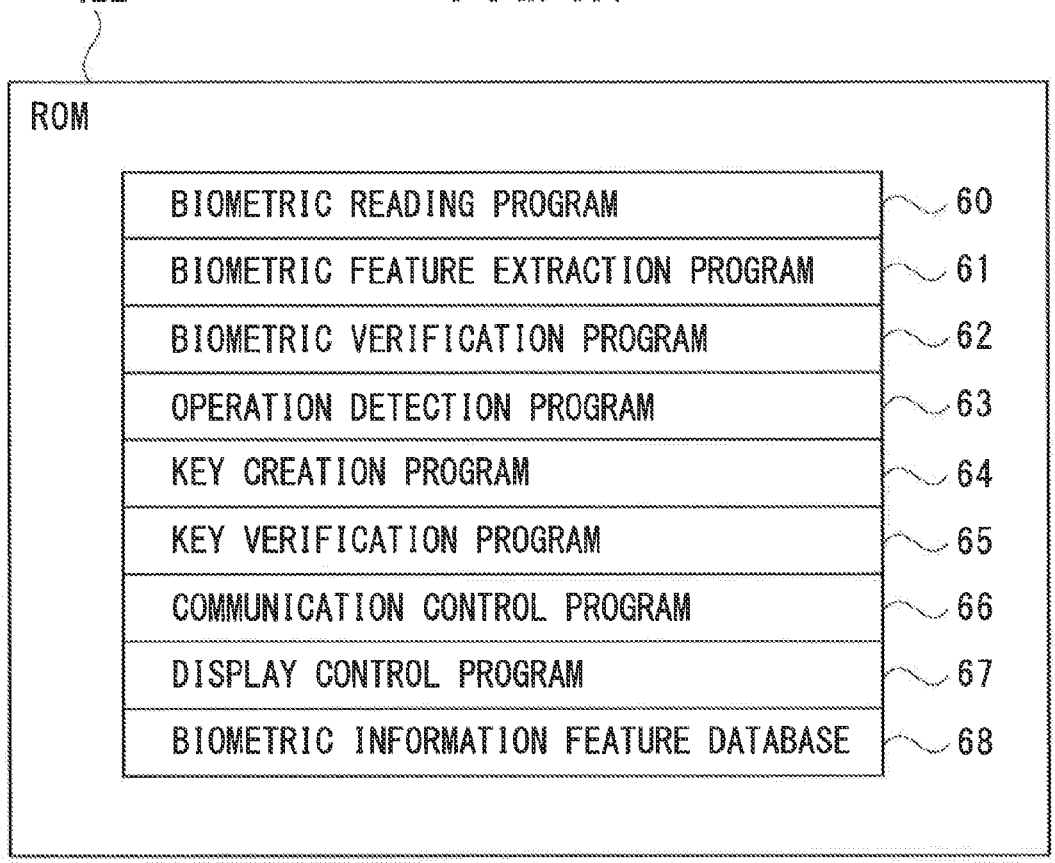
FIG. 3A is a diagram illustrating an example of programs and a database stored in a ROM 422.

The ROM 422 is a non-volatile memory and is rewritable. The ROM 422 is, for example, an EPROM (Erasable Programmable ROM). The ROM 422 stores various programs. FIG. 3A is a diagram illustrating an example of programs and a database stored in the ROM 422. As illustrated in FIG. 3A, the ROM 422 stores a biometric reading program 60, a biometric feature extraction program 61, a biometric verification program 62, an operation detection program 63, and a key creation program 64. Furthermore, as illustrated in FIG. 3A, the ROM 422 stores a key verification program 65, a communication control program 66, a display control program 67, and a biometric information feature database 68.

Figure 3B:
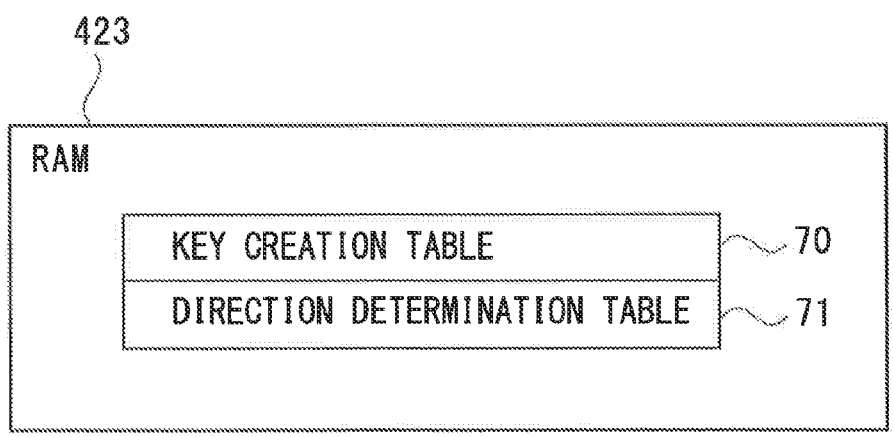
FIG. 3B is a diagram illustrating an example of tables created in a RAM 423.

The RAM 423 stores various tables. FIG. 3B is a diagram illustrating an example of the tables created (developed) in the RAM 423. As illustrated in FIG. 3B, a key creation table 70 and a direction determination table 71 are created in the RAM 423. The communication interface 424 is connected to the second power supply unit 320 of the power supply apparatus 30. The CPU 421, the ROM 422, and the RAM 423 may be attained by an integrated microcontroller.

The second processing apparatus 50 includes a CPU 501, a ROM 502, a RAM 503, a HDD (Hard Disk Drive) 504, a BIOS (Basic Input Output System) ROM 505, a communication interface 506, a display unit 507, and an operation unit 508. The CPU 501, the ROM 502, the RAM 503, the HDD 504, the BIOS ROM 505, the communication interface 506, the display unit 507, and the operation unit 508 are connected to each other through a bus. The BIOS ROM 505 is a ROM for BIOS and is rewritable.

Figure 4A:
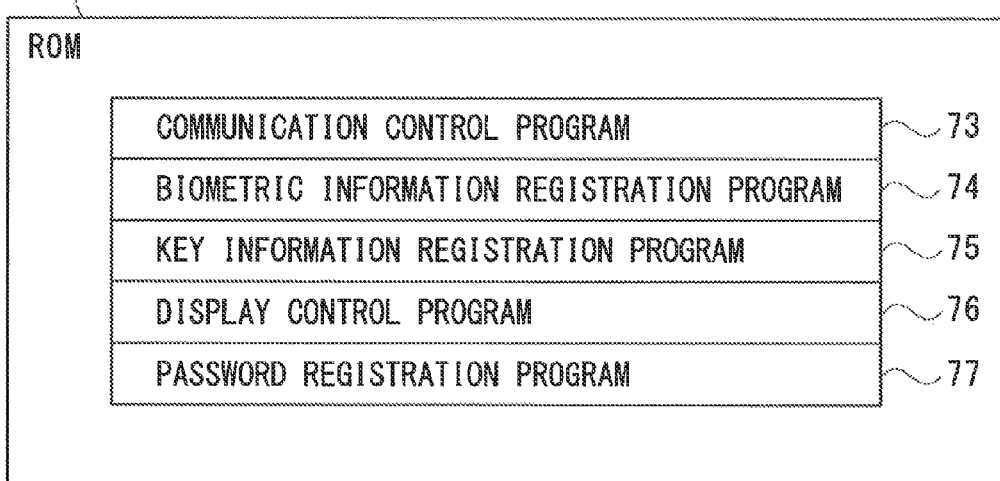
FIG. 4A is a diagram illustrating an example of programs stored in a ROM 502.
Figure 4B:
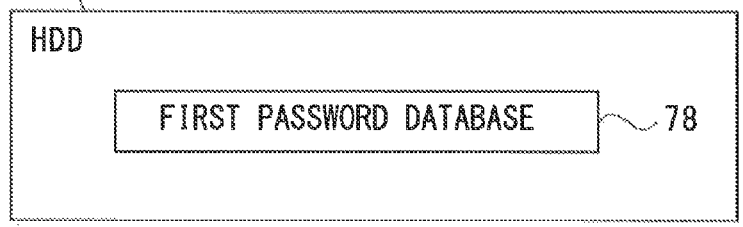
FIG. 4B is a diagram illustrating an example of a first password database 78 stored in a HDD 504.
Figure 4C:
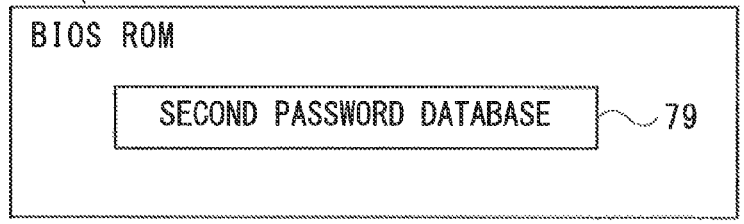
FIG. 4C is a diagram illustrating an example of a second password database 79 stored in a BIOS ROM 505.

The ROM 502 is a non-volatile memory and is rewritable. The ROM 502 is, for example, an EPROM. The ROM 502 stores various programs. FIG. 4A is a diagram illustrating an example of the programs stored in the ROM 502. As illustrated in FIG. 4A, the ROM 502 stores a communication control program 73, a biometric information registration program 74, a key information registration program 75, a display control program 76, and a password registration program 77. FIG. 4B is a diagram illustrating an example of a first password database 78 stored in the HDD 504. FIG. 4C is a diagram illustrating an example of a second password database 79 stored in the BIOS ROM 505.

The display unit 507 includes the display 10. The operation unit 508 includes the keyboard 12. Furthermore, the operation unit 508 may include a mouse, a pointing device, and the like. The first processing apparatus 40 is connected to the second processing apparatus 50 through the communication interface 424 in the authentication unit 420 and the communication interface 506 in the second processing apparatus 50. Furthermore, the first processing apparatus 40 is connected to the second power supply unit 320 in the power supply apparatus 30 through the communication interface 424 in the authentication unit 420.

<Functional Configuration Example of Information Processing Apparatus 1>

Figure 5:
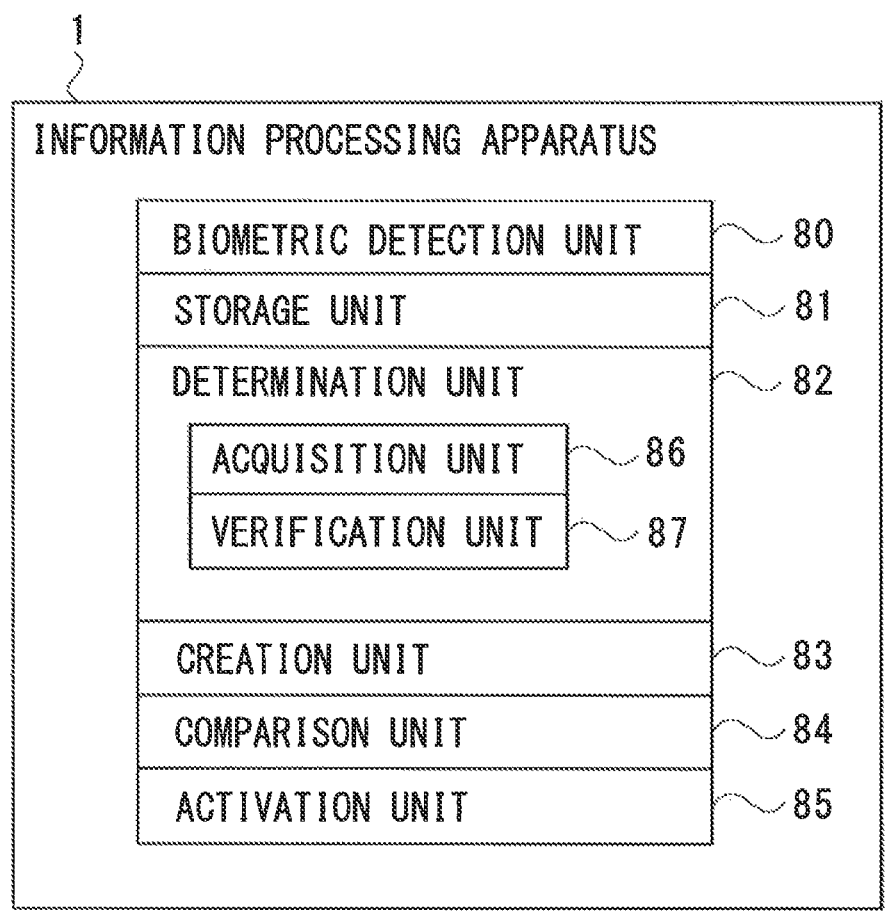
FIG. 5 is a diagram illustrating a functional configuration example of the information processing apparatus 1.

FIG. 5 is a diagram illustrating a functional configuration example of the information processing apparatus 1. The information processing apparatus 1 includes a biometric detection unit 80, a storage unit 81, a determination unit 82, a creation unit 83, a comparison unit 84, and an activation unit 85. The biometric detection unit 80, the determination unit 82, the creation unit 83, the comparison unit 84, and the activation unit 85 may be attained as hardware, may be attained as software, or may be attained by cooperation of hardware and software.

The biometric detection unit 80 detects a living body. The storage unit 81 stores biometric information, authentication information, and the like. The determination unit 82 determines whether the relationship between first biometric information and second biometric information satisfies a predetermined standard. The first biometric information is, for example, biometric information acquired from a living body. The second biometric information is, for example, biometric information stored in the storage unit 81. The determination unit 82 includes an acquisition unit 86 and a verification unit 87. The acquisition unit 86 acquires the biometric information from a living body. The verification unit 87 verifies the first biometric information and the second biometric information.

The determination unit 82 may determine that the relationship between the first biometric information and the second biometric information satisfies the predetermined standard if the first biometric information and the second biometric information match. The determination unit 82 may determine that the relationship between the first biometric information and the second biometric information satisfies the predetermined standard if the feature point of the first biometric information and the feature point of the second biometric information match. The determination unit 82 may determine that the relationship between the first biometric information and the second biometric information satisfies the predetermined standard if a relevance ratio (concordance rate) of the first biometric information and the second biometric information is equal to or greater than a predetermined value. The determination unit 82 may determine that the relationship between the first biometric information and the second biometric information satisfies the predetermined standard if a relevance ratio (concordance rate) of the feature point of the first biometric information and the feature point of the second biometric information is equal to or greater than a predetermined value.

The creation unit 83 creates authentication information by detecting predetermined operation. The predetermined operation is, for example, tapping operation and scrolling operation. The creation unit 83 may create the authentication information by detecting the predetermined operation if the relationship between the first biometric information and the second biometric information does not satisfy the predetermined standard. The comparison unit 84 compares first authentication information and second authentication information. The first authentication information is, for example, the authentication information created by the creation unit 83. The second authentication information is, for example, the authentication information stored in the storage unit 81.

The activation unit 85 activates the information processing apparatus 1 if the first authentication information and the second authentication information match. For example, the activation unit 85 activates the information processing apparatus 1 by executing a process similar to when the power supply button 16 of the information processing apparatus 1 is pressed in a state that the power supply of the information processing apparatus 1 is OFF or in a state that the information processing apparatus 1 is resting or standby.

<Authentication Process>

Figure 6:
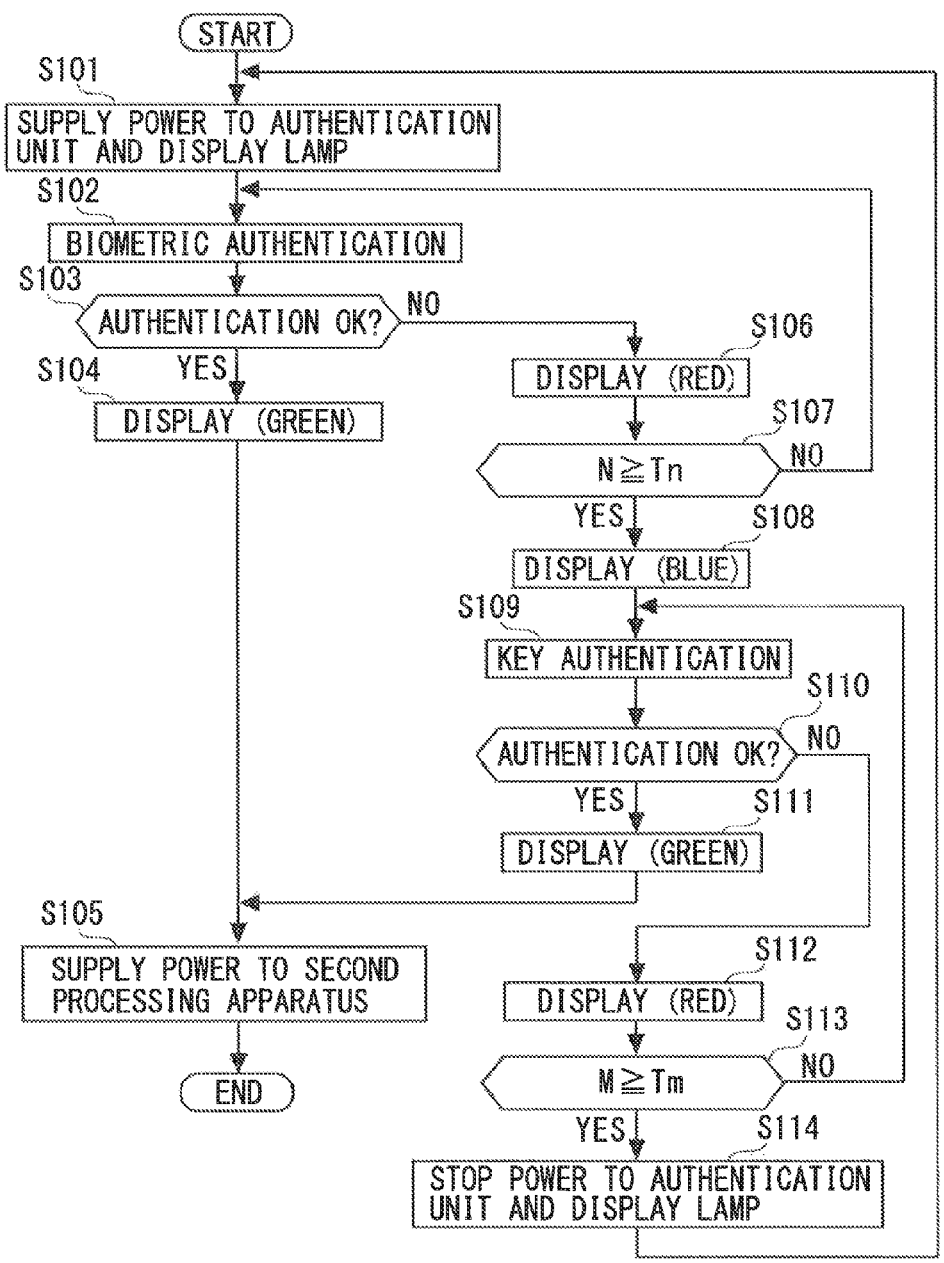
FIG. 6 is a diagram illustrating an example of an authentication processing flow (part 1) according to the first embodiment.

FIG. 6 is a diagram illustrating an example of an authentication processing flow (part 1) according to the first embodiment. In a state before execution of an authentication process by the information processing apparatus 1, power is supplied from the first power supply unit 310 to the reading unit 410, and power is not supplied to the display lamp 15, the authentication unit 420, and the second processing apparatus 50.

First, in S101 of FIG. 6, as the fingertip touches the fingerprint sensor 14, the fingerprint sensor 14 detects the living body, and power is supplied to the authentication unit 420 and the display lamp 15. The first power supply unit 310 supplies power to the reading unit 410, and when the fingerprint sensor 14 detects the living body, the fingerprint sensor 14 transmits a control signal to the first power supply unit 310. When the control signal is received from the fingerprint sensor 14, the first power supply unit 310 supplies power to the authentication unit 420 and the display lamp 15. Furthermore, the first power supply unit 310 may put the authentication unit 420 into a standby state or a resting state and switch the authentication unit 420 to an activation state when the fingerprint sensor 14 detects the living body.

In S102 of FIG. 6, the authentication unit 420 performs biometric authentication. An example of the biometric authentication by the authentication unit 420 will be illustrated below.

The authentication unit 420 controls the fingerprint sensor 14 to read a fingerprint. Specifically, the CPU 421 of the authentication unit 420 controls the fingerprint sensor 14 based on the biometric reading program 60 stored in the ROM 422. In a state that the fingertip is in contact with the surface of the fingerprint sensor 14, the fingertip is moved in the direction Y orthogonal to the longitudinal direction X of the fingerprint sensor 14, and the fingerprint sensor 14 reads the fingerprint. The authentication unit 420 stores a fingerprint image read by the fingerprint sensor 14 in the RAM 423. Specifically, the CPU 421 of the authentication unit 420 stores the fingerprint image read by the fingerprint sensor 14 in the RAM 423 based on the biometric reading program 60 stored in the ROM 422.

The authentication unit 420 extracts a feature point of the biometric information from the fingerprint image stored in the RAM 423. Specifically, the CPU 421 of the authentication unit 420 extracts the feature point of the biometric information from the fingerprint image stored in the RAM 423 based on the biometric feature extraction program 61 stored in the ROM 422. The feature point of the biometric information indicates a pattern of the fingerprint. The feature point of the biometric information is, for example, a center point indicating the center of the pattern of the fingerprint, a branch point indicating branching of the pattern of a convex portion of the fingerprint, an end point indicating the end of the pattern of the convex portion of the fingerprint, a delta indicating gathering of the pattern of the convex portion of the fingerprint from three directions, or the like.

The authentication unit 420 verifies the extracted feature point of the biometric information and the registered feature point of the biometric information. Specifically, the CPU 421 of the authentication unit 420 verifies the extracted feature point of the biometric information and the registered feature point of the biometric information based on the biometric verification program 62 stored in the ROM 422. The registered feature point of the biometric information is registered in advance in the biometric information feature database 68 stored in the ROM 422.

In S103 of FIG. 6, the authentication unit 420 determines whether the biometric authentication is OK. More specifically, the authentication unit 420 determines whether the extracted feature point of the biometric information and the registered feature point of the biometric information match. If the extracted feature point of the biometric information and the registered feature point of the biometric information match, the authentication unit 420 determines that the biometric authentication is OK. On the other hand, if the extracted feature point of the biometric information and the registered feature point of the biometric information do not match, the authentication unit 420 determines that the biometric authentication is NG.

If the biometric authentication is OK (S103: YES), the process proceeds to S104 of FIG. 6. In S104 of FIG. 6, the display lamp 15 lights the green color as a display indicating that the biometric authentication is OK. The CPU 421 of the authentication unit 420 controls the display lamp 15 based on the display control program 67 stored in the ROM 422.

In S105 of FIG. 6, emulation of pressing operation of the power supply button 16 is automatically performed. For example, the authentication unit 420 transmits a control signal to the second power supply unit 320 through the communication interface 424 based on the communication control program 66 stored in the ROM 422. The power supply unit 320 that has received the control signal supplies power to the second processing apparatus 50. As the power is supplied from the power supply unit 320 to the second processing apparatus 50, the second processing apparatus 50 enters the activation state. As the second processing apparatus enters 50 the activation state, the information processing apparatus 1 is activated.

When the process of S105 of FIG. 6 is executed, the authentication processing flow (part 1) according to the first embodiment ends. On the other hand, if the biometric authentication is NG (S103: NO), the process proceeds to S106 of FIG. 6. In S106 of FIG. 6, the display lamp 15 lights the red color as a display indicating that the biometric authentication is NG. In S107 of FIG. 6, the authentication unit 420 determines whether the number of times (N) of NG of the biometric authentication is equal to or greater than a predetermined number of times (Tn).

If the number of times (N) of NG of the biometric authentication is equal to or greater than the predetermined number of times (Tn) (S107: YES), the process proceeds to S108 of FIG. 6. On the other hand, if the number of times (N) of NG of the biometric authentication is smaller than the predetermined number of times (Tn) (S107: NO), the process proceeds to S102 of FIG. 6, and the authentication unit 420 performs the biometric authentication again.

In S108 of FIG. 6, the authentication unit 420 switches the fingerprint sensor 14 to a mode that can detect tapping operation and scrolling operation. Furthermore, in S108 of FIG. 6, the display lamp 15 lights the blue color as a display indicating that the fingerprint sensor 14 is switched to the mode that can detect tapping operation and scrolling operation.

In S109 of FIG. 6, the authentication unit 420 performs key authentication. Specifically, the authentication unit 420 accepts the tapping operation and the scrolling operation to create authentication information (key information). The authentication unit 420 compares the created authentication information and registered authentication information. Details of the creation of the authentication information by the authentication unit 420 will be described later.

In S110 of FIG. 6, the authentication unit 420 determines whether the key authentication is OK. More specifically, the authentication unit 420 determines whether the created authentication information and the registered authentication information match. The CPU 421 of the authentication unit 420 determines whether the created authentication information and the registered authentication information match based on the key verification program 65 stored in the ROM 422. If the created authentication information and the registered authentication information match, the authentication unit 420 determines that the key authentication is OK. On the other hand, if the created authentication information and the registered authentication information do not match, the authentication unit 420 determines that the key authentication is NG.

If the key authentication is OK (S110: YES), the process proceeds to S111 of FIG. 6. In S111 of FIG. 6, the display lamp 15 lights the green color as a display indicating that the key authentication is OK. After the process of S111 of FIG. 6 is executed, the process proceeds to S105 of FIG. 6.

On the other hand, if the key authentication is NG (S110: NO), the process proceeds to S112 of FIG. 6. In S112 of FIG. 6, the display lamp 15 lights the red color as a display indicating that the key authentication is NG. After the process of S112 of FIG. 6 is executed, the process proceeds to S113 of FIG. 6.

In S113 of FIG. 6, the authentication unit 420 determines whether the number of times (M) of NG of the key authentication is equal to or greater than a predetermined number of times (Tm). If the number of times (M) of NG of the key authentication is equal to or greater than the predetermined number of times (Tm) (S113: YES), the process proceeds to S114 of FIG. 6. On the other hand, if the number of times (M) of NG of the key authentication is smaller than the predetermined number of times (Tm) (S113: NO), the process proceeds to S109 of FIG. 6, and the authentication unit 420 performs the key authentication again.

In S114 of FIG. 6, the supply of power to the authentication unit 420 and the display lamp 15 is terminated, and the display lamp 15 is turned off. Specifically, the authentication unit 420 transmits a control signal to the first power supply unit 310. When the control signal is received from the authentication unit 420, the first power supply unit 310 terminates the supply of power to the authentication unit 420 and the display lamp 15 and turns off the power supply of the authentication unit 420. Furthermore, when the control signal is received from the authentication unit 420, the first power supply unit 310 may switch the authentication unit 420 to the standby state or the resting state. After the process of S114 of FIG. 6 is executed, the process proceeds to S101 of FIG. 6.

<Creation Process of Authentication Information (Key Information)>

Figure 7:
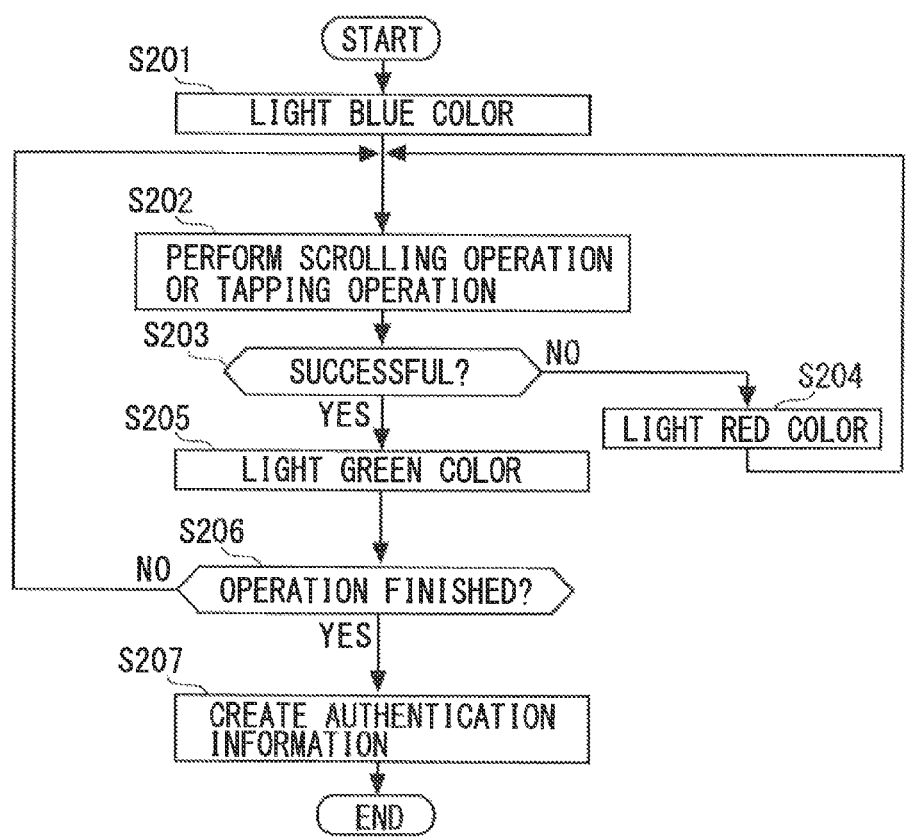
FIG. 7 is a diagram illustrating an example of a creation processing flow of authentication information.

A creation process of the authentication information (key information) according to the first embodiment will be described with reference to FIG. 7. FIG. 7 is a diagram illustrating an example of a creation processing flow of the authentication information. In S201 of FIG. 7, the display lamp 15 lights the blue color. As the display lamp 15 lights the blue color, the user recognizes that the fingerprint sensor 14 has switched to the mode for accepting the tapping operation and the scrolling operation.

Figure 8:
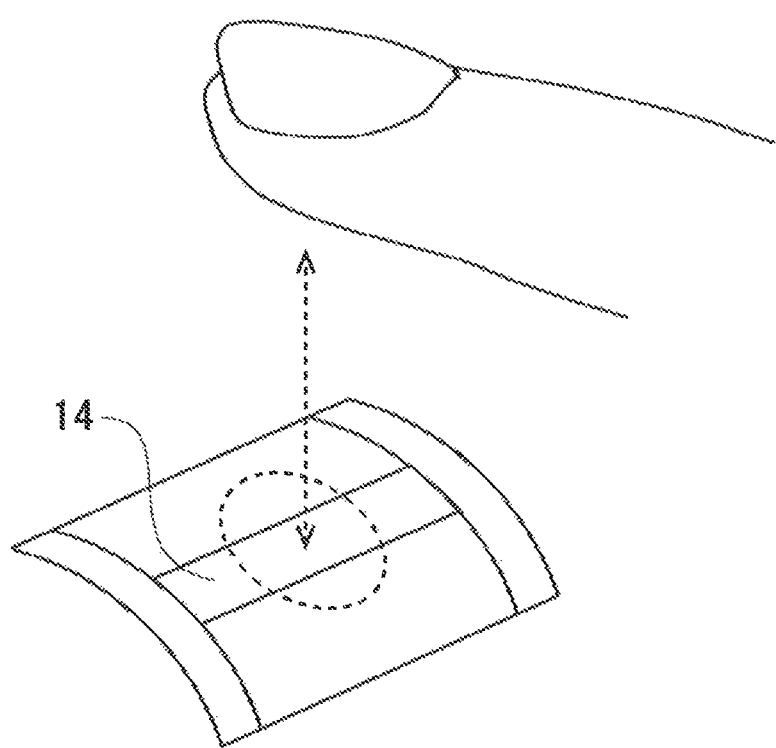
FIG. 8 is an explanatory view of tapping operation.
Figure 9:
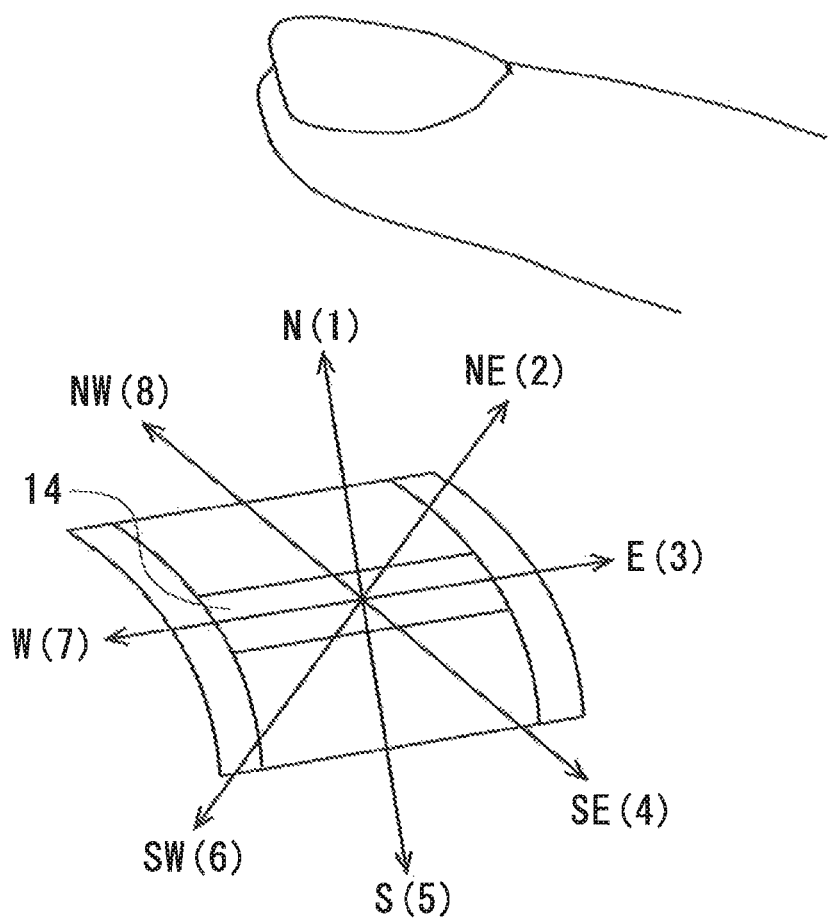
FIG. 9 is an explanatory view of scrolling operation.

In S202 of FIG. 7, the user performs the tapping operation or the scrolling operation. FIG. 8 is an explanatory view of the tapping operation. The user performs the tapping operation by bringing the fingertip into contact with the surface of the fingerprint sensor 14 and then separating the fingertip from the surface of the fingerprint sensor 14. FIG. 9 is an explanatory view of the scrolling operation. The user performs the scrolling operation by bringing the fingertip into contact with the surface of the fingerprint sensor 14 and then moving the fingertip in a predetermined direction in a state that the fingertip is in contact with the surface of the fingerprint sensor 14. The predetermined direction is a direction parallel to the surface (upper surface) of the fingerprint sensor 14. As illustrated in FIG. 9, if eight directions (N: north, NE: north east, E: east, SE: south east, S: south, SW: south west, W: west, and NW: north west) are set as movement directions of the fingertip, the fingertip is moved in one of the eight directions in a state that the fingertip is in contact with the surface of the fingerprint sensor 14. For example, the fingertip is moved in the direction N illustrated in FIG. 9 in a state that the fingertip is in contact with the surface of the fingerprint sensor 14.

In S203 of FIG. 7, the authentication unit 420 determines whether the tapping operation or the scrolling operation is performed. The CPU 421 of the authentication unit 420 determines whether the tapping operation or the scrolling operation is performed by detecting the tapping operation or the scrolling operation based on the operation detection program 63 stored in the ROM 422. The authentication unit 420 determines that the tapping operation is performed if the fingertip is separated from the surface of the fingerprint sensor 14 within a certain time without movement of the fingertip after the contact of the fingertip with the surface of the fingerprint sensor 14. In this case, the authentication unit 420 determines that the tapping operation is performed by one of single tapping and double tapping. The determination of the single tapping or the double tapping by the authentication unit 420 will be described later.

For example, the authentication unit 420 determines that the tapping operation is not performed if the fingertip is not separated from the surface of the fingerprint sensor 14 within a certain time after the contact of the fingertip with the surface of the fingerprint sensor 14. Furthermore, the authentication unit 420 determines that the scrolling operation is performed if the fingertip has passed a predetermined end point area within a certain time from a position (start point area of scrolling operation) where the fingertip has first come in contact with the surface of the fingerprint sensor 14. For example, the authentication unit 420 determines that the scrolling operation is not performed if the fingertip has not moved within a certain time after the contact of the fingertip with the surface of the fingerprint sensor 14.

If the tapping operation or the scrolling operation is not performed (S203: NO), the process proceeds to S204 of FIG. 7. In S204 of FIG. 7, the display lamp 15 lights the red color. As the display lamp 15 lights the red color, the user recognizes that the tapping operation or the scrolling operation is not accepted. After a lapse of a certain time, the display lamp 15 finishes lighting the red color. The process proceeds to S202 of FIG. 7, and the user performs the tapping operation or the scrolling operation again.

On the other hand, if the tapping operation or the scrolling operation is performed (S203: YES), the process proceeds to S205 of FIG. 7. In S205 of FIG. 7, the display lamp 15 lights the green color. As the display lamp 15 lights the green color, the user recognizes that the tapping operation or the scrolling operation is normally accepted.

Furthermore, in S205 of FIG. 7, the authentication unit 420 registers an identification sign corresponding to the type of the tapping operation or an identification sign corresponding to the movement direction of the fingertip in the scrolling operation, in the key creation table 70 of the RAM 423. Specifically, the CPU 421 of the authentication unit 420 performs the registration in the key creation table 70 of the RAM 423 based on the key creation program 64 stored in the ROM 422. Values in ( ) illustrated in FIG. 9 are the identification signs corresponding to the movement directions of the fingertip.

For example, when the tapping operation is performed by single tapping, an identification sign "A" corresponding to the single tapping is registered in the key creation table 70 of the RAM 423. For example, if the tapping operation is performed by double tapping, an identification sign "B" corresponding to the double tapping is registered in the key creation table 70 of the ROM 422. For example, if the scrolling operation is performed by moving the fingertip in the direction N illustrated in FIG. 9, an identification sign "1" corresponding to the movement direction N of the fingertip is registered in the key creation table 70 of the ROM 422.

After the process of S205 of FIG. 7 is executed, the display lamp 15 finishes lighting the green color, and the process proceeds to S206 of FIG. 7. In S206 of FIG. 7, the authentication unit 420 determines whether the tapping operation and the scrolling operation are finished. For example, the authentication unit 420 may determine that the tapping operation and the scrolling operation are finished if the tapping operation and the scrolling operation are not performed for a certain time.

For example, if the authentication information is created by performing the tapping operation for a predetermined number of times and performing the scrolling operation for a predetermined number of times, the authentication unit 420 may determine whether the tapping operation is performed for the predetermined number of times and whether the scrolling operation is performed for the predetermined number of times. If the tapping operation is performed for the predetermined number of times and the scrolling operation is performed for the predetermined number of times, the authentication unit 420 may determine that the tapping operation and the scrolling operation are finished.

For example, when the authentication information is created as the tapping operation and the scrolling operation are performed for a predetermined number of times in total, the authentication unit 420 may determine whether the tapping operation and the scrolling operation are performed for the predetermined number of times in total. If the tapping operation and the scrolling operation are performed for the predetermined number of times in total, the authentication unit 420 may determine that the tapping operation and the scrolling operation are finished.

If the tapping operation and the scrolling operation are finished (S206: YES), the process proceeds to S207 of FIG. 7. On the other hand, if the tapping operation and the scrolling operation are not finished (S206: NO), the process proceeds to S202 of FIG. 7, and the user performs the tapping operation or the scrolling operation.

FIG. 10 is a diagram illustrating an example of the key creation table 70. The key creation table 70 of FIG. 10 illustrates an example in which scrolling operation (1), tapping operation (1), scrolling operation (2), tapping operation (2), scrolling operation (3), tapping operation (3), scrolling operation (4), and tapping operation (4) are sequentially performed.

If the scrolling operation (1) is performed by moving the fingertip in the direction N illustrated in FIG. 9, the identification sign "1" corresponding to the movement direction N of the fingertip is registered in the field of the scrolling operation (1) of the key creation table 70 of FIG. 10. If the tapping operation (1) is performed by single tapping, the identification sign "A" corresponding to the single tapping is registered in the field of the tapping operation (1) of the key creation table 70 of FIG. 10. If the scrolling operation (2) is performed by moving the fingertip in the direction NE illustrated in FIG. 9, an identification sign "2" corresponding to the movement direction NE of the fingertip is registered in the field of the scrolling operation (2) of the key creation table 70 of FIG. 10. If the tapping operation (2) is performed by double tapping, the identification sign "B" corresponding to the double tapping is registered in the field of the tapping operation (2) of the key creation table 70 of FIG. 10.

If the scrolling operation (3) is performed by moving the fingertip in the direction E illustrated in FIG. 9, an identification sign "3" corresponding to the movement direction E of the fingertip is registered in the field of the scrolling operation (3) of the key creation table 70 of FIG. 10. If the tapping operation (3) is performed by single tapping, the identification sign "A" corresponding to the single tapping is registered in the field of the tapping operation (3) of the key creation table 70 of FIG. 10. If the scrolling operation (4) is performed by moving the fingertip in the direction SE illustrated in FIG. 9, an identification sign "4" corresponding to the movement direction SE of the fingertip is registered in the field of the scrolling operation (4) of the key creation table 70 of FIG. 10. If the tapping operation (4) is performed by double tapping, the identification sign "B" corresponding to the double tapping is registered in the field of the tapping operation (4) of the key creation table 70 of FIG. 10.

In S207 of FIG. 7, the authentication unit 420 creates authentication information. The authentication unit 420 creates the authentication information by sequentially arranging the identification signs registered in the fields of the tapping operation and the scrolling operation of the key creation table 70 of the RAM 423. In the example of the key creation table 70 illustrated in FIG. 10, "1A2B3A4B" is created as the authentication information, and "1A2B3A4B" is registered in the field of the authentication information. After the process of S207 of FIG. 7 is executed, the creation processing flow of the authentication information according to the first embodiment ends.

Although the example of the case of creating the authentication information by performing the tapping operation four times and performing the scrolling operation four times has been illustrated above, the present embodiment is not limited to this example, and the user can arbitrarily set the number of times of tapping operation and the number of times of scrolling operation. Furthermore, the authentication information may be created by combining the tapping operation and the scrolling operation, the authentication information may be created by performing only the tapping operation, or the authentication information may be created by performing only the scrolling operation.

If the user desires to initialize the key authentication due to a failure of the tapping operation or the scrolling operation, the user performs predetermined specific operation. The predetermined specific operation is, for example, tapping operation by triple tapping. The key authentication is initialized by performing the predetermined specific operation, and the user can perform the tapping operation or the scrolling operation again from the beginning.

<Detection Process of Tapping Operation>

Figure 11:
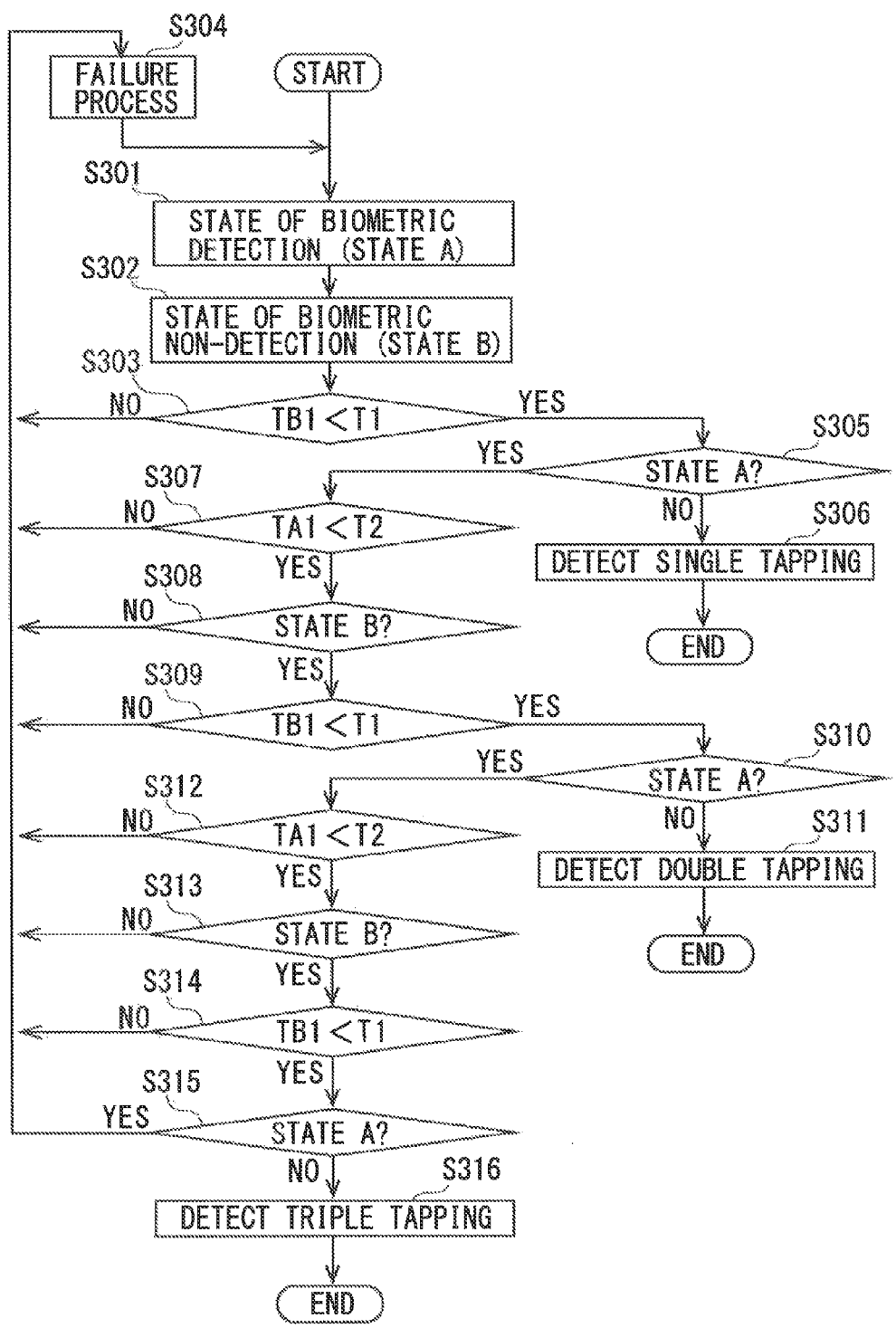
FIG. 11 is a diagram illustrating an example of a flow of a detection process of the tapping operation.

A detection process of the tapping operation will be described with reference to FIG. 11. FIG. 11 is a diagram illustrating an example of a flow of the detection process of the tapping operation. In S301 of FIG. 11, as the fingertip touches the fingerprint sensor 14, the fingerprint sensor 14 detects the living body. More specifically, the fingerprint sensor 14 enters a state of biometric detection (state A).

In S302 of FIG. 11, as the fingertip touching the surface of the fingerprint sensor 14 separates from the surface of the fingerprint sensor 14, the fingerprint sensor 14 stops detecting the living body. More specifically, the fingerprint sensor 14 enters a state of biometric non-detection (state B). In S303 of FIG. 11, the authentication unit 420 determines whether an elapsed time TB1 is smaller than a threshold T1. The elapsed time TB1 is an elapsed time after the fingerprint sensor 14 enters the state A until the fingerprint sensor 14 enters the state B.

If the elapsed time TB1 is larger than the threshold T1 (S303: NO), the process proceeds to S304 of FIG. 11. In S304 of FIG. 11, the authentication unit 420 executes a failure process. Specifically, the authentication unit 420 controls the display lamp 15, and the display lamp 15 lights the red color (see S204 of FIG. 7). After the process of S304 of FIG. 11 is executed, the process proceeds to S301 of FIG. 11. As the display lamp 15 lights the red color, the user recognizes that the tapping operation is not accepted, and the user performs the tapping operation again.

On the other hand, if the elapsed time TB1 is smaller than the threshold T1 (S303: YES), the process proceeds to S305 of FIG. 11. In S305 of FIG. 11, the authentication unit 420 determines whether the fingerprint sensor 14 has entered the state A within a certain time after the fingerprint sensor 14 has entered the state B.

If the fingerprint sensor 14 does not enter the state A within the certain time after the fingerprint sensor 14 has entered the state B (S305: NO), the process proceeds to S306 of FIG. 11. In S306 of FIG. 11, the authentication unit 420 detects single tapping. More specifically, the authentication unit 420 detects that the tapping operation is performed by the single tapping. When the user performs the tapping operation by the single tapping, the user does not bring the fingertip into contact with the fingerprint sensor 14 for equal to or more than a certain time after separating the fingertip from the fingerprint sensor 14.

On the other hand, if the fingerprint sensor 14 has entered the state A within the certain time after the fingerprint sensor 14 has entered the state B (S305: YES), the process proceeds to S307 of FIG. 11. In S307 of FIG. 11, the authentication unit 420 determines whether an elapsed time TA1 is smaller than a threshold T2. The elapsed time TA1 is an elapsed time after the fingerprint sensor 14 has entered the state B until the fingerprint sensor 14 enters the state A.

If the elapsed time TA1 is larger than the threshold T2 (S307: NO), the process proceeds to S304 of FIG. 11. On the other hand, if the elapsed time TA1 is smaller than the threshold T2 (S307: YES), the process proceeds to S308 of FIG. 11. In S308 of FIG. 11, the authentication unit 420 determines whether the fingerprint sensor 14 has entered the state B within a certain time after the fingerprint sensor 14 has entered the state A.

If the fingerprint sensor 14 does not enter the state B within the certain time after the fingerprint sensor 14 has entered the state A (S308: NO), the process proceeds to S304 of FIG. 11. On the other hand, if the fingerprint sensor 14 has entered the state B within the certain time after the fingerprint sensor 14 has entered the state A (S308: YES), the process proceeds to S309 of FIG. 11.

In S309 of FIG. 11, the authentication unit 420 determines whether the elapsed time TB1 is smaller than the threshold T1. If the elapsed time TB1 is larger than the threshold T1 (S309: NO), the process proceeds to S304 of FIG. 11. On the other hand, if the elapsed time TB is smaller than the threshold T1 (S309: YES), the process proceeds to S310 of FIG. 11.

In S310 of FIG. 11, the authentication unit 420 determines whether the fingerprint sensor 14 has entered the state A within a certain time after the fingerprint sensor 14 has entered the state B. If the fingerprint sensor 14 does not enter the state A within the certain time after the fingerprint sensor 14 has entered the state B (S310: NO), the process proceeds to S311 of FIG. 11. In S311 of FIG. 11, the authentication unit 420 detects double tapping. More specifically, the authentication unit 420 detects that the tapping operation is performed by the double tapping. When the user performs the tapping operation by the double tapping, the user does not bring the fingertip into contact with the fingerprint sensor 14 for equal to or more than a certain time after separating the fingertip from the fingerprint sensor 14.

On the other hand, if the fingerprint sensor 14 enters the state A within the certain time after the fingerprint sensor 14 has entered the state B (S310: YES), the process proceeds to S312 of FIG. 11. In S312 of FIG. 11, the authentication unit 420 determines whether the elapsed time TA1 is smaller than the threshold T2.

If the elapsed time TA1 is larger than the threshold T2 (S312: NO), the process proceeds to S304 of FIG. 11. On the other hand, if the elapsed time TA1 is smaller than the threshold T2 (S312: YES), the process proceeds to S313 of FIG. 11. In S313 of FIG. 11, the authentication unit 420 determines whether the fingerprint sensor 14 has entered the state B within a certain time after the fingerprint sensor 14 has entered the state A.

If the fingerprint sensor 14 does not enter the state B within the certain time after the fingerprint sensor 14 has entered the state A (S313: NO), the process proceeds to S304 of FIG. 11. On the other hand, if the fingerprint sensor 14 has entered the state B within the certain time after the fingerprint sensor 14 has entered the state A (S313: YES), the process proceeds to S314 of FIG. 11.

In S314 of FIG. 11, the authentication unit 420 determines whether the elapsed time TB1 is smaller than the threshold T1. If the elapsed time TB1 is larger than the threshold T1 (S314: NO), the process proceeds to S304 of FIG. 11. On the other hand, if the elapsed time TB1 is smaller than the threshold T1 (S314: YES), the process proceeds to S315 of FIG. 11.

In S315 of FIG. 11, the authentication unit 420 determines whether the fingerprint sensor 14 has entered the state A within a certain time after the fingerprint sensor 14 has entered the state B. If the fingerprint sensor 14 does not enter the state A within the certain time after the fingerprint sensor 14 has entered the state B (S315: NO), the process proceeds to S316 of FIG. 11. In S316 of FIG. 11, the authentication unit 420 detects triple tapping. More specifically, the authentication unit 420 detects that the tapping operation is performed by the triple tapping. When the user performs the tapping operation by the triple tapping, the user does not bring the fingertip into contact with the fingerprint sensor 14 for equal to or more than a certain time after separating the fingertip from the fingerprint sensor 14.

On the other hand, if the fingerprint sensor 14 has entered the state A within the certain time after the fingerprint sensor 14 has entered the state B (S315: YES), the process proceeds to S304 of FIG. 11.

<Determination Process of Movement Direction>

Figure 12:
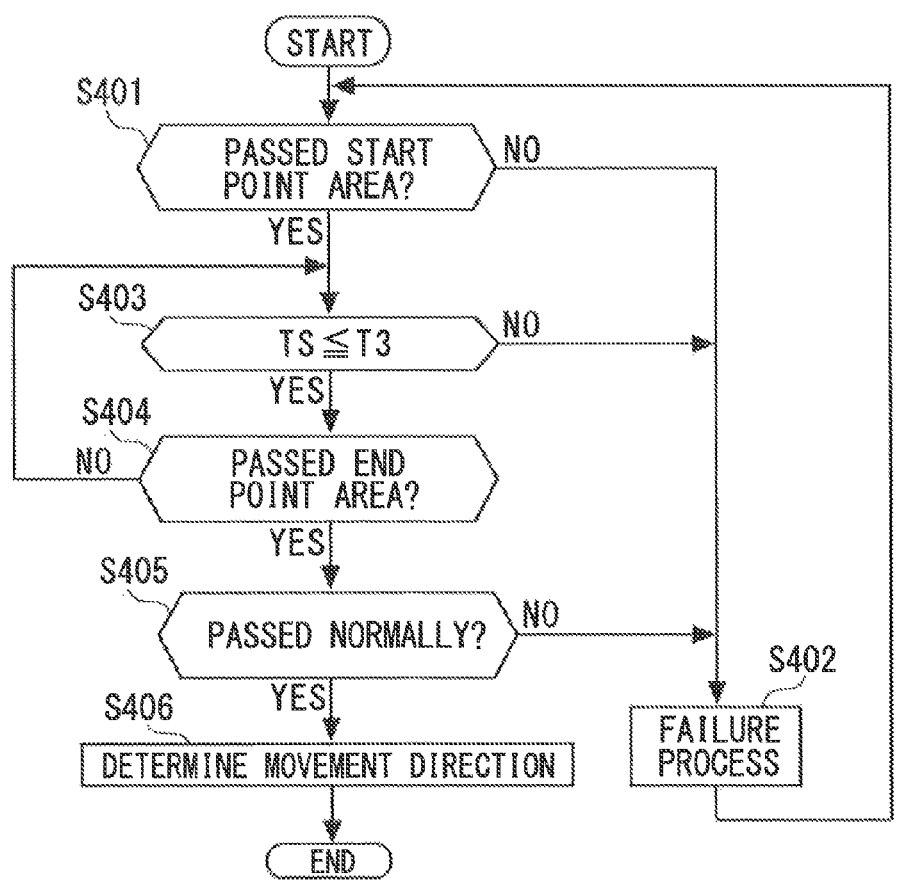
FIG. 12 is a diagram illustrating an example of a flow of a determination process of a movement direction of a fingertip in the scrolling operation.

A determination process of the movement direction of the fingertip in the scrolling operation will be described with reference to FIG. 12. FIG. 12 is a diagram illustrating an example of a flow of the determination process of the movement direction of the fingertip in the scrolling operation.

Figure 13:
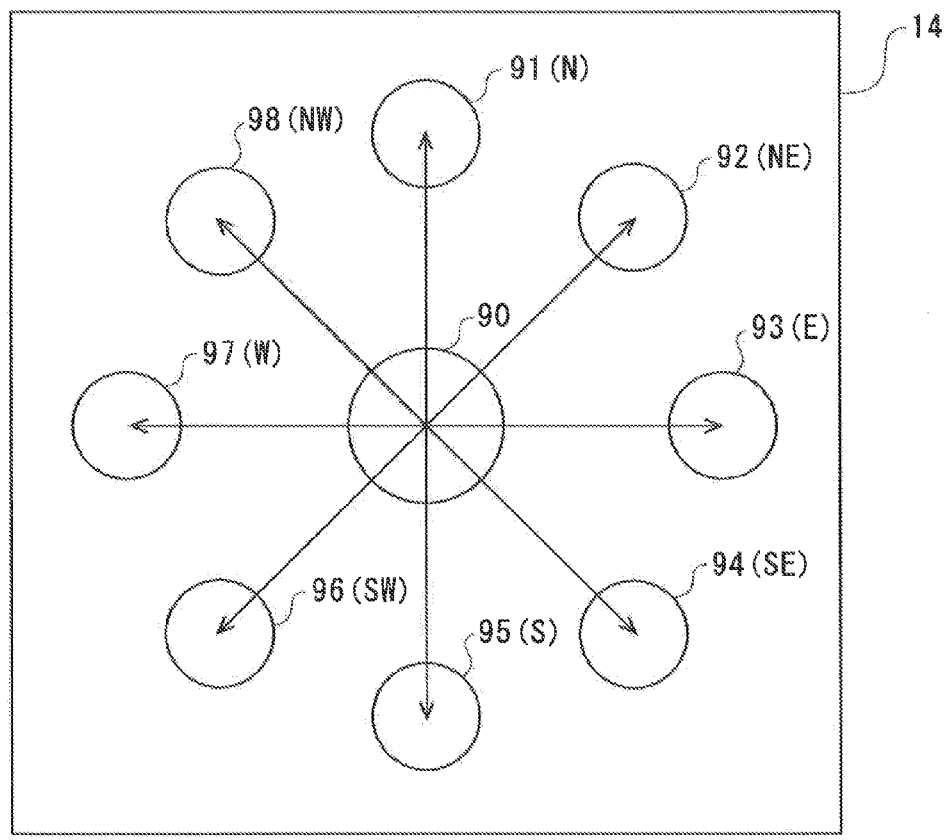
FIG. 13 is an explanatory view of a start point area and end point areas.

In S401 of FIG. 12, the authentication unit 420 determines whether the fingertip has passed a start point area (start point coordinates) of the fingerprint sensor 14. As illustrated in FIG. 13, the start point area of the fingerprint sensor 14 is an area 90 of a center section of the fingerprint sensor 14. If the fingertip has not passed the start point area of the fingerprint sensor 14 (S401 of FIG. 12: NO), the process proceeds to S402 of FIG. 12.

In S402 of FIG. 12, the authentication unit 420 executes a failure process. Specifically, the authentication unit 420 controls the display lamp 15, and the display lamp 15 lights the red color (see S204 of FIG. 7). After the process of S402 of FIG. 12 is executed, the process proceeds to S401 of FIG. 12. As the display lamp 15 lights the red color, the user recognizes that the scrolling operation is not accepted, and the user performs the scrolling operation again.

On the other hand, if the fingertip has passed the start point area of the fingerprint sensor 14 (S401 of FIG. 12: YES), the process proceeds to S403 of FIG. 12. In S403 of FIG. 12, the authentication unit 420 determines whether an elapsed time TS from the time that the fingertip has passed the start point area of the fingerprint sensor 14 is equal to or smaller than a threshold T3.

If the elapsed time TS from the time that the fingertip has passed the start point area of the fingerprint sensor 14 is larger than the threshold T3 (S403 of FIG. 12: NO), the process proceeds to S402 of FIG. 12. On the other hand, if the elapsed time TS from the time that the fingertip has passed the start point area of the fingerprint sensor 14 is equal to or smaller than the threshold T3 (S403 of FIG. 12: YES), the process proceeds to S404 of FIG. 12.

In S404 of FIG. 12, the authentication unit 420 determines whether the fingertip has passed an end point area (end point coordinates) of the fingerprint sensor 14. As illustrated in FIG. 13, the end point areas of the fingerprint sensor 14 are areas 91 to 98 arranged to surround the area 90 of the fingerprint sensor 14. The end point areas (areas 91 to 98) of the fingerprint sensor 14 are arranged at positions at a predetermined distance in eight directions (N: north, NE: north east, E: east, SE: south east, S: south, SW: south west, W: west, and NW: north west) from the start point area (area 90).

If the fingertip has not passed the end point area of the fingerprint sensor 14 (S404 of FIG. 12: NO), the process proceeds to S403 of FIG. 12. On the other hand, if the fingertip has passed the end point area of the fingerprint sensor 14 (S404 of FIG. 12: YES), the process proceeds to S405 of FIG. 12.

In S405 of FIG. 12, the authentication unit 420 determines whether the fingertip has normally passed the end point area of the fingerprint sensor 14. For example, if the fingertip has passed two end point areas (areas 91 and 92) of the fingerprint sensor 14 at the same time, the authentication unit 420 determines that the fingertip has not normally passed the end point area of the fingerprint sensor 14. If the fingertip has not normally passed the end point area of the fingerprint sensor 14 (S405 of FIG. 12: NO), the process proceeds to S402 of FIG. 12.

On the other hand, if the fingertip has normally passed the end point area of the fingerprint sensor 14 (S405 of FIG. 12: YES), the process proceeds to S406 of FIG. 12. In S406 of FIG. 12, the authentication unit 420 determines the direction associated with the end point area passed by the fingertip as the movement direction of the fingertip in the scrolling operation.

FIGS. 14A to 14D are diagrams illustrating examples of the direction determination table 71 used in the determination process of the movement direction of the fingertip in the scrolling operation. In FIGS. 14A to 14D, the column on the far left indicates a lapse of time, indicating that the time elapses in the order of elapsed times 0, 1, 2, 3, and 4. In FIGS. 14A to 14D, the row at the top denotes the area 90 that is the start point area and the areas 91 to 98 that are the end point areas. In FIGS. 14A to 14D, a circle (O) denotes passing of the fingertip, and a cross (X) denotes non-passing of the fingertip.

FIG. 14A illustrates that passing of the fingertip is detected in the area 90 that is the start point area at the elapsed time 0, passing of the fingertip is not detected at the elapsed times 1, 2, and 4, and passing of the fingertip is detected in the area 91 that is the end point area at the elapsed time 3. As illustrated in FIG. 14A, the fingertip has passed the start point area (area 90) of the fingerprint sensor 14, and the fingertip has normally passed the end point area (area 91) of the fingerprint sensor 14. Therefore, the direction N associated with the end point area passed by the fingertip is determined as the movement direction of the fingertip in the scrolling operation.

FIG. 14B illustrates that passing of the fingertip is detected in the area 90 that is the start point area at the elapsed time 0, passing of the fingertip is not detected at the elapsed times 1, 2, and 3, and passing of the fingertip is detected in the area 92 that is the end point area at the elapsed time 4. As illustrated in FIG. 14B, the fingertip has passed the start point area (area 90) of the fingerprint sensor 14, and the fingertip has normally passed the end point area (area 92) of the fingerprint sensor 14. Therefore, the direction NE associated with the end point area passed by the fingertip is determined as the movement direction of the fingertip in the scrolling operation.

FIG. 14C illustrates that passing of the fingertip is detected in the area 90 that is the start point area at the elapsed time 0, passing of the fingertip is not detected at the elapsed times 1, 2, and 4, and passing of the fingertip is detected in the areas 91 and 92 that are the end point areas at the elapsed time 3. As illustrated in FIG. 14C, the fingertip has passed the start point area (area 90) of the fingerprint sensor 14, and the fingertip has passed two end point areas (areas 91 and 92) of the fingerprint sensor 14. Therefore, it is determined that the fingertip has not normally passed the end point area of the fingerprint sensor 14.

FIG. 14D illustrates that passing of the fingertip is detected at the elapsed time 0 in the area 90 that is the start point area, and passing of the fingertip is not detected at the elapsed times 1, 2, 3, and 4. As illustrated in FIG. 14D, although the fingertip has passed the start point area (area 90) of the fingerprint sensor 14, the fingertip has not passed any of the end point areas of the fingerprint sensor 14. Therefore, it is determined that the movement direction of the fingertip is not decided within a certain time.

<Registration Process of Feature Points of Biometric Information>

The feature point of the biometric information is registered in the biometric information feature database 68 stored in the ROM 422 of the first processing apparatus 40. A registration process of the feature point of the biometric information in the biometric information feature database 68 will be described. The feature point of the biometric information is registered in a state that the power is supplied to the authentication unit 420 of the first processing apparatus 40 and the second processing apparatus 50. The user brings the fingertip into contact with the surface of the fingerprint sensor 14 according to an instruction of a registration screen displayed on the display 10 to register the feature point of the biometric information. The CPU 501 of the second processing apparatus 50 displays the registration screen on the display 10 based on the display control program 76 stored in the ROM 502.

When the fingertip touches the surface of the fingerprint sensor 14, the fingerprint sensor 14 detects the living body. The authentication unit 420 controls the fingerprint sensor 14 to read the fingerprint. Specifically, the CPU 421 of the authentication unit 420 controls the fingerprint sensor 14 based on the biometric reading program 60 stored in the ROM 422. The fingertip is moved in the direction Y orthogonal to the longitudinal direction X of the fingerprint sensor 14 in a state that the fingertip is in contact with the surface of the fingerprint sensor 14, and the fingerprint sensor 14 reads the fingerprint.

The authentication unit 420 stores the fingerprint image read by the fingerprint sensor 14 in the RAM 423. Specifically, the CPU 421 of the authentication unit 420 stores the fingerprint image read by the fingerprint sensor 14 in the RAM 423 based on the biometric reading program 60 stored in the ROM 422. The authentication unit 420 extracts the feature point of the biometric information from the fingerprint image stored in the RAM 423. Specifically, the CPU 421 of the authentication unit 420 extracts the feature point of the biometric information from the fingerprint image stored in the RAM 423 based on the biometric feature extraction program 61 stored in the ROM 422.

The CPU 501 of the second processing apparatus 50 registers the extracted feature point of the biometric information in the biometric information feature database 68 stored in the ROM 422 based on the biometric information registration program 74 stored in the ROM 502.

<Registration Process of Authentication Information>

The authentication information is registered in the biometric information feature database 68 stored in the ROM 422 of the first processing apparatus 40. A registration method of the authentication information in the biometric information feature database 68 will be described. The authentication information is registered in a state that the power is supplied to the authentication unit 420 of the first processing apparatus 40 and the second processing apparatus 50. The user uses the keyboard 12 to input the authentication information according to an instruction of the registration screen displayed on the display 10 to register the authentication information in the biometric information feature database 68.

The CPU 501 of the second processing apparatus 50 registers the authentication information in the biometric information feature database 68 based on the key information registration program 75 stored in the ROM 502. In this case, the feature point of the biometric information of the user who has registered the authentication information, the authentication information, and an identification code are associated and registered in the biometric information feature database 68. The CPU 501 of the second processing apparatus 50 displays the registration screen on the display 10 based on the display control program 76 stored in the ROM 502. Note that the authentication unit 420 may create the authentication information based on the tapping operation and the scrolling operation performed by the user and register the authentication information in the biometric information feature database 68.

FIG. 15 is a diagram illustrating an example of the biometric information feature database 68 stored in the ROM 422. Numbers for specifying the authentication information and the feature point of the biometric information are registered in the fields of identification codes of the biometric information feature database 68. The authentication information input by the user using the keyboard 12 is registered in the fields of key information of the biometric information feature database 68. The feature point of the biometric information of the user is registered in the fields of biometric feature data of the biometric information feature database 68.

<Registration Process of User ID and User Password>

A user ID and a user password for OS log-on are registered in the first password database 78 stored in the HDD 504 of the second processing apparatus 50. A registration method of the user ID and the user password in the first password database 78 will be described. The user ID and the user password are registered in a state that the power is supplied to the authentication unit 420 of the first processing apparatus 40 and the second processing apparatus 50. The CPU 501 of the second processing apparatus 50 registers the user ID and the user password in the first password database 78 based on the password registration program 77 stored in the ROM 502.

The user uses the keyboard 12 to input the user ID and the user password according to an instruction of the registration screen displayed on the display 10 to register the user ID and the user password in the first password database 78. In this case, the user ID, the user password, and the identification code are associated and registered in the first password database 78. The CPU 501 of the second processing apparatus 50 displays the registration screen on the display 10 based on the display control program 76 stored in the ROM 502.

FIG. 16 is a diagram illustrating an example of the first password database 78 stored in the HDD 504. Numbers for specifying the user ID and the user password are registered in the fields of identification codes of the first password database 78. The user IDs are registered in the fields of IDs of the first password database 78. The user passwords are registered in the fields of passwords of the first password database 78.

<Registration Process of BIOS Password>

A BIOS password for BIOS activation is registered in the second password database 79 stored in the BIOS ROM 505 of the second processing apparatus 50. A registration method of the BIOS password in the second password database 79 will be described. The BIOS password is registered in a state that the power is supplied to the authentication unit 420 of the first processing apparatus 40 and the second processing apparatus 50. The CPU 501 of the second processing apparatus 50 registers the BIOS password in the second password database 79 based on the password registration program 77 stored in the ROM 502.

The user uses the keyboard 12 to input the BIOS password according to an instruction of the registration screen displayed on the display 10 to register the BIOS password in the second password database 79. In this case, the BIOS password and the identification code are associated and registered in the second password database 79. The CPU 501 of the second processing apparatus 50 displays the registration screen on the display 10 based on the display control program 76 stored in the ROM 502.

FIG. 17 is a diagram illustrating an example of the second password database 79 stored in the BIOS ROM 505. Numbers for specifying the BIOS passwords are registered in the fields of identification codes of the second password database 79. The BIOS passwords for BIOS activation are registered in the fields of passwords of the second password database 79.

<Authentication Process (2)>

Figure 18:
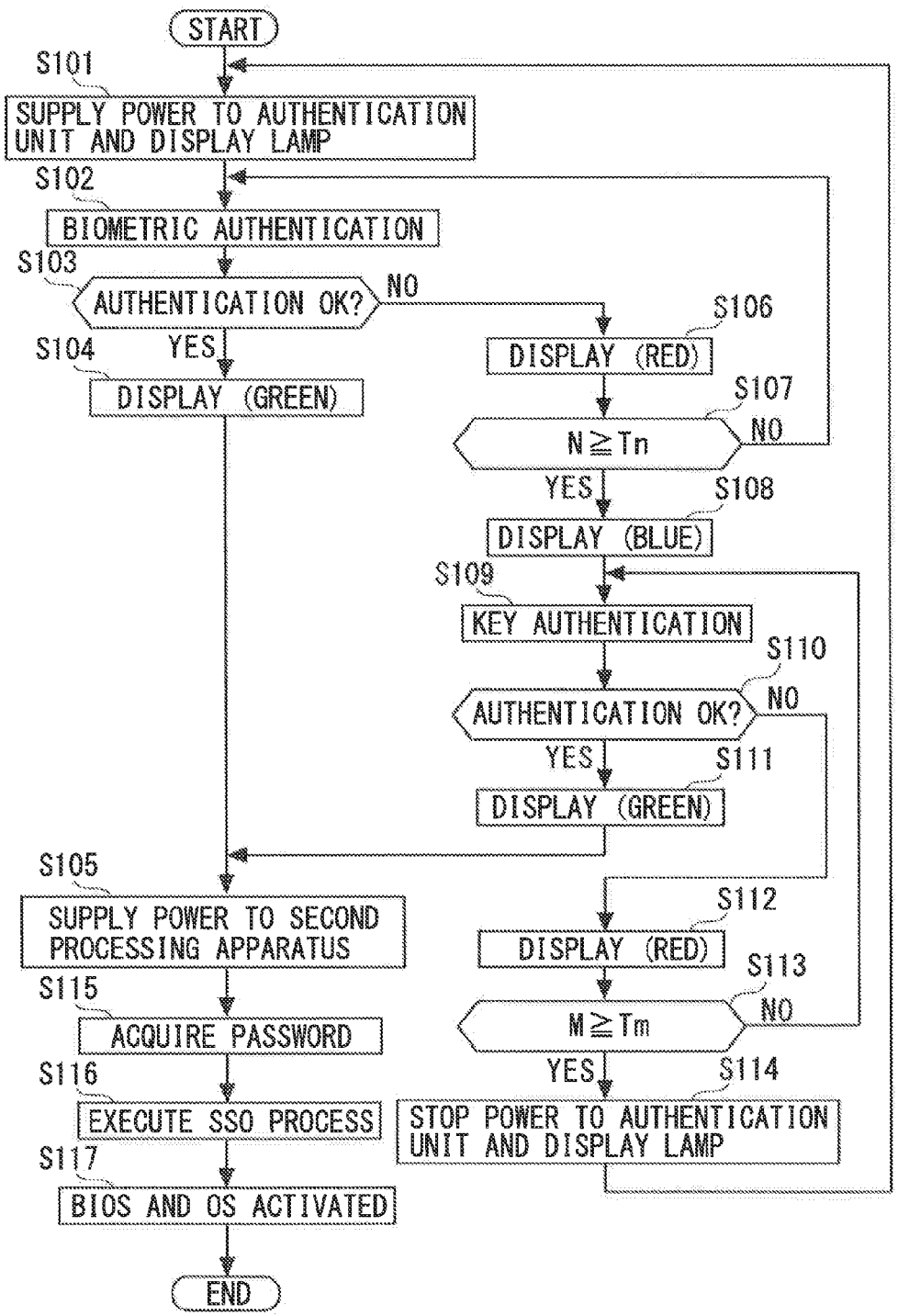
FIG. 18 is a diagram illustrating an example of the authentication processing flow (part 2) according to the first embodiment.

FIG. 18 is a diagram illustrating an example of the authentication processing flow (part 2) according to the first embodiment. Compared to the authentication processing flow (part 1) illustrated in FIG. 6, the authentication processing flow (part 2) illustrated in FIG. 18 is different in that processes of S115, S116, and S117 of FIG. 18 are executed after the process of S105 of FIG. 18 is executed. Hereinafter, the processes in the authentication processing flow (part 2) illustrated in FIG. 18 different from the authentication processing flow (part 1) illustrated in FIG. 6 will be described.

After the process of S105 of FIG. 18 is executed, the process proceeds to S115 of FIG. 18. In S115 of FIG. 18, the CPU 501 of the second processing apparatus 50 acquires the user password for OS log-on and the BIOS password for BIOS activation in activating the second processing apparatus 50, from the HDD 504 and the BIOS ROM 505 of the second processing apparatus 50. The CPU 501 of the second processing apparatus 50 acquires the user password registered in the first password database 78 of the HDD 504. The CPU 501 of the second processing apparatus 50 acquires the BIOS password registered in the second password database 79 of the BIOS ROM 505.

An acquisition method of the user password and the BIOS password performed by the CPU 501 of the second processing apparatus 50 will be described. If the biometric authentication is OK in the process of S104, the authentication unit 420 acquires the identification code from the biometric information feature database 68 stored in the ROM 422 based on the feature point of the biometric information extracted in the process of S103. For example, if the feature point of the biometric information extracted in the process of S103 is "A", the authentication unit 420 acquires the identification code "01" from the biometric information feature database 68 illustrated in FIG. 15. If the key authentication is OK in the process of S110, the authentication unit 420 acquires the identification code from the biometric information feature database 68 stored in the ROM 422 based on the authentication information created in the process of S109. For example, if the authentication information created in the process of S109 is "1B2A5B3A", the authentication unit 420 acquires the identification code "01" from the biometric information feature database 68 illustrated in FIG. 15.

The authentication unit 420 notifies the CPU 501 of the second processing apparatus 50 of the identification code through the communication interface 424. The CPU 501 of the second processing apparatus 50 refers to the first password database 78 of the HDD 504 to acquire the user password corresponding to the identification code. For example, if the identification code notified from the authentication unit 420 is "01", the CPU 501 of the second processing apparatus 50 acquires the user password "12345678" corresponding to the identification code "01" from the first password database 78 illustrated in FIG. 16. The CPU 501 of the second processing apparatus 50 refers to the second password database 79 of the BIOS ROM 505 to acquire the BIOS password corresponding to the identification code. For example, if the identification code notified from the authentication unit 420 is "01", the CPU 501 of the second processing apparatus 50 acquires the BIOS password "87654321" corresponding to the identification code "01" from the second password database 79 illustrated in FIG. 17.

After the process of S115 of FIG. 18 is executed, the process proceeds to S116 of FIG. 18. In S116 of FIG. 18, the CPU 501 of the second processing apparatus 50 executes a process of single sign-on (SSO). Specifically, the CPU 501 of the second processing apparatus 50 inputs the user password acquired in the process of S115 of FIG. 18, at OS log-on. Furthermore, the CPU 501 of the second processing apparatus 50 inputs, to the password input field, the BIOS password acquired in the process of S115 of FIG. 18, at BIOS activation.

In S117 of FIG. 18, the CPU 501 of the second processing apparatus 50 activates the BIOS and the OS. As the BIOS and the OS are activated, the BIOS activation screen is displayed on the screen of the display 10, and then the desktop screen is displayed on the screen of the display 10.

According to the first embodiment, the feature point of the biometric information is extracted from the fingerprint image read by the fingerprint sensor 14, and the extracted feature point of the biometric information and the registered feature point of the biometric information are verified. If the extracted feature point of the biometric information and the registered feature point of the biometric information satisfy a predetermined standard, the biometric authentication is OK. On the other hand, if the biometric authentication is NG, the fingerprint sensor 14 is used to perform the tapping operation and the scrolling operation to create the authentication information, and the key authentication is performed. If the key authentication is OK, the same process as when the biometric authentication is OK is executed. More specifically, the emulation of the pressing operation of the power supply button 16 is automatically performed to supply power to the second processing apparatus 50, and the second processing apparatus 50 enters the activation state. Therefore, the power is supplied to the entire information processing apparatus 1, and the entire information processing apparatus 1 enters the activation state. According to the first embodiment, even if the biometric authentication is NG, the key authentication different from the biometric authentication can be performed to determine whether the user is the owner or the like of the information processing apparatus 1. As a result, if the key authentication is OK, the power can be supplied to the entire information processing apparatus 1 even if the biometric authentication is NG.

According to the first embodiment, the emulation of the pressing operation of the power supply button 16 is automatically performed if the biometric authentication is OK or if the key authentication is OK, and the user can put the entire information processing apparatus 1 into the activation state without performing the pressing operation of the power supply button 16. Therefore, compared to an apparatus that performs the biometric authentication after the power supply button 16 is pressed, the information processing apparatus 1 according to the first embodiment can skip the pressing process of the power supply button 16. According to the first embodiment, the power is supplied to the entire information processing apparatus 1, and the biometric authentication or the key authentication can be performed without waiting for the time before the entire information processing apparatus 1 enters the activation state.

If the power is not supplied to the second processing apparatus 50, the power is not supplied to the display 10, the keyboard 12, and the like included in the information processing apparatus 1. Therefore, information is not displayed on the display 10, and the user is unable to perform operation using the keyboard 12. Since the power is supplied to the fingerprint sensor 14 even under the condition that the power is not supplied to the display 10, the keyboard 12, and the like, whether the user is the owner or the like of the information processing apparatus 1 can be determined by performing the key authentication using the fingerprint sensor 14.

Second Embodiment

Figure 19:
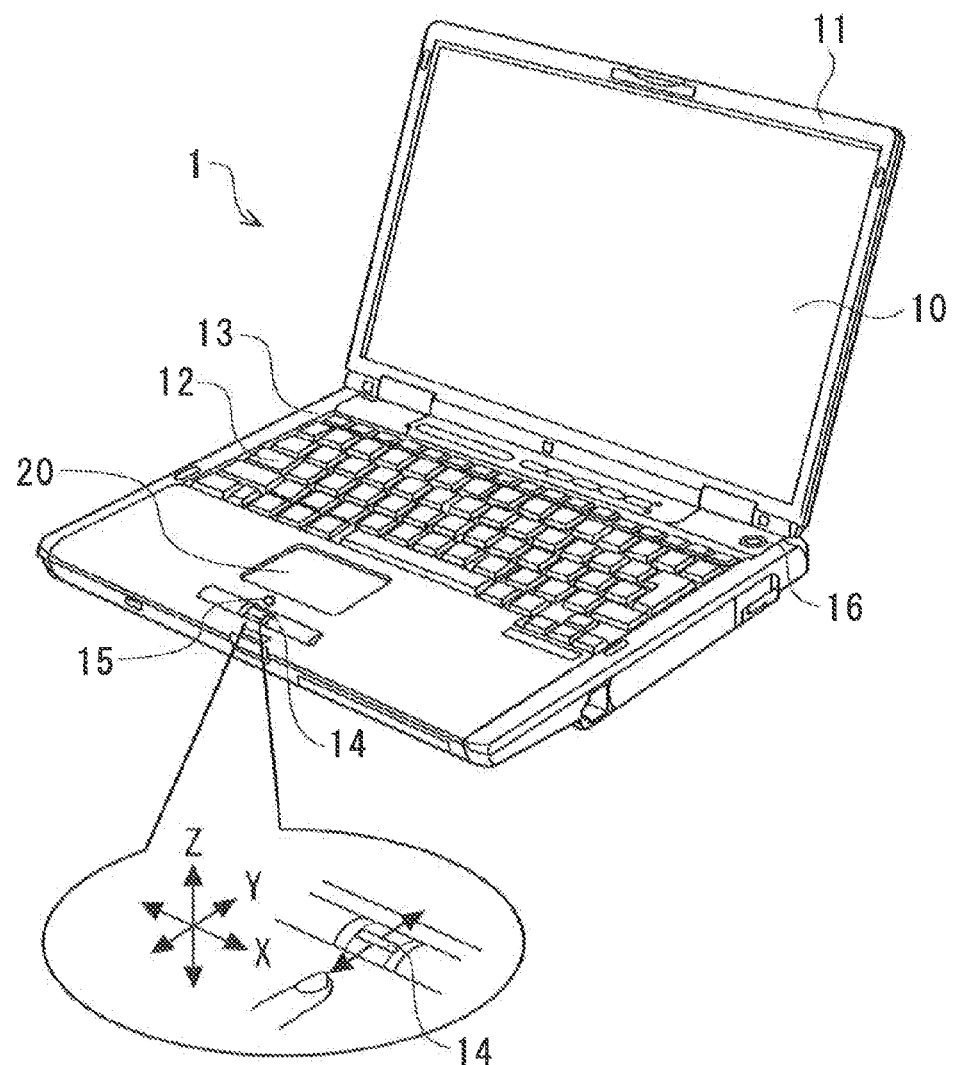
FIG. 19 is an external view of the information processing apparatus 1 according to a second embodiment.

Hereinafter, the information processing apparatus 1 according to a second embodiment will be described with reference to FIGS. 19 to 22. Note that the same constituent elements as those of the first embodiment are designated with the same reference signs as those of the first embodiment, and the description will be omitted. FIG. 19 is an external view of the information processing apparatus 1 according to the second embodiment. Although the information processing apparatus 1 is, for example, a notebook personal computer, the information processing apparatus 1 is not limited to the notebook personal computer, and the information processing apparatus 1 may be a laptop personal computer, a PDA (Personal Digital Assistance), a smartphone, a tablet terminal, a mobile phone, an electronic book, or the like.

As illustrated in FIG. 19, the information processing apparatus 1 includes the display 10, the display housing 11, the keyboard 12, the keyboard housing 13, the fingerprint sensor 14, the display lamp 15, the power supply button 16, and a touch pad 20. Compared to the first embodiment, the second embodiment is different in that the touch pad 20 is further included. The other points are the same as those of the first embodiment, and the description will be omitted.

In the first embodiment, the fingerprint sensor 14 is used to perform the tapping operation and the scrolling operation to create the authentication information, and the key authentication is performed. In the second embodiment, the touch pad 20 is used to perform the tapping operation and the scrolling operation to create the authentication information, and the key authentication is performed.

The touch pad 20 is a position input apparatus (pointing device) that can specify a contact position when a finger, a stylus, or the like touches the surface of the touch pad 20. The touch pad 20 detects contact operation for the surface of the touch pad 20. The touch pad 20 is an example of the detection unit. The touch pad 20 can specify the trajectory of the finger, the stylus, or the like tracing the surface of the touch pad 20. The touch pad 20 may be adopted in any system if the touch pad 20 can be operated by the finger, the stylus, or the like, and for example, a capacitance system, a resistance film system, an electromagnetic system, an ultrasonic system, or the like may be adopted.

Figure 20:
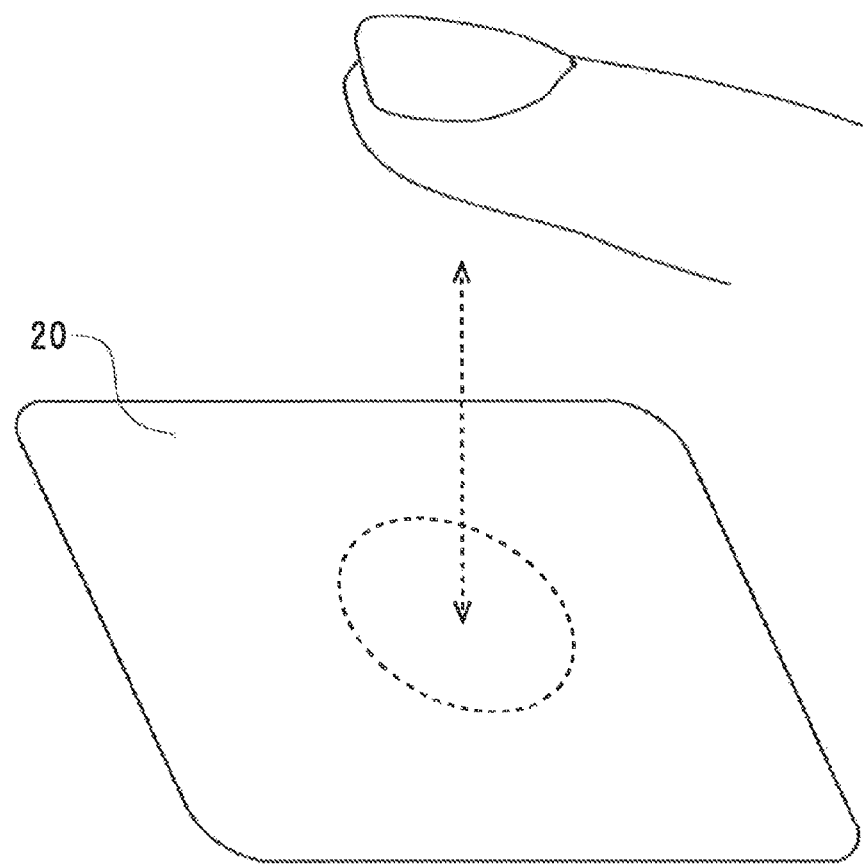
FIG. 20 is an explanatory view of tapping operation.

FIG. 20 is an explanatory view of the tapping operation. Although FIG. 20 illustrates that the tapping operation is performed by the finger, the tapping operation may be performed by the stylus. The user performs the tapping operation by bringing the finger, the stylus, or the like into contact with the surface of the touch pad 20 and then separating the finger, the stylus, or the like from the surface of the touch pad 20.

Figure 21:
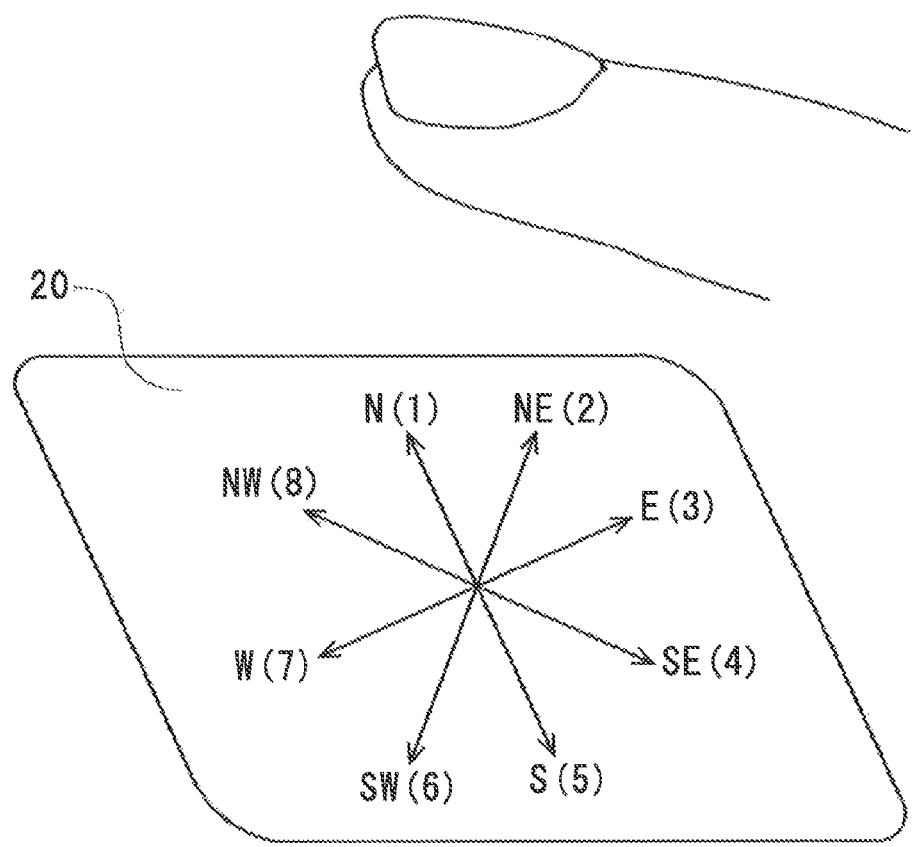
FIG. 21 is an explanatory view of scrolling operation.

FIG. 21 is an explanatory view of the scrolling operation. Although FIG. 21 illustrates that the scrolling operation is performed by the finger, the scrolling operation may be performed by the stylus. The user performs the scrolling operation by bringing the finger, the stylus, or the like into contact with the surface of the touch pad 20 and then moving a tip of the finger, the stylus, or the like in a predetermined direction in a state that the finger, the stylus, or the like is in contact with the surface of the touch pad 20. As illustrated in FIG. 21, when eight directions (N: north, NE: north east, E: east, SE: south east, S: south, SW: south west, W: west, and NW: north west) are set as the movement directions of the finger, the stylus, or the like, the finger, the stylus, or the like is moved in one of the eight directions in a state that the finger, the stylus, or the like is in contact with the surface of the touch pad 20. For example, the finger, the stylus, or the like is moved in the direction N illustrated in FIG. 21 in a state that the finger, the stylus, or the like is in contact with the surface of the touch pad 20.

Figure 22:
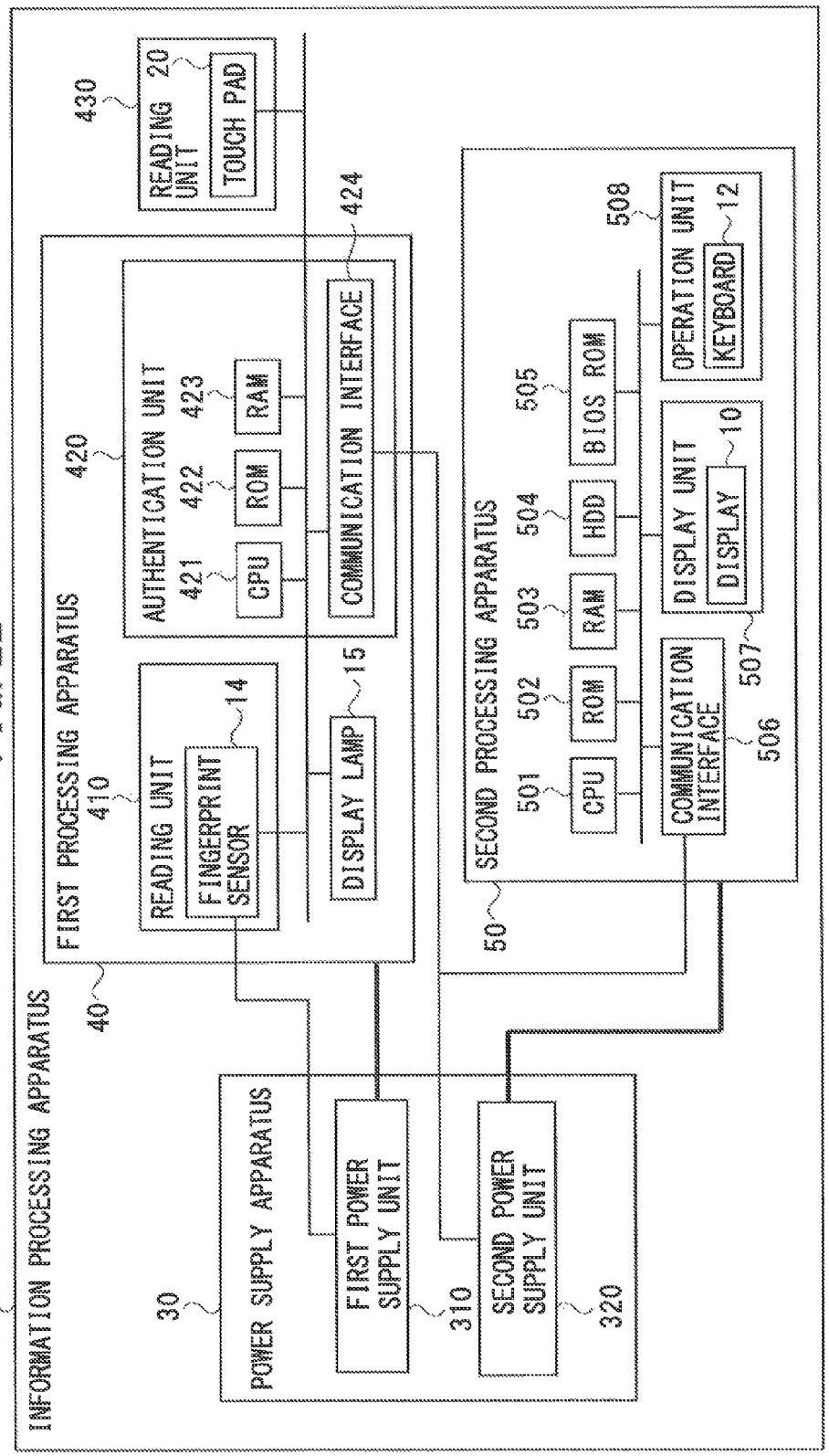
FIG. 22 is a diagram illustrating a configuration example of the information processing apparatus 1 according to the second embodiment.

FIG. 22 is a diagram illustrating a configuration example of the information processing apparatus 1 according to the second embodiment. As illustrated in FIG. 22, the information processing apparatus 1 includes the power supply apparatus 30, the first processing apparatus 40, and the second processing apparatus 50. Compared to the information processing apparatus 1 according to the first embodiment, the information processing apparatus 1 according to the second embodiment is different in that a reading unit 430 is further included. The other points are the same as those of the first embodiment, and the description will be omitted. The reading unit 430 includes the touch pad 20. The functional configuration of the information processing apparatus 1 according to the second embodiment is the same as the functional configuration according to the first embodiment, and the description will be omitted.

In an authentication process according to the second embodiment, substantially the same process as the authentication process according to the first embodiment described with reference to FIG. 6 is executed. Hereinafter, processes different from the authentication process according to the first embodiment will be described. In the authentication process according to the second embodiment, the authentication unit 420 switches the touch pad 20 to a mode that can detect the tapping operation and the scrolling operation in S108 of FIG. 6. Furthermore, in S108 of FIG. 6, the display lamp 15 lights the blue color as a display indicating that the touch pad 20 has switched to the mode that can detect the tapping operation and the scrolling operation.

<Creation Process of Authentication Information (Key Information)>

In a creation process of the authentication information (key information) in the second embodiment, substantially the same process as the creation process of the authentication information (key information) in the first embodiment described with reference to FIG. 7 is executed by using the touch pad 20 in place of the fingerprint sensor 14. Therefore, the detailed description of the creation process of the authentication information (key information) in the second embodiment will be omitted.

<Detection Process of Tapping Operation>

In a detection process of the tapping operation in the second embodiment, a process substantially the same as the detection process of the tapping operation in the first embodiment described with reference to FIG. 11 is executed by using the touch pad 20 in place of the fingerprint sensor 14. Therefore, the detailed description of the detection process of the tapping operation in the second embodiment will be omitted.

<Determination Process of Movement Direction>

In a determination process of the movement direction of the finger, the stylus, or the like in the second embodiment, a process substantially the same as the determination process of the movement direction in the first embodiment described with reference to FIG. 12 is executed by using the touch pad 20 in place of the fingerprint sensor 14. For example, the start point area (area 90) of the fingerprint sensor 14 of FIG. 13 is a start point area (area 90) of the touch pad 20 in the second embodiment. Furthermore, for example, the end point areas (areas 91 to 98) of the fingerprint sensor 14 of FIG. 13 are end point areas (areas 91 to 98) of the touch pad 20 in the second embodiment.

In the second embodiment, the touch pad 20 is used to perform the tapping operation and the scrolling operation. Therefore, detailed shape data of the finger, the stylus, or the like and fingerprint information may not be included to detect the tapping operation and the scrolling operation. For example, in the case of the tapping operation, the contact of the finger, the stylus, or the like with the surface of the touch pad 20 can be detected. If the touch pad 20 adopts the resistance film system, a standard resistance value corresponding to a certain area at a level that can detect the contact of the finger, the stylus, or the like with the surface of the touch pad 20 can be detected. The amount of data for executing the detection process of the tapping operation and the scrolling operation can be reduced by using the touch pad 20.

The touch pad 20 may have a display function. For example, the touch pad 20 and a display apparatus may be integrated. Furthermore, for example, a touch panel with a contact detection function and a display function may be used in place of the touch pad 20. This can display, on the touch pad 20, the contact position in the tapping operation and the trajectory of the movement in the scrolling operation. The display of the contact position in the tapping operation and the trajectory of the movement in the scrolling operation on the touch pad 20 can provide the user with a feeling of security for the scrolling operation and can further improve the user interface.

Furthermore, for example, diagrams indicating the start point area (area 90) and the end point areas (areas 91 to 98) may be displayed on the touch pad 20. The user can recognize the diagrams indicating the start point area (area 90) and the end point areas (areas 91 to 98) displayed on the touch pad 20 as the start point area and the end pint areas of the scrolling operation. This can provide the user with a feeling of security for the scrolling operation and can further improve the user interface.

Detailed shape data of the finger, the stylus, or the like and fingerprint information may not be included to detect the tapping operation and the scrolling operation using the touch pad 20. Therefore, the fingerprint may not be imaged in the detection of the tapping operation and the scrolling operation, and the amount of data in the detection process of the tapping operation and the scrolling operation can be reduced.

In the second embodiment, the tapping operation and the scrolling operation can be performed by the finger, the stylus, or the like. Therefore, the convenience can be further improved for the user who wants to use the stylus rather than the finger.

According to the second embodiment, if the biometric authentication is NG, the touch pad 20 is used to perform the tapping operation and the scrolling operation to create the authentication information, and the key authentication is performed. If the key authentication is OK, the same process as when the biometric authentication is OK is executed. More specifically, the emulation of the pressing operation of the power supply button 16 is automatically performed, the power is supplied to the second processing apparatus 50, and the second processing apparatus 50 enters the activation state. Therefore, the power is supplied to the entire information processing apparatus 1, and the entire information processing apparatus 1 enters the activation state. According to the second embodiment, even if the biometric authentication is NG, the key authentication different from the biometric authentication can be performed to determine whether the user is the owner or the like of the information processing apparatus 1. As a result, if the key authentication is OK, the power can be supplied to the entire information processing apparatus 1 even if the biometric authentication is NG.

If the power is not supplied to the second processing apparatus 50, the power is not supplied to the display 10, the keyboard 12, and the like included in the information processing apparatus 1. Therefore, information is not displayed on the display 10, and the user is unable to perform the operation using the keyboard 12. Since the power is supplied to the touch pad 20 even under the condition that the power is not supplied to the display 10, the keyboard 12, and the like, whether the user is the owner or the like of the information processing apparatus 1 can be determined by performing the key authentication using the touch pad 20.

Third Embodiment

Hereinafter, the information processing apparatus 1 according to a third embodiment will be described with reference to FIGS. 23 to 26. Note that the same constituent elements as those of the first embodiment are designated with the same reference signs as those of the first embodiment, and the description will be omitted.

<Authentication Process (3)>

Figure 23:
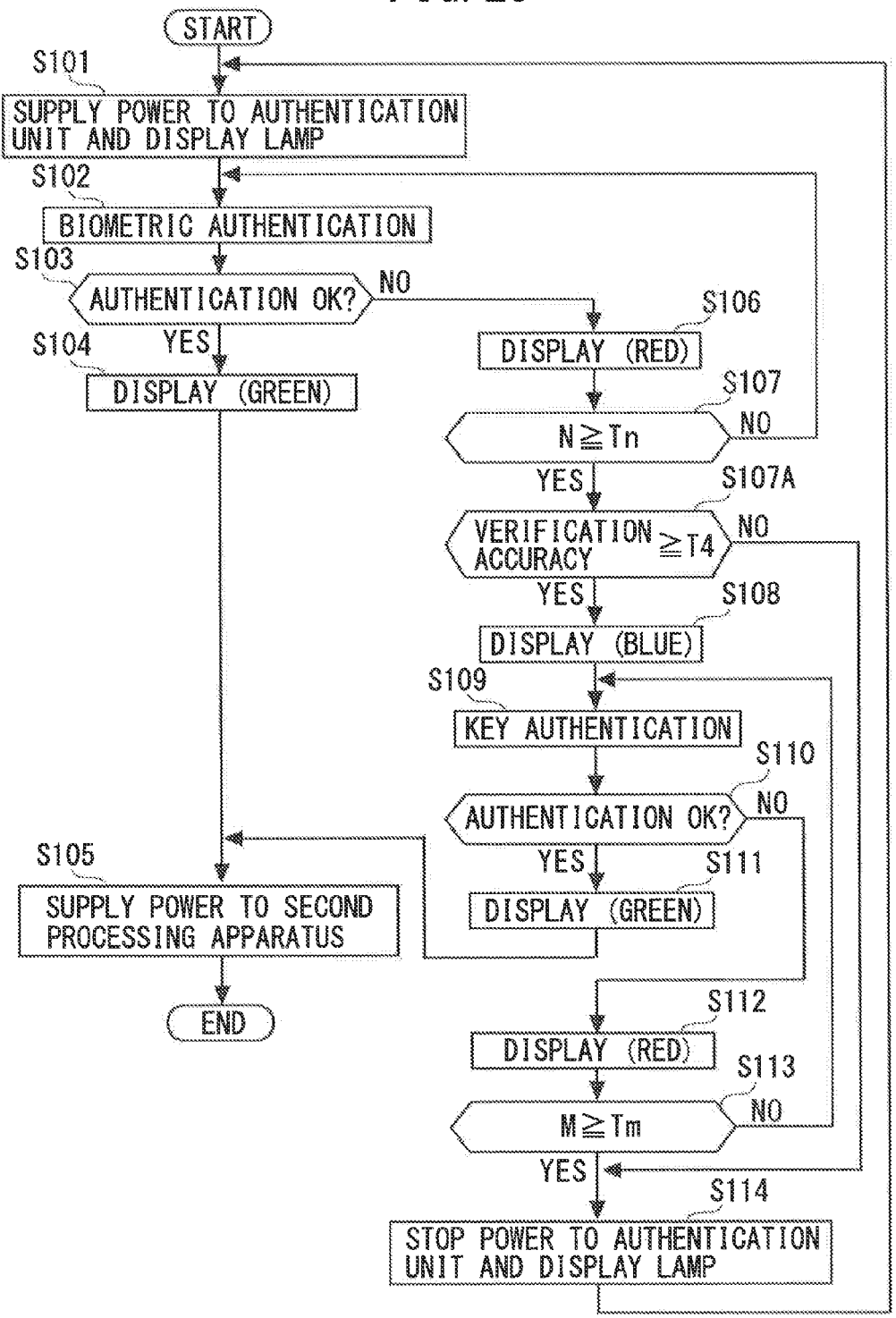
FIG. 23 is a diagram illustrating an example of the authentication processing flow (part 3) according to a third embodiment.

FIG. 23 is a diagram illustrating an example of the authentication processing flow (part 3) according to the third embodiment. Compared to the authentication processing flow (part 1) illustrated in FIG. 6, the authentication processing flow (part 3) illustrated in FIG. 23 is different in that the process proceeds to S107A of FIG. 23 if the number of times (N) of NG of the biometric authentication is equal to or greater than the predetermined number of times (Tn) (S107: YES). Hereinafter, processes in the authentication processing flow (part 3) illustrated in FIG. 23 different from the authentication processing flow (part 1) illustrated in FIG. 6 will be described. Note that the same as in the first embodiment, the authentication unit 420 determines whether the number of times (N) of NG of the biometric authentication is equal to or greater than the predetermined number of times (Tn) in S107 of FIG. 23.

If the number of times (N) of NG of the biometric authentication is equal to or greater than the predetermined number of times (Tn) (S107: YES), the process proceeds to S107A of FIG. 23. On the other hand, if the number of times (N) of NG of the biometric authentication is smaller than the predetermined number of times (Tn) (S107: NO), the process proceeds to S102 of FIG. 23, and the authentication unit 420 performs the biometric authentication again.

In S107A of FIG. 23, the authentication unit 420 determines whether verification accuracy is equal to or greater than a threshold T4. The verification accuracy is, for example, a relevance ratio (concordance rate) of the feature point of the biometric information extracted in the biometric authentication and the registered feature point of the biometric information. The determination method of the verification accuracy can be appropriately selected according to the system within a range that can supplement the biometric authentication accuracy.

Figures 24, 25:
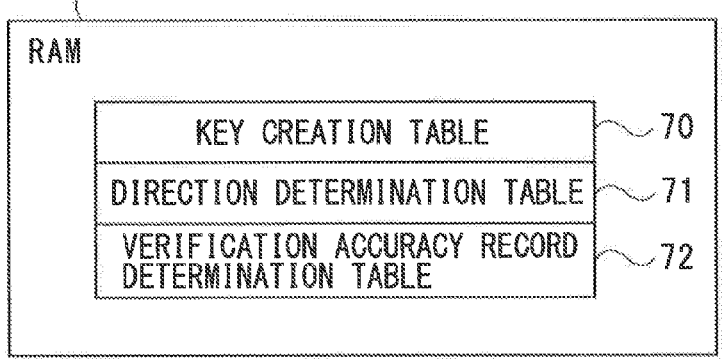
FIG. 24 is a diagram illustrating an example of tables created in the RAM 423.
FIG. 25 is a diagram illustrating an example of a verification accuracy record determination table 72 created in the RAM 423.

For example, the authentication unit 420 records the verification accuracy in a verification accuracy record determination table 72 of the RAM 423 every time the biometric authentication is NG. FIG. 24 is a diagram illustrating an example of the tables created (developed) in the RAM 423. As illustrated in FIG. 24, the key creation table 70, the direction determination table 71, and the verification accuracy record determination table 72 are created in the RAM 423. The authentication unit 420 calculates an average value of the verification accuracy recorded in the verification accuracy record determination table 72. More specifically, the authentication unit 420 calculates the average value of the verification accuracy for the number of times of NG of the biometric authentication. The authentication unit 420 determines whether the average value of the verification accuracy is equal to or greater than the threshold T4. With just one verification accuracy, the verification accuracy may be equal to or greater than the threshold T4 due to the biometric state, a contaminant attached to the living body, a scratch, or the like. Therefore, the average value of the verification accuracy for the number of times of NG of the biometric authentication can be used to prevent false authentication when the verification accuracy is a high value due to the reasons described above.

If the verification accuracy is equal to or greater than the threshold T4 (S107A: YES), the process proceeds to S108 of FIG. 23. On the other hand, if the verification accuracy is smaller than the threshold T4 (S107A: NO), the process proceeds to S114 of FIG. 23.

FIG. 25 is a diagram illustrating an example of the verification accuracy record determination table 72 created in the RAM 423. Here, the biometric authentication is OK if the verification accuracy is equal to or greater than 1.0, the threshold T4 is set to 0.7, and the predetermined number of times (Tn) is set to 3. In the fields of the upper row of the verification accuracy record determination table 72 illustrated in FIG. 25, the verification accuracy (0.9) in the first biometric authentication is recorded, the verification accuracy (0.5) in the second biometric authentication is recorded, and the verification accuracy (0.7) in the third biometric authentication is recorded. Since the number of times of NG of the biometric authentication (N=3) has reached the predetermined number of times (Tn=3), whether the verification accuracy is equal to or greater than the threshold T4 is determined. Since the average value of the verification accuracy is 0.7, it is determined that the verification accuracy is equal to or greater than the threshold T4, and the key authentication is permitted.

In the fields of the lower row of the verification accuracy record determination table 72 illustrated in FIG. 25, the verification accuracy (0.6) in the first biometric authentication is recorded, the verification accuracy (0.6) in the second biometric authentication is recorded, and the verification accuracy (0.8) in the third biometric authentication is recorded. Since the number of times of NG of the biometric authentication (N=3) has reached the predetermined number of times (Tn=3), whether the verification accuracy is equal to or greater than the threshold T4 is determined. Since the average value of the verification accuracy is 0.67, it is determined that the verification accuracy is smaller than the threshold T4, and the key authentication is not permitted.

Note that the authentication processing flow (part 3) according to the third embodiment may be applied to the information processing apparatus 1 according to the second embodiment. Furthermore, the authentication processing flow (part 3) of the third embodiment may be applied to the information processing apparatus 1 according to a fourth embodiment and a fifth embodiment described later.

<Authentication Process (4)>

Figure 26:
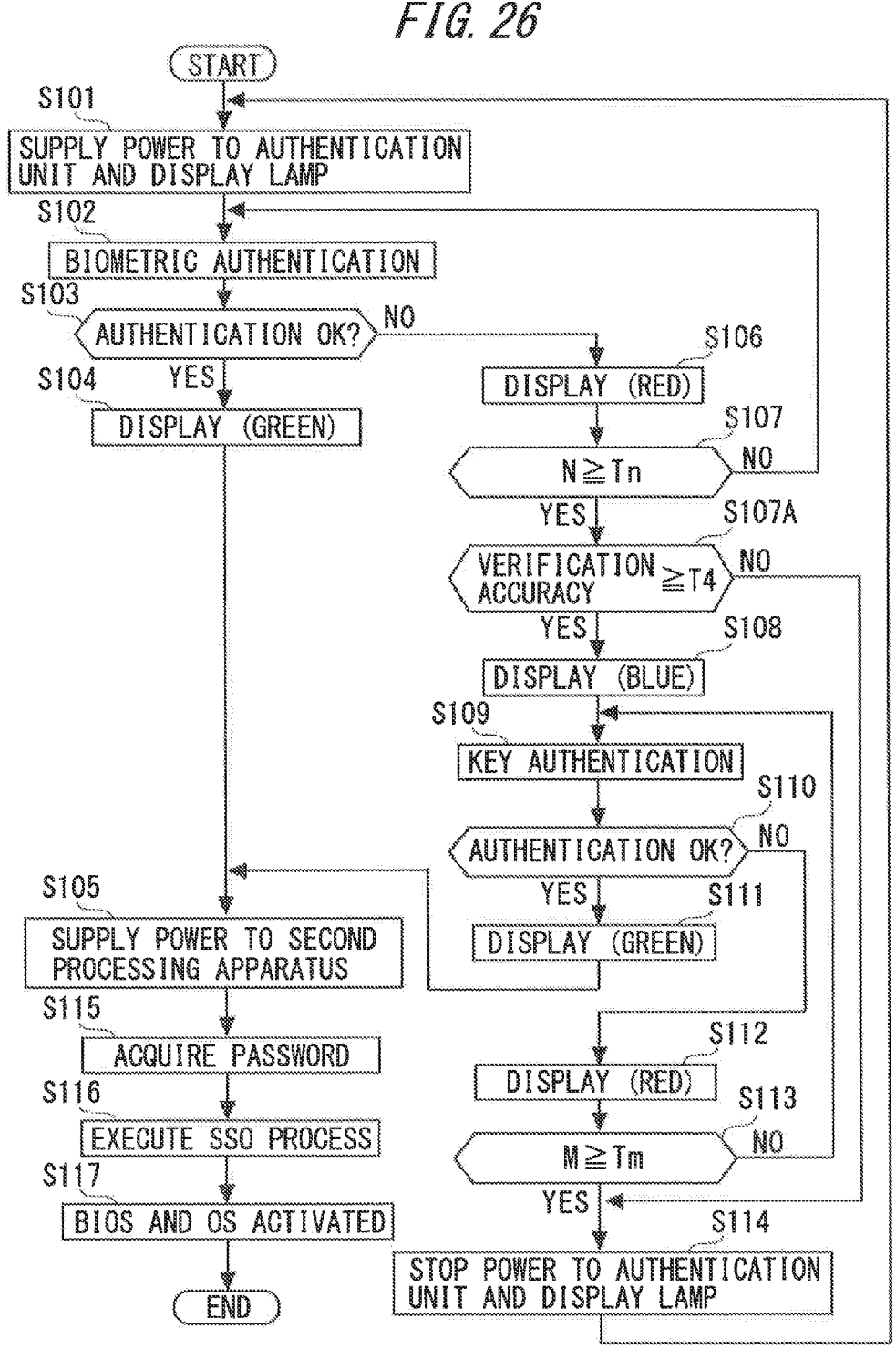
FIG. 26 is a diagram illustrating an example of the authentication processing flow (part 4) according to the third embodiment.

FIG. 26 is a diagram illustrating an example of the authentication processing flow (part 4) according to the third embodiment. Compared to the authentication processing flow (part 3) illustrated in FIG. 23, the authentication processing flow (part 4) illustrated in FIG. 26 is different in that processes of S115, S116, and S117 of FIG. 26 are executed after the process of S105 of FIG. 26 is executed.

The processes of S115, S116, and S117 of FIG. 26 are the same as the processes of S115, S116, and S117 of FIG. 18 described in the first embodiment, and the description will be omitted.

Note that the authentication processing flow (part 4) according to the third embodiment may be applied to the information processing apparatus 1 according to the second embodiment. Furthermore, the authentication processing flow (part 4) according to the third embodiment may be applied to the information processing apparatus 1 according to the fourth embodiment and the fifth embodiment described later.

Fourth Embodiment

Figure 27:
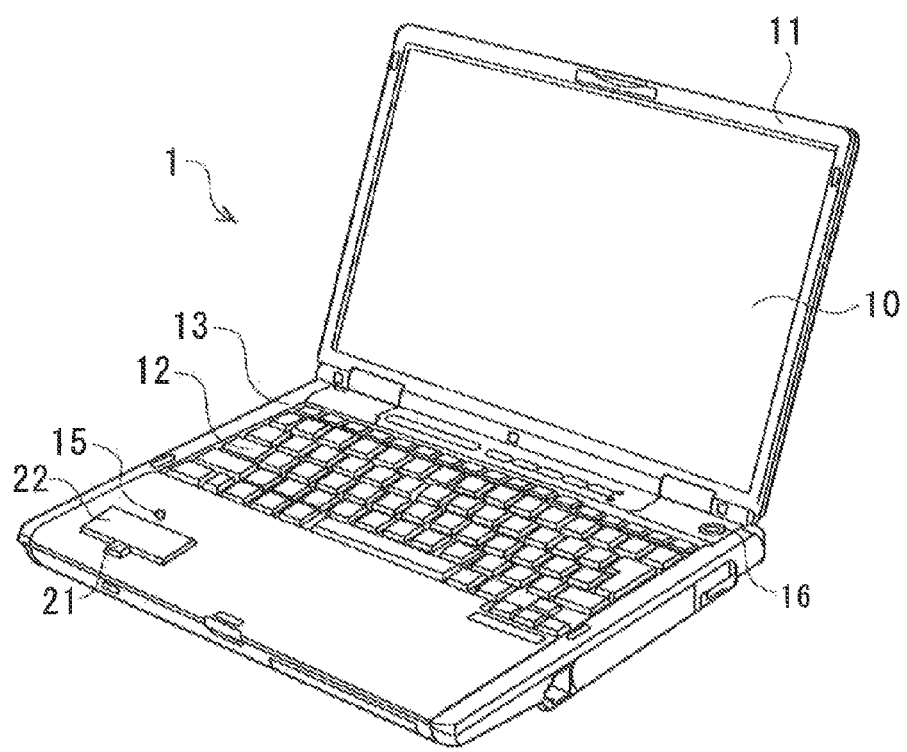
FIG. 27 is an external view of the information processing apparatus 1 according to a fourth embodiment.

Hereinafter, the information processing apparatus 1 according to the fourth embodiment will be described with reference to FIGS. 27 to 35. Note that the same constituent elements as those of the first embodiment are designated with the same reference signs as those of the first embodiment, and the description will be omitted. FIG. 27 is an external view of the information processing apparatus 1 according to the fourth embodiment. Although the information processing apparatus 1 is, for example, a notebook personal computer, the information processing apparatus 1 is not limited to the notebook personal computer, and the information processing apparatus 1 may be a laptop personal computer, a PDA (Personal Digital Assistance), a smartphone, a tablet terminal, a mobile phone, an electronic book, or the like.

As illustrated in FIG. 27, the information processing apparatus 1 includes the display 10, the display housing 11, the keyboard 12, the keyboard housing 13, the display lamp 15, the power supply button 16, a distance sensor 21, and a vein sensor 22. The display 10, the display housing 11, the keyboard 12, the keyboard housing 13, the display lamp 15, and the power supply button 16 are the same as those of the first embodiment.

Compared to the first embodiment, the fourth embodiment is different in that the distance sensor 21 and the vein sensor 22 are included in place of the fingerprint sensor 14. The other points are the same as those of the first embodiment, and the description will be omitted.

In the first embodiment, the fingerprint sensor 14 is used to detect the living body, and the fingerprint sensor 14 is used to perform the biometric authentication. Furthermore, in the first embodiment, the fingerprint sensor 14 is used to perform the tapping operation and the scrolling operation to create the authentication information, and the key authentication is performed. In the fourth embodiment, the distance sensor 21 is used to detect the living body, and the vein sensor 22 is used to perform the biometric authentication. Furthermore, in the fourth embodiment, the distance sensor 21 and the vein sensor 22 are used to perform the tapping operation and the scrolling operation to create the authentication information, and the key authentication is performed.

The distance sensor 21 is an apparatus that measures the distance from the distance sensor 21 to the object. A detection system, such as an infrared system and an ultrasonic system, may be adopted for the distance sensor 21. For example, an apparatus with integrated PSD (position sensitive detector), IRED (infrared light-emitting diode), and signal processing function may be used as the distance sensor 21. Furthermore, the distance sensor 21 may be a sensor in which the PSD (position sensitive detector), the IRED (infrared light-emitting diode), and the signal processing function are separated. Hereinafter, an example of the case in which the apparatus with integrated PSD, IRED, and signal processing function is used as the distance sensor 21 will be described.

In the distance sensor 21, the IRED directs an infrared ray to the object, and the PSD receives reflected light of the infrared ray. The distance sensor 21 converts the distance to the object into a voltage based on an incident angle of the reflected light of the infrared ray and outputs the voltage. Since the output voltage of the distance sensor 21 changes when the living body approaches the distance sensor 21, the distance sensor 21 detects the living body.

Figure 28:
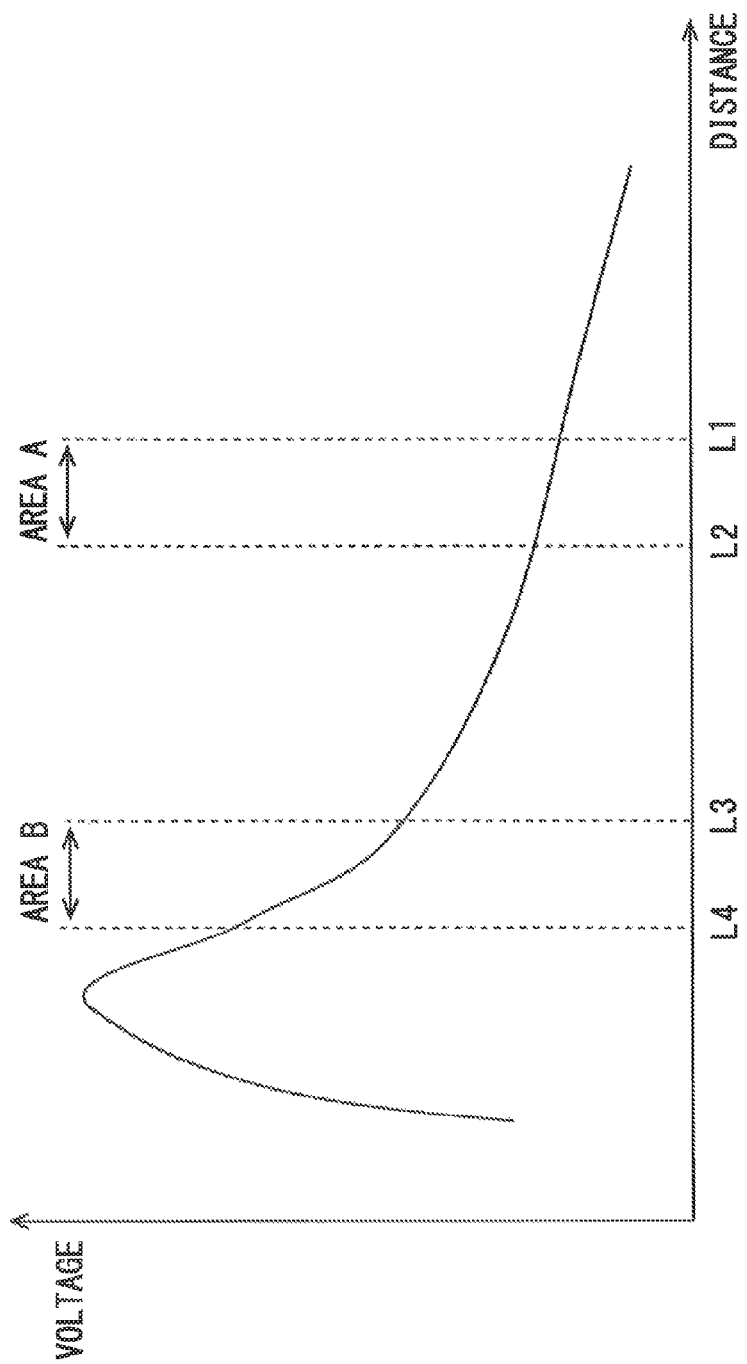
FIG. 28 is a graphic diagram illustrating a relationship between distance to an object and output voltage of a distance sensor 21.

FIG. 28 is a graphic diagram illustrating a relationship between the distance to the object and the output voltage of the distance sensor 21. The horizontal axis of FIG. 28 denotes the distance to the object, and the vertical axis of FIG. 28 denotes the output voltage of the distance sensor 21. As illustrated in FIG. 28, the output voltage is large if the distance to the object is close, and the output voltage is small if the distance to the object is far. Therefore, a voltage-distance characteristic curve illustrated in FIG. 28 can be used to measure the distance from the distance sensor 21 to the object based on the output voltage of the distance sensor 21.

A range between a predetermined distance L1 and a predetermined distance L2 illustrated in FIG. 28 is defined as an area A, and a range between a predetermined distance L3 and a predetermined distance L4 illustrated in FIG. 28 is defined as an area B. After a hand is placed on the area A, the hand enters the area B by bringing the hand close to the distance sensor 21. Subsequently, the hand is returned to the area A by moving the hand away from the distance sensor 21 to perform the tapping operation. More specifically, after the hand is moved from the area A to the area B, the hand is moved from the area B to the area A to perform the tapping operation. Moving the hand back and forth leads to single tapping. Continuously moving back and forth the hand twice leads to double tapping. Continuously moving the hand back and forth three times leads to triple tapping.

The vein sensor 22 is an apparatus that images the palm of the user to convert the veins of the imaged palm to image data. A light source that directs near-infrared light is arranged below the surface not illustrated of the vein sensor 22. Furthermore, a camera that images the palm is arranged below the surface not illustrated of the vein sensor 22. Reduced hemoglobin in the veins of subcutaneous tissue absorbs the near-infrared light. Therefore, when the near-infrared light is directed to the palm, the reflection is little at the parts with the veins, and a reticulated biometric image projected in a black color is obtained.

The feature point of the biometric information is extracted from the image of the palm taken by the vein sensor 22, and the extracted feature point of the biometric information and the registered feature point of the biometric information are verified. If the extracted feature point of the biometric information and the registered feature point of the biometric information satisfy a predetermined standard, the biometric authentication is OK. More specifically, the user who has held up the hand to the vein sensor 22 is authenticated as the owner of the information processing apparatus 1 or as a person permitted by the owner to use the information processing apparatus 1. If the biometric authentication is OK, the display lamp 15 lights the green color as a display indicating that the biometric authentication is OK. In the fourth embodiment, although the example of performing the biometric authentication by using the veins of the palm has been illustrated, the example is not limited to this, and other veins, such as veins of a finger and veins of a wrist, may be used to perform the biometric authentication.

In a state that the hand faces the vein sensor 22, the hand is moved in a predetermined direction to perform the scrolling operation. The movement direction of the hand can be determined by analyzing the image of the palm taken by the vein sensor 22 or an image of the back of the hand. For example, information, such as the contour of the hand and the positions of the roots of the fingers, is used to determine the center position of the palm or the back of the hand. The movement direction of the hand can be determined by obtaining the movement direction of the center position of the palm or the back of the hand. Although the example of performing the scrolling operation by using the hand has been illustrated in the fourth embodiment, the example is not limited to this, and other biometric sites, such as a finger and a wrist, may be used to perform the scrolling operation.

Figure 29:
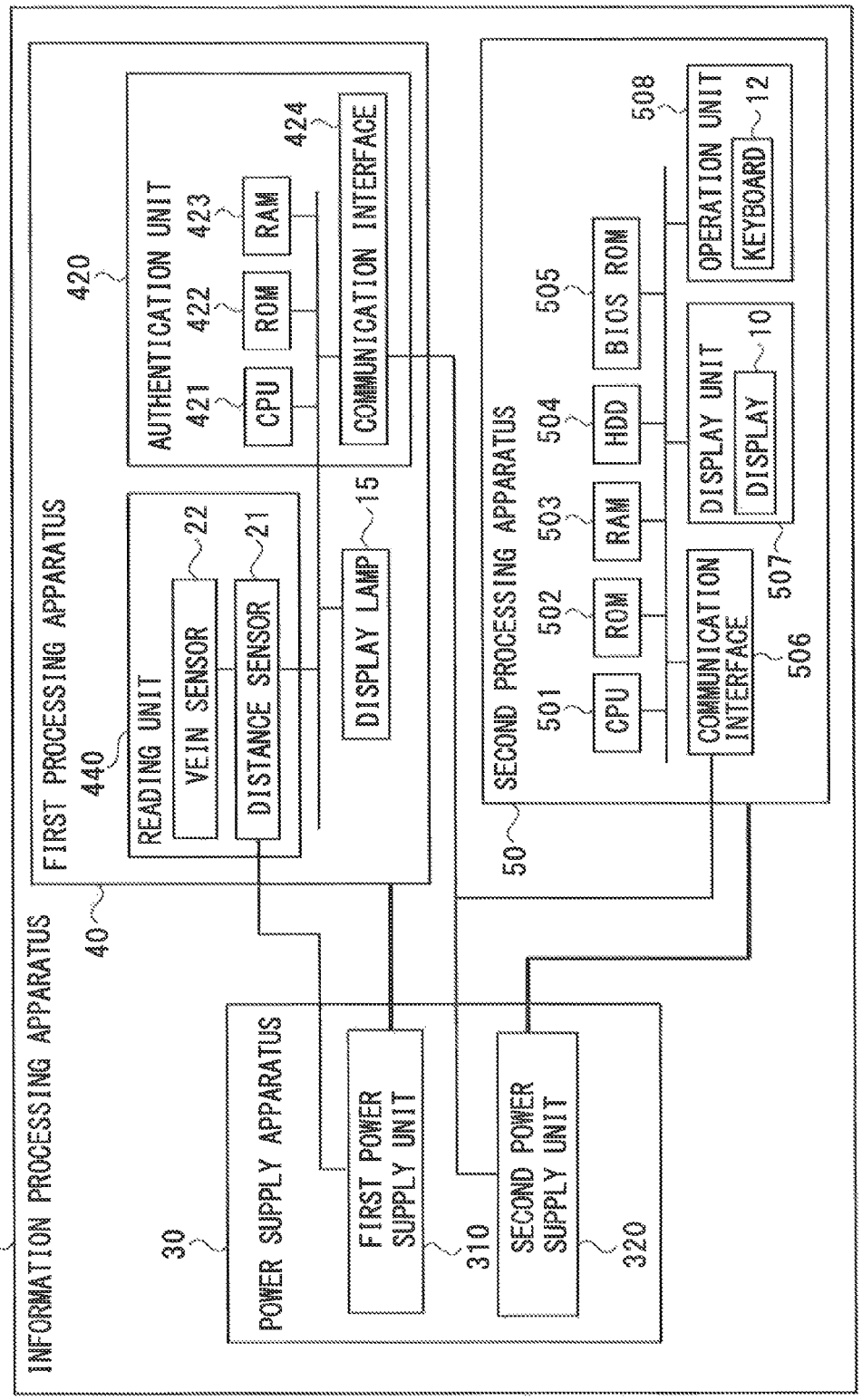
FIG. 29 is a diagram illustrating a configuration example of the information processing apparatus 1 according to the fourth embodiment.

FIG. 29 is a diagram illustrating a configuration example of the information processing apparatus 1 according to the fourth embodiment. As illustrated in FIG. 29, the information processing apparatus 1 includes the power supply apparatus 30, the first processing apparatus 40, and the second processing apparatus 50.

Compared to the information processing apparatus 1 according to the first embodiment, the information processing apparatus 1 according to the fourth embodiment is different in that a reading unit 440 is included in place of the reading unit 410. The other parts are the same as those of the first embodiment, and the description will be omitted. The reading unit 440 includes the distance sensor 21 and the vein sensor 22. The functional configuration of the information processing apparatus 1 according to the fourth embodiment is the same as the functional configuration according to the first embodiment, and the description will be omitted.

<Authentication Process>

In an authentication process of the fourth embodiment, a process substantially the same as the authentication process according to the first embodiment described with reference to FIG. 6 is executed. Hereinafter, processes different from the authentication processing flow (part 1) according to the first embodiment illustrated in FIG. 6 will be described.

In S101 of FIG. 6, as the hand approaches the distance sensor 21, the distance sensor 21 detects the living body, and power is supplied to the authentication unit 420 and the display lamp 15. The first power supply unit 310 supplies power to the reading unit 440, and when the distance sensor 21 detects the living body, the distance sensor 21 transmits a control signal to the first power supply unit 310. When the control signal is received from the distance sensor 21, the first power supply unit 310 supplies power to the authentication unit 420 and the display lamp 15. Furthermore, the first power supply unit 310 may put the authentication unit 420 into a standby state or a resting state and switch the authentication unit 420 to an activation state when the distance sensor 21 detects the living body.

In S102 of FIG. 6, the authentication unit 420 performs biometric authentication. An example of the biometric authentication by the authentication unit 420 will be illustrated below.

The authentication unit 420 controls the vein sensor 22 to image the palm. Specifically, the CPU 421 of the authentication unit 420 controls the vein sensor 22 based on the biometric reading program 60 stored in the ROM 422. The palm is held up to the vein sensor 22, and the vein sensor 22 images the palm. The authentication unit 420 stores an image of the palm taken by the vein sensor 22 in the RAM 423. Specifically, the CPU 421 of the authentication unit 420 stores the image of the palm taken by the vein sensor 22 in the RAM 423 based on the biometric reading program 60 stored in the ROM 422.

The authentication unit 420 extracts the feature point of the biometric information from the image of the palm stored in the RAM 423. Specifically, the CPU 421 of the authentication unit 420 extracts the feature point of the biometric information from the image of the palm stored in the RAM 423 based on the biometric feature extraction program 61 stored in the ROM 422. The feature point of the biometric information is, for example, a pattern of veins of the palm.

The authentication unit 420 verifies the extracted feature point of the biometric information and the registered feature point of the biometric information. Specifically, the CPU 421 of the authentication unit 420 verifies the extracted feature point of the biometric information and the registered feature point of the biometric information based on the biometric verification program 62 stored in the ROM 422. The registered feature point of the biometric information is registered in advance in the biometric information feature database 68 stored in the ROM 422.

In the authentication process of the fourth embodiment, the same processes as those of the first embodiment are executed in S103 to S107 of FIG. 6. In S108 of FIG. 6, the authentication unit 420 switches the distance sensor 21 and the vein sensor 22 to a mode that can detect the tapping operation and the scrolling operation. Furthermore, in S108 of FIG. 6, the display lamp 15 lights the blue color as a display indicating that the distance sensor 21 and the vein sensor 22 are switched to the mode that can detect the tapping operation and the scrolling operation. In the authentication process of the fourth embodiment, the same processes as those of the first embodiment are executed in S109 to S114 of FIG. 6.

<Creation Process of Authentication Information (Key Information)>

Figure 30:
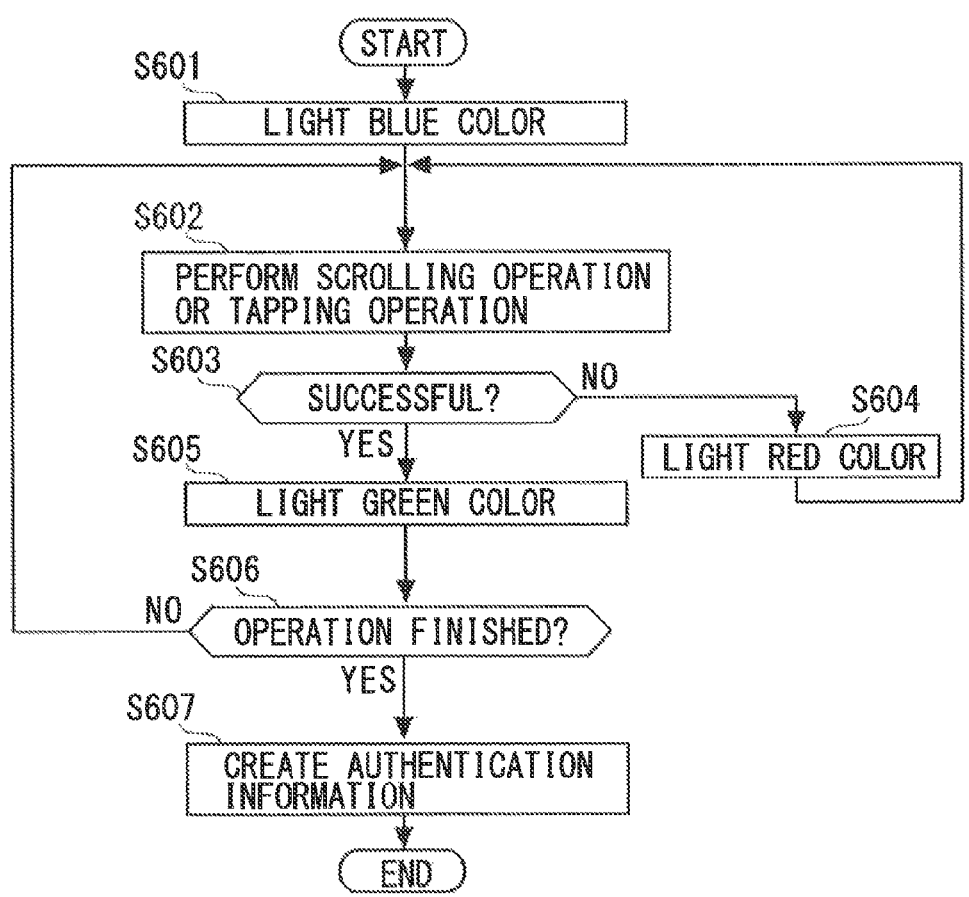
FIG. 30 is a diagram illustrating an example of a creation processing flow of authentication information.

A creation process of the authentication information (key information) in the fourth embodiment will be described with reference to FIG. 30. FIG. 30 is a diagram illustrating an example of a creation processing flow of the authentication information. In S601 of FIG. 30, the display lamp 15 lights the blue color. As the display lamp 15 lights the blue color, the user recognizes that the distance sensor 21 and the vein sensor 22 are switched to the mode of accepting the tapping operation and the scrolling operation.

Figure 31:
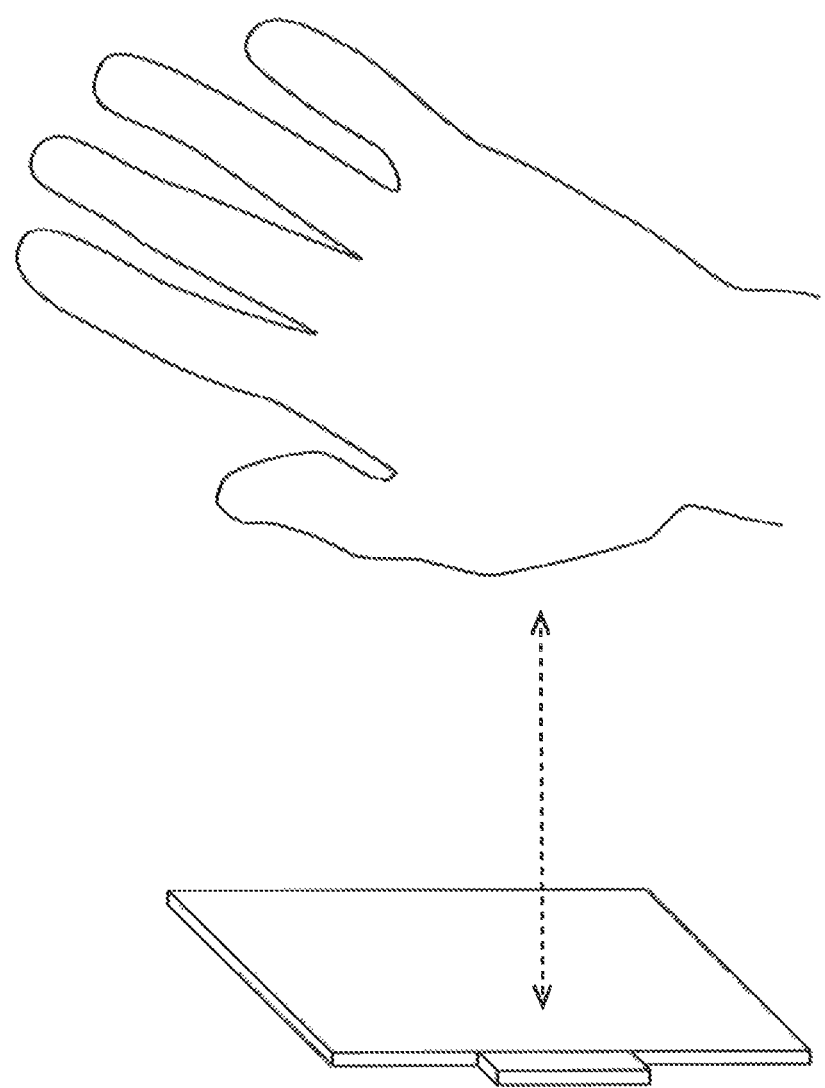
FIG. 31 is an explanatory view of tapping operation.

In S602 of FIG. 30, the user performs the tapping operation or the scrolling operation. FIG. 31 is an explanatory view of the tapping operation. The user performs the tapping operation by moving the hand back and forth in a short time between an area A above the distance sensor 21 (hereinafter, described as predetermined area A) and an area B above the distance sensor 21 (hereinafter, described as predetermined area B). More specifically, the user performs the tapping operation by moving the hand back and forth in the vertical direction above the distance sensor 21. The predetermined area A and the predetermined area B are areas at predetermined distances away from the distance sensor 21. The predetermined area B is at a position closer from the distance sensor 21 compared to the predetermined area A. The user performs single tapping by moving the hand back and forth once between the predetermined area A and the predetermined B in a short time. The user performs double tapping by moving the hand back and forth twice between the predetermined area A and the predetermined B in a short time. The user performs triple tapping by moving the hand back and forth three times between the predetermined area A and the predetermined area B in a short time.

FIG. 32 is an explanatory view of the scrolling operation. The user performs the scrolling operation by moving the hand in a predetermined direction in a state that the palm or the back of the hand faces the vein sensor 22. The predetermined direction is a direction parallel to the upper surface of the vein sensor 22. As illustrated in FIG. 32, when eight directions (N: north, NE: north east, E: east, SE: south east, S: south, SW: south west, W: west, and NW: north west) are set as the movement directions of the hand, the hand is moved in one of the eight directions in a state that the palm or the back of the hand faces the vein sensor 22. For example, the hand is moved in the direction N illustrated in FIG. 32 in a state that the palm or the back of the hand faces the vein sensor 22.

In S603 of FIG. 30, the authentication unit 420 determines whether the tapping operation or the scrolling operation is performed. The CPU 421 of the authentication unit 420 determines whether the tapping operation or the scrolling operation is performed by detecting the tapping operation or the scrolling operation based on the operation detection program 63 stored in the ROM 422. For example, when the hand is moved back and forth between the predetermined area A and the predetermined area B within a certain time, the authentication unit 420 determines that the tapping operation is performed. In this case, the authentication unit 420 determines that the tapping operation is performed by one of the single tapping and the double tapping. The determination of the single tapping or the double tapping by the authentication unit 420 will be described later.

For example, when the hand passes a predetermined end point area within a certain time from a predetermined area (start point area of scrolling operation) above the vein sensor 22, the authentication unit 420 determines that the scrolling operation is performed. For example, when the hand is not moved within a certain time from the predetermine area above the distance sensor 21 and the vein sensor 22, the authentication unit 420 determines that the tapping operation or the scrolling operation is not performed.

If the tapping operation or the scrolling operation is not performed (S603: NO), the process proceeds to S604 of FIG. 30. In S604 of FIG. 30, the display lamp 15 lights the red color. As the display lamp 15 lights the red color, the user recognizes that the tapping operation or the scrolling operation is not accepted. After a lapse of a certain time, the display lamp 15 finishes lighting the red color. The process proceeds to S602 of FIG. 30, and the user performs the tapping operation or the scrolling operation again.

On the other hand, if the tapping operation or the scrolling operation is performed (S603: YES), the process proceeds to S605 of FIG. 30. In S605 of FIG. 30, the display lamp 15 lights the green color. As the display lamp 15 lights the green color, the user recognizes that the tapping operation or the scrolling operation is normally accepted.

Furthermore, in S605 of FIG. 30, the authentication unit 420 registers the identification sign corresponding to the type of the tapping operation or the identification sign corresponding to the movement direction of the hand in the scrolling operation in the key creation table 70 of the RAM 423. Specifically, the CPU 421 of the authentication unit 420 performs the registration in the key creation table 70 of the RAM 423 based on the key creation program 64 stored in the ROM 422. The values in ( ) illustrated in FIG. 32 are the identification signs corresponding to the movement directions of the hand.

After the process of S605 of FIG. 30 is executed, the display lamp 15 finishes lighting the green color, and the process proceeds to S606 of FIG. 30. In S606 of FIG. 30, the authentication unit 420 determines whether the tapping operation and scrolling operation are finished. For example, the authentication unit 420 may determine that the tapping operation and the scrolling operation are finished when the tapping operation and the scrolling operation are not executed for a certain time.

If the tapping operation and the scrolling operation are finished (S606: YES), the process proceeds to S607 of FIG. 30. On the other hand, if the tapping operation and the scrolling operation are not finished (S606: NO), the process proceeds to S602 of FIG. 30, and the user performs the tapping operation or the scrolling operation. An example of the key creation table 70 is the same as that of FIG. 10 illustrated in the first embodiment.

In S607 of FIG. 30, the authentication unit 420 creates authentication information. The authentication unit 420 creates the authentication information by sequentially arranging the identification signs registered in the fields of the tapping operation and the scrolling operation of the key creation table 70 of the RAM 423. After the process of S607 of FIG. 30 is executed, the creation processing flow of the authentication information ends.

The user can arbitrarily set the number of times of the tapping operation and the number of times of the scrolling operation. Furthermore, the authentication information may be created by combining the tapping operation and the scrolling operation, the authentication information may be created by performing only the tapping operation, or the authentication information may be created by performing only the scrolling operation.

If the user desires to initialize the key authentication due to a failure of the tapping operation or the scrolling operation, the user performs predetermined specific operation. The predetermined specific operation is, for example, tapping operation by triple tapping. The key authentication is initialized by performing the predetermined specific operation, and the user can perform the tapping operation or the scrolling operation again from the beginning.

<Detection Process of Tapping Operation>

Figure 33:
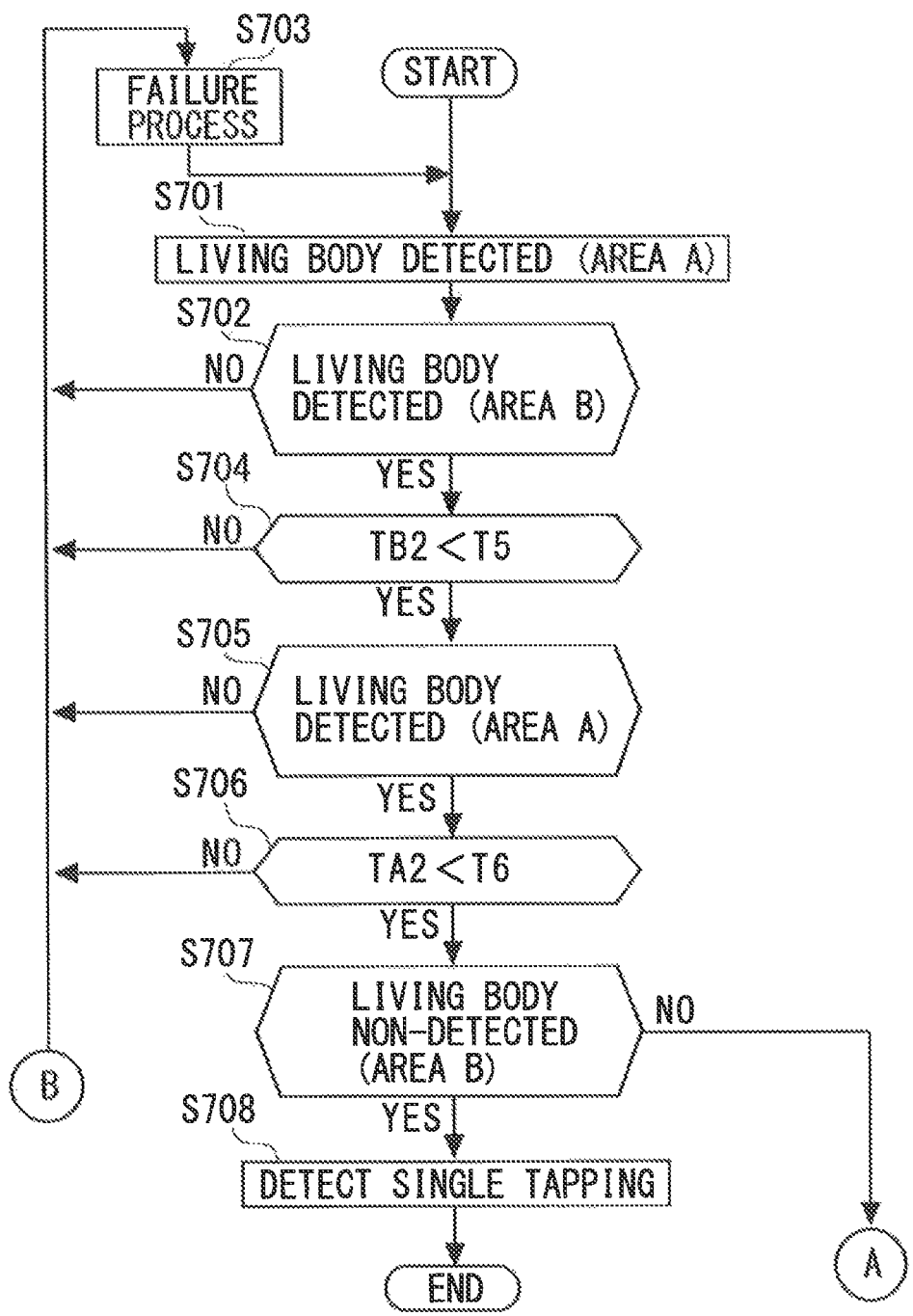
FIG. 33 is a diagram illustrating an example of a flow of a detection process of the tapping operation.
Figure 34:
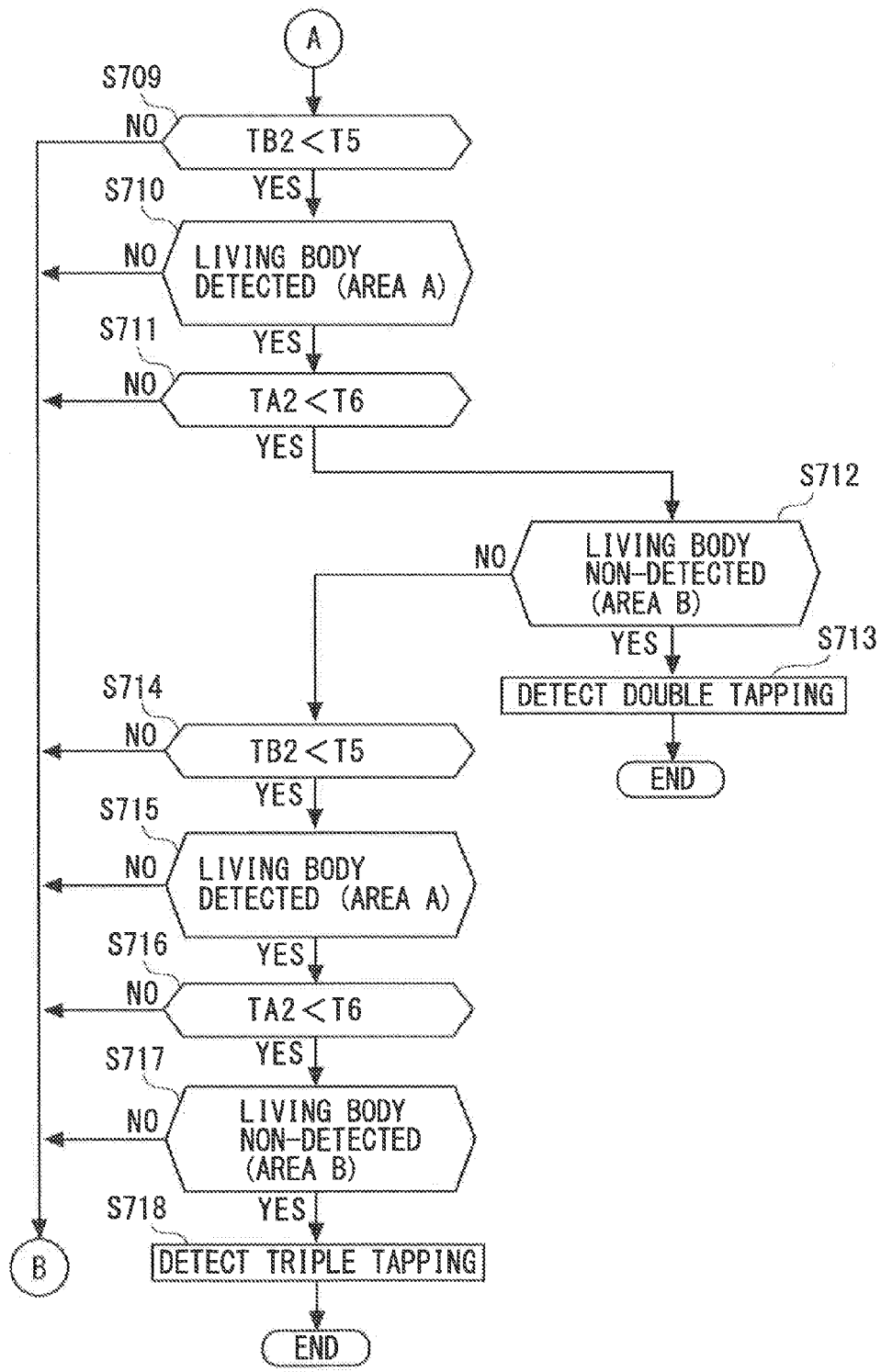
FIG. 34 is a diagram illustrating an example of the flow of the detection process of the tapping operation.

A detection process of the tapping operation will be described with reference to FIGS. 33 and 34. FIGS. 33 and 34 are diagrams illustrating an example of a flow of the detection process of the tapping operation. In S701 of FIG. 33, as the user places the hand on the predetermined area A, the distance sensor 21 detects the living body in the predetermined area A. Subsequently, the user moves the hand placed on the predetermined area A to bring the hand closer to the distance sensor 21.

In S702 of FIG. 33, the authentication unit 420 determines whether the living body is detected in the predetermined area B. If the hand exists in the predetermined area B, the distance sensor 21 detects the living body in the predetermined area B. The distance sensor 21 transmits a detection signal B to the authentication unit 420 if the living body in the predetermined area B is detected. The authentication unit 420 determines that the living body is detected in the predetermined area B if the detection signal B is received from the distance sensor 21.

If the hand exists in an area C above the distance sensor 21 (hereinafter, described as predetermined area C), the distance sensor 21 detects the living body in the predetermined area C. The distance sensor 21 transmits a detection signal C to the authentication unit 420 if the living body in the predetermined area C is detected. The authentication unit 420 determines that the living body is not detected in the predetermined area B if the detection signal C is received from the distance sensor 21. The predetermined area C is another area different from the predetermined area B, and for example, the predetermined area C is at a position farther from the distance sensor 21 compared to the predetermined area A.

If the living body is not detected in the predetermined area B (S702 of FIG. 33: NO), the process proceeds to S703 of FIG. 33. In S703 of FIG. 33, the authentication unit 420 executes a failure process. Specifically, the authentication unit 420 controls the display lamp 15, and the display lamp 15 lights the red color. After the process of S703 of FIG. 33 is executed, the process proceeds to S701 of FIG. 33. As the display lamp 15 lights the red color, the user recognizes that the tapping operation is not accepted, and the user performs the tapping operation again.

On the other hand, if the living body is detected in the predetermined area B (S702 of FIG. 33: YES), the process proceeds to S704 of FIG. 33. In S704 of FIG. 33, the authentication unit 420 determines whether an elapsed time TB2 from the detection of the living body in the predetermined area A to the detection of the living body in the predetermined area B is smaller than a threshold T5. More specifically, the authentication unit 420 determines whether the movement time (elapsed time TB2) of the hand from the predetermined area A to the predetermined area B is smaller than the threshold T5.

If the elapsed time TB2 is larger than the threshold T5 (S704 of FIG. 33: NO), the process proceeds to S703 of FIG. 33. On the other hand, if the elapsed time TB2 is smaller than the threshold T5 (S704 of FIG. 33: YES), the process proceeds to S705 of FIG. 33. The user moves the hand so that the distance between the hand and the distance sensor 21 becomes long.

In S705 of FIG. 33, the authentication unit 420 determines whether the living body is detected in the predetermined area A. If the hand exists in the predetermined area A, the distance sensor 21 detects the living body in the predetermined area A. The distance sensor 21 transmits a detection signal A to the authentication unit 420 if the living body in the predetermined area A is detected. The authentication unit 420 determines that the living body is detected in the predetermined area A if the detection signal A is received from the distance sensor 21.

If the hand exists in an area D above the distance sensor 21 (hereinafter, described as predetermined area D), the distance sensor 21 detects the living body in the predetermined area D. The distance sensor 21 transmits a detection signal D to the authentication unit 420 if the living body in the predetermined area D is detected. The authentication unit 420 determines that the living body is not detected in the predetermined area A if the detection signal D is received from the distance sensor 21. The predetermined area D is another area different from the predetermined area A, and for example, the predetermined area D is at a position closer to the distance sensor 21 compared to the predetermined area B.

If the living body is not detected in the predetermined area A (S705 of FIG. 33: NO), the process proceeds to S703 of FIG. 33. On the other hand, if the living body is detected in the predetermined area A (S705 of FIG. 33: YES), the process proceeds to S706 of FIG. 33. In S706 of FIG. 33, the authentication unit 420 determines whether an elapsed time TA2 from the detection of the living body in the predetermined area B to the detection of the living body in the predetermined area A is smaller than a threshold T6. More specifically, the authentication unit 420 determines whether the movement time (elapsed time TA2) of the hand from the predetermined area B to the predetermined area A is smaller than the threshold T6.

If the elapsed time TA2 is larger than the threshold T6 (S706 of FIG. 33: NO), the process proceeds to S703 of FIG. 33. On the other hand, if the elapsed time TA2 is smaller than the threshold T6 (S706 of FIG. 33: YES), the process proceeds to S707 of FIG. 33.

In S707 of FIG. 33, the authentication unit 420 determines whether the living body is non-detected in the predetermined area B for equal to or more than a certain time. If the living body is non-detected in the predetermined area B for equal to or more than the certain time (S707 of FIG. 33: YES), the process proceeds to S708 of FIG. 33. In S708 of FIG. 33, the authentication unit 420 detects single tapping. More specifically, the authentication unit 420 detects that the tapping operation is performed by the single tapping. The user places the hand on the predetermined area A for equal to or more than a certain time or moves the hand to an area different from the predetermined area B to perform the tapping operation by the single tapping.

On the other hand, if the living body is not non-detected in the predetermined area B for equal to or more than the certain time, that is, if the living body is detected in the predetermined area B within the certain time (S707 of FIG. 33: NO), the process proceeds to S709 of FIG. 34. In S709 of FIG. 34, the authentication unit 420 determines whether the elapsed time TB2 from the detection of the living body in the predetermined area A to the detection of the living body in the predetermined area B is smaller than the threshold T5. More specifically, the authentication unit 420 determines whether the movement time (elapsed time TB2) of the hand from the predetermined area A to the predetermined area B is smaller than the threshold T5.

If the elapsed time TB2 is larger than the threshold T5 (S709 of FIG. 34: NO), the process proceeds to S703 of FIG. 33. On the other hand, if the elapsed time TB2 is smaller than the threshold T5 (S709 of FIG. 34: YES), the process proceeds to S710 of FIG. 34. In S710 of FIG. 34, the authentication unit 420 determines whether the living body is detected in the predetermined area A.

If the living body is not detected in the predetermined area A (S710 of FIG. 34: NO), the process proceeds to S703 of FIG. 33. On the other hand, if the living body is detected in the predetermined area A (S710 of FIG. 34: YES), the process proceeds to S711 of FIG. 34. In S711 of FIG. 34, the authentication unit 420 determines whether the elapsed time TA2 from the detection of the living body in the predetermined area B to the detection of the living body in the predetermined area A is smaller than the threshold T6. More specifically, the authentication unit 420 determines whether the movement time (elapsed time TA2) of the hand from the predetermined area B to the predetermined area A is smaller than the threshold T6.

If the elapsed time TA2 is larger than the threshold T6 (S711 of FIG. 34: NO), the process proceeds to S703 of FIG. 33. On the other hand, if the elapsed time TA2 is smaller than the threshold T6 (S711 of FIG. 34: YES), the process proceeds to S712 of FIG. 34.

In S712 of FIG. 34, the authentication unit 420 determines whether the living body is non-detected in the predetermined area B for equal to or more than a certain time. If the living body is non-detected in the predetermined area B for equal to or more than the certain time (S712 of FIG. 34: YES), the process proceeds to S713 of FIG. 34. In S713 of FIG. 34, the authentication unit 420 detects double tapping. More specifically, the authentication unit 420 detects that the tapping operation is performed by the double tapping. The user places the hand on the predetermined area A for equal to or more than a certain time or moves the hand to an area different from the predetermined area B to perform the tapping operation by the double tapping.

On the other hand, if the living body is not non-detected in the predetermined area B for equal to or more than the certain time, that is, if the living body is detected in the predetermined area B within the certain time (S712 of FIG. 34: NO), the process proceeds to S714 of FIG. 34. In S714 of FIG. 34, the authentication unit 420 determines whether the elapsed time TB2 from the detection of the living body in the predetermined area A to the detection of the living body in the predetermined area B is smaller than the threshold T5. More specifically, the authentication unit 420 determines whether the movement time (elapsed time TB2) of the hand from the predetermined area A to the predetermined area B is smaller than the threshold T5.

If the elapsed time TB2 is larger than the threshold T5 (S714 of FIG. 34: NO), the process proceeds to S703 of FIG. 33. On the other hand, if the elapsed time TB2 is smaller than the threshold T5 (S714 of FIG. 34: YES), the process proceeds to S715 of FIG. 34. In S715 of FIG. 34, the authentication unit 420 determines whether the living body is detected in the predetermined area A.

If the living body is not detected in the predetermined area A (S715 of FIG. 33: NO), the process proceeds to S703 of FIG. 33. On the other hand, if the living body is detected in the predetermined area A (S715 of FIG. 34: YES), the process proceeds to S716 of FIG. 34. In S716 of FIG. 34, the authentication unit 420 determines whether the elapsed time TA2 from the detection of the living body in the predetermined area B to the detection of the living body in the predetermined area A is smaller than the threshold T6. More specifically, the authentication unit 420 determines whether the movement time (elapsed time TA2) of the hand from the predetermined area B to the predetermined area A is smaller than the threshold T6.

If the elapsed time TA2 is larger than the threshold T6 (S716 of FIG. 34: NO), the process proceeds to S703 of FIG. 33. On the other hand, if the elapsed time TA2 is smaller than the threshold T6 (S716 of FIG. 34: YES), the process proceeds to S717 of FIG. 34.

In S717 of FIG. 34, the authentication unit 420 determines whether the living body is non-detected in the predetermined area B for equal to or more than a certain time. If the living body is non-detected in the predetermined area B for equal to or more than a certain time (S717 of FIG. 34: YES), the process proceeds to S718 of FIG. 34. In S718 of FIG. 34, the authentication unit 420 detects triple tapping. More specifically, the authentication unit 420 detects that the tapping operation is performed by the triple tapping. The user places the hand on the predetermined area A for equal to or more than a certain time or moves the hand to an area different from the predetermined area B to perform the tapping operation by the triple tapping.

On the other hand, if the living body is not non-detected in the predetermined area B for equal to or more than the certain time, that is, if the living body is detected in the predetermined area B within the certain time (S717 of FIG. 34: NO), the process proceeds to S703 of FIG. 33.

Although the example of detecting the tapping operation by using the distance sensor 21 has been described, the example is not limited to this, and the tapping operation may be detected by using the distance sensor 21 and the vein sensor 22. Detection of the tapping operation at a higher accuracy is possible by using the distance sensor 21 and the vein sensor 22. Furthermore, the tapping operation may be detected by using the vein sensor 22, without using the distance sensor 21.

When the living body is placed at a predetermined height (H1) above the vein sensor 22, the size of the living body imaged by the vein sensor 22 is "A". If the living body is placed at a predetermined height (H2) above the vein sensor 22, the size of the living body imaged by the vein sensor 22 is "B". The predetermined height (H1) above the vein sensor 22 is higher than the predetermined height (H2) above the vein sensor 22. The authentication unit 420 may detect a change in the size of the living body imaged by the vein sensor 22 from "B" to "A" after the size is changed from "A" to "B", within a certain time. In this case, the authentication unit 420 determines that the tapping operation is performed. If the living body is a hand, the size of the living body can be calculated based on information such as the contour of the hand and the positions of the roots of the fingers. Since the living body is moved in the vertical direction above the vein sensor 22 in the tapping operation, the shape of the living body at the predetermined height (H1) above the vein sensor 22 and the shape of the living body at the predetermined height (H2) above the vein sensor 22 are in a similarity relationship. Therefore, the difference between the size "A" of the living body and the size "B" of the living body can be calculated.

<Registration of Feature Point of Biometric Information>

In a registration process of the feature point of the biometric information in the fourth embodiment, substantially the same process as the registration process of the feature point of the biometric information in the first embodiment is executed. The fourth embodiment is different from the first embodiment in that the registration process of the feature point of the biometric information is executed by using the vein sensor 22 in place of the fingerprint sensor 14. In the registration process of the feature point of the biometric information in the fourth embodiment, the feature point of the biometric information is extracted from the image of the palm taken by the vein sensor 22, and the feature point of the biometric information is registered in the biometric information feature database 68 stored in the ROM 422.

Detailed shape data of the hand or vein information may not be included to detect the tapping operation and the scrolling operation. Therefore, in the detection of the tapping operation and the scrolling operation, the size of the image area taken by the vein sensor 22 can be reduced, and the amount of data for processing the taken image can be reduced.

According to the fourth embodiment, if the biometric authentication is NG, the distance sensor 21 and the vein sensor 22 are used to perform the tapping operation and the scrolling operation to create the authentication information, and the key authentication is performed. If the key authentication is OK, the same process as when the biometric authentication is OK is executed. More specifically, the emulation of the pressing operation of the power supply button 16 is automatically performed, power is supplied to the second processing apparatus 50, and the second processing apparatus 50 enters the activation state. Therefore, the power is supplied to the entire information processing apparatus 1, and the entire information processing apparatus 1 enters the activation state. According to the fourth embodiment, even if the biometric authentication is NG, the key authentication different from the biometric authentication can be performed to determine whether the user is the owner or the like of the information processing apparatus 1. As a result, if the key authentication is OK, the power can be supplied to the entire information processing apparatus 1 even if the biometric authentication is NG.

If the power is not supplied to the second processing apparatus 50, the power is not supplied to the display 10, the keyboard 12, and the like included in the information processing apparatus 1. Therefore, information is not displayed on the display 10, and the user is unable to perform operation using the keyboard 12. Since the power is supplied to the distance sensor 21 and the vein sensor 22 even under the condition that the power is not supplied to the display 10, the keyboard 12, and the like, whether the user is the owner or the like of the information processing apparatus 1 can be determined by performing the key authentication using the distance sensor 21 and the vein sensor 22.

Modified Example

Figure 35:
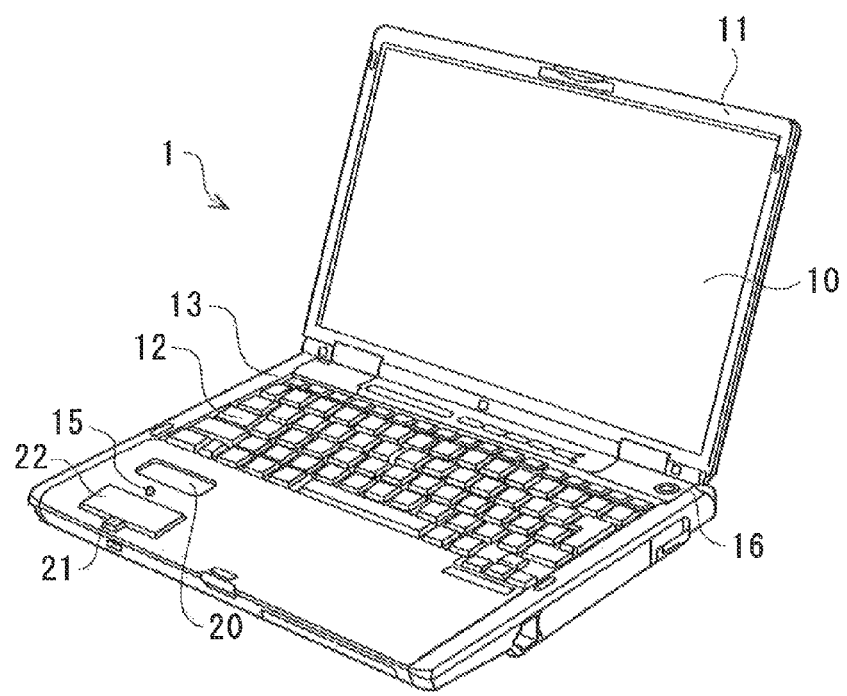
FIG. 35 is an external view of the information processing apparatus 1 according to a modified example of the fourth embodiment.

Hereinafter, the information processing apparatus 1 according to a modified example of the fourth embodiment will be described with reference to FIG. 35. Note that the same constituent elements as those of the first to fourth embodiments are designated with the same reference signs as those of the first to fourth embodiments, and the description will be omitted. FIG. 35 is an external view of the information processing apparatus 1 according to the modified example of the fourth embodiment. Although the information processing apparatus 1 is, for example, a notebook personal computer, the information processing apparatus 1 is not limited to the notebook personal computer, and the information processing apparatus 1 may be a laptop personal computer, a PDA (Personal Digital Assistance), a smartphone, a tablet terminal, a mobile phone, an electronic book, or the like.

As illustrated in FIG. 35, the information processing apparatus 1 includes the display 10, the display housing 11, the keyboard 12, the keyboard housing 13, the display lamp 15, the power supply button 16, the touch pad 20, the distance sensor 21, and the vein sensor 22. The display 10, the display housing 11, the keyboard 12, the keyboard housing 13, the display lamp 15, and the power supply button 16 are the same as those of the first embodiment. The touch pad 20 is the same as that of the second embodiment. The distance sensor 21 and the vein sensor 22 are the same as those of the fourth embodiment. Compared to the fourth embodiment, the modified example of the fourth embodiment is different in that the touch pad 20 is further included. The other parts are the same as those of the fourth embodiment, and the description will be omitted.

In the fourth embodiment, the distance sensor 21 and the vein sensor 22 are used to perform the tapping operation and the scrolling operation to create the authentication information, and the key authentication is performed. In the modified example of the fourth embodiment, the touch pad 20 is used to perform the tapping operation and the scrolling operation to create the authentication information, and the key authentication is performed. The tapping operation and the scrolling operation using the touch pad 20, the creation of the authentication information, and the key authentication are the same as those of the second embodiment, and the detailed description will be omitted.

As illustrated in FIG. 35, the mounting position of the touch pad 20 and the mounting position of the vein sensor 22 are close. Therefore, the display lamp 15 can perform both of the display related to the touch pad 20 and the display related to the vein sensor 22. However, separate display apparatuses may perform the display related to the touch pad 20 and the display related to the vein sensor 22. For example, if the mounting position of the touch pad 20 and the mounting position of the vein sensor 22 are far, the display lamp 15 may perform the display related to the vein sensor 22, and a display lamp 15A may perform the display related to the touch pad 20. In this case, the display lamp 15A may be mounted near the mounting position of the touch pad 20.

In the modified example of the fourth embodiment, the tapping operation and the scrolling operation are performed by using the touch pad 20. Therefore, detailed shape data of the finger, the stylus, or the like and the fingerprint information may not be included to detect the tapping operation and the scrolling operation. The amount of data for executing the detection process of the tapping operation and the scrolling operation can be reduced by using the touch pad 20.

The touch pad 20 may include a display function. For example, the touch pad 20 and the display apparatus may be integrated. Furthermore, for example, a touch panel having a contact detection function and a display function may be used in place of the touch pad 20. This can display, on the touch pad 20, the contact position in the tapping operation and the trajectory of the movement in the scrolling operation. The display of the contact position in the tapping operation and the trajectory of the movement in the scrolling operation on the touch pad 20 can provide the user with a feeling of security for the scrolling operation, and the user interface can be further improved.

Furthermore, for example, diagrams indicating the start point area and the end point areas may be displayed on the touch pad 20. The user can recognize the diagrams indicating the start point area and the end point areas displayed on the touch pad 20 as the start point area and the end point areas of the scrolling operation. This can provide the user with a feeling of security for the scrolling operation, and the user interface can be further improved.

In the modified example of the fourth embodiment, the tapping operation and the scrolling operation can be performed by the finger, the stylus, or the like. Therefore, the convenience can be further improved for the user who wants to use the stylus rather than the finger.

Fifth Embodiment

Figure 36:
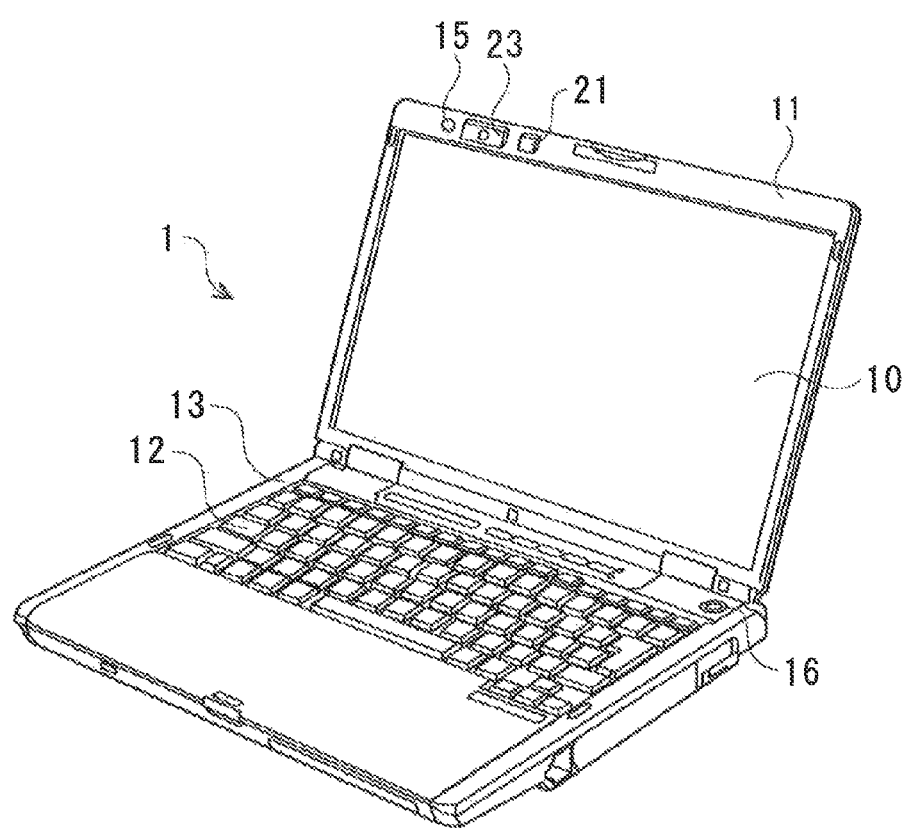
FIG. 36 is an external view of the information processing apparatus 1 according to a fifth embodiment.

Hereinafter, the information processing apparatus 1 according to the fifth embodiment will be described with reference to FIGS. 36 to 40. Note that the same constituent elements as those of the first embodiment are designated with the same reference signs as those of the fifth embodiment, and the description will be omitted. FIG. 36 is an external view of the information processing apparatus 1 according to the fifth embodiment. Although the information processing apparatus 1 is, for example, a notebook personal computer, the information processing apparatus 1 is not limited to the notebook personal computer, and the information processing apparatus 1 may be a laptop personal computer, a PDA (Personal Digital Assistance), a smartphone, a tablet terminal, a mobile phone, an electronic book, or the like.

As illustrated in FIG. 36, the information processing apparatus 1 includes the display 10, the display housing 11, the keyboard 12, the keyboard housing 13, the display lamp 15, the power supply button 16, the distance sensor 21, and a camera 23. The distance sensor 21 and the display lamp 15 are arranged near the mounting position of the camera 23. The display 10, the display housing 11, the keyboard 12, the keyboard housing 13, the display lamp 15, and the power supply button 16 are the same as those of the first embodiment.

Compared to the first embodiment, the fifth embodiment is different in that the distance sensor 21 and the camera 23 are included in place of the fingerprint sensor 14. The other parts are the same as those of the first embodiment, and the description will be skipped. The distance sensor 21 is the same as that of the fourth embodiment. However, the measurement range of the distance sensor 21 is a range of several cm in the fourth embodiment, whereas the measurement range of the distance sensor 21 is a range of about 40 cm in the fifth embodiment. When the living body approaches within a predetermined range from the distance sensor 21, the distance sensor 21 detects the living body.

In the first embodiment, the fingerprint sensor 14 is used to detect the living body, and the fingerprint sensor 14 is used to perform the biometric authentication. Furthermore, in the first embodiment, the fingerprint sensor 14 is used to perform the tapping operation and the scrolling operation to create the authentication information, and the key authentication is performed. In the fifth embodiment, the distance sensor 21 is used to detect the living body, and the camera 23 is used to perform the biometric authentication. Furthermore, in the fifth embodiment, the distance sensor 21 and the camera 23 are used to perform the tapping operation and the scrolling operation to create the authentication information, and the key authentication is performed. The detection method of the living body using the distance sensor 21 and the detection method of the tapping operation using the distance sensor 21 are the same as those of the fourth embodiment.

A feature point of the biometric information is extracted from an image of a face taken by the camera 23, and the extracted feature point of the biometric information and a registered feature point of the biometric information are verified. If the extracted feature point of the biometric information and the registered feature point of the biometric information satisfy a predetermined standard, the biometric authentication is OK. More specifically, the user imaged by the camera 23 is authenticated as the owner of the information processing apparatus 1 or as a person permitted by the owner to use the information processing apparatus 1. If the biometric authentication is OK, the display lamp 15 lights the green color as a display indicating that the biometric authentication is OK.

In a state that the hand faces the camera 23, the scrolling operation is performed by moving the hand parallel in a predetermined direction. The movement direction of the hand can be determined by analyzing the image of the hand taken by the camera 23.

Figure 37:
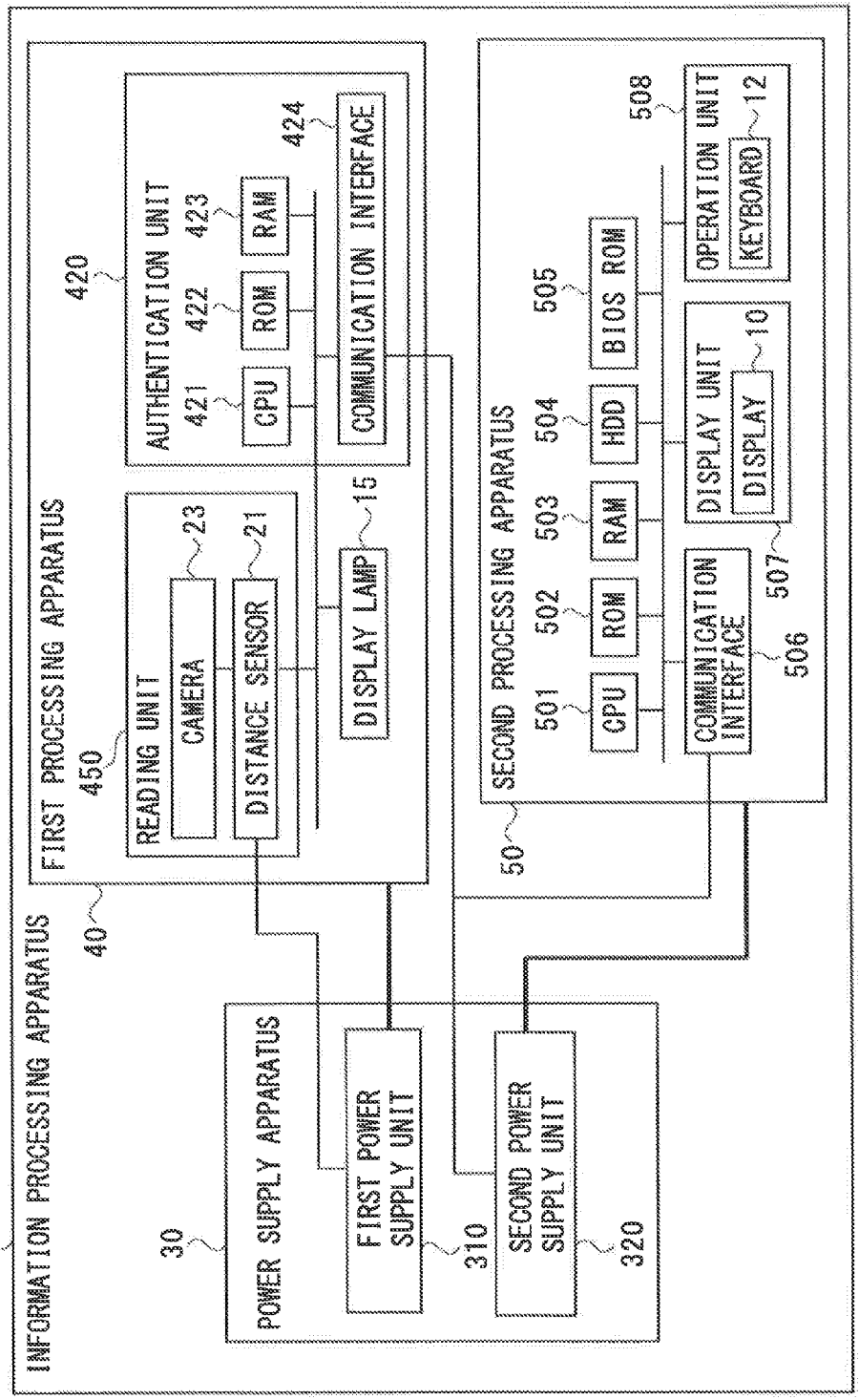
FIG. 37 is a diagram illustrating a configuration example of the information processing apparatus 1 according to the fifth embodiment.

FIG. 37 is a diagram illustrating a configuration example of the information processing apparatus 1 according to the fifth embodiment. As illustrated in FIG. 37, the information processing apparatus 1 includes the power supply apparatus 30, the first processing apparatus 40, and the second processing apparatus 50.

Compared to the information processing apparatus 1 according to the first embodiment, the information processing apparatus 1 according to the fifth embodiment is different in that a reading unit 450 is included in place of the reading unit 410. The other parts are the same as those of the first embodiment, and the description will be omitted. The reading unit 450 includes the distance sensor 21 and the camera 23. The functional configuration of the information processing apparatus 1 according to the fifth embodiment is the same as the functional configuration according to the first embodiment, and the description will be omitted.

<Authentication Process>

In an authentication process of the fifth embodiment, a process substantially the same as the authentication process in the first embodiment described with reference to FIG. 6 is executed. Hereinafter, processes different from the authentication processing flow (part 1) according to the first embodiment illustrated in FIG. 6 will be described.

In S101 of FIG. 6, as the user approaches the distance sensor 21, the distance sensor 21 detects the living body, and power is supplied to the authentication unit 420 and the display lamp 15. The first power supply unit 310 supplies power to the reading unit 450, and when the distance sensor 21 detects the living body, a control signal is transmitted from the distance sensor 21 to the first power supply unit 310. When the control signal is received from the distance sensor 21, the first power supply unit 310 supplies power to the authentication unit 420 and the display lamp 15. Furthermore, the first power supply unit 310 may put the authentication unit 420 into a standby state or a resting state and switch the authentication unit 420 to an activation state when the distance sensor 21 detects the living body.

In S102 of FIG. 6, the authentication unit 420 performs the biometric authentication. An example of the biometric authentication by the authentication unit 420 will be illustrated below.

The authentication unit 420 controls the camera 23 to image the face. Specifically, the CPU 421 of the authentication unit 420 controls the camera 23 based on the biometric reading program 60 stored in the ROM 422. As the face faces the camera 23, the camera 23 images the face. The authentication unit 420 stores the image of the face taken by the camera 23 in the RAM 423. Specifically, the CPU 421 of the authentication unit 420 stores the image of the face taken by the camera 23 in the RAM 423 based on the biometric feature extraction program 61 stored in the ROM 422.

The authentication unit 420 extracts a feature point of the biometric information from the image of the face stored in the RAM 423. Specifically, the CPU 421 of the authentication unit 420 extracts the feature point of the biometric information from the image of the face stored in the RAM 423 based on the biometric feature extraction program 61 stored in the ROM 422. The feature point of the biometric information is, for example, an eye, nose, contour of face, or the like.

The authentication unit 420 verifies the extracted feature point of the biometric information and the registered feature point of the biometric information. Specifically, the CPU 421 of the authentication unit 420 verifies the extracted feature point of the biometric information and the registered feature point of the biometric information based on the biometric verification program 62 stored in the ROM 422. The registered feature point of the biometric information is registered in advance in the biometric information feature database 68 stored in the ROM 422.

In the authentication process of the fifth embodiment, the same processes as those of the first embodiment are executed for S103 to S107 of FIG. 6. In S108 of FIG. 6, the authentication unit 420 switches the distance sensor 21 and the camera 23 to a mode that can detect the tapping operation and the scrolling operation. Furthermore, in S108 of FIG. 6, the display lamp 15 lights the blue color as a display indicating that the distance sensor 21 and the camera 23 are switched to the mode that can detect the tapping operation and the scrolling operation. In the authentication process according to the fifth embodiment, the same processes as those of the first embodiment are executed for S109 to S114 of FIG. 6.

<Creation Process of Authentication Information (Key Information)>

In a creation process of the authentication information (key information) in the fifth embodiment, substantially the same process as the creation process of the authentication information (key information) in the fourth embodiment described with reference to FIG. 30 is executed by using the camera 23 in place of the vein sensor 22. Therefore, detailed description of the creation process of the authentication information (key information) in the fifth embodiment will be omitted.

Figure 38:
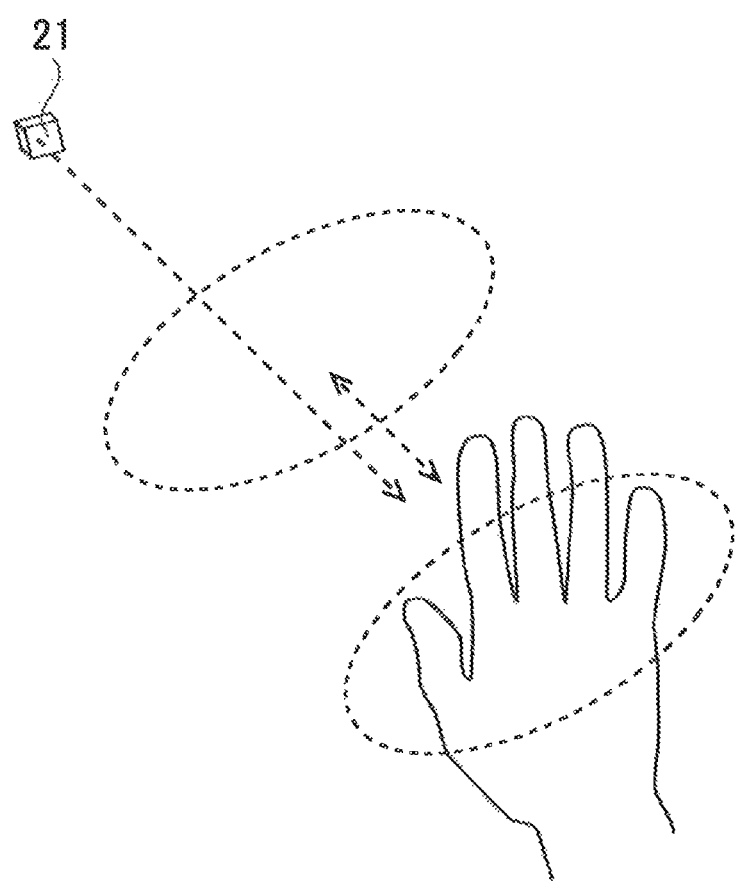
FIG. 38 is an explanatory view of tapping operation.

Tapping operation and scrolling operation of the fifth embodiment will be described. FIG. 38 is an explanatory view of the tapping operation. The user performs the tapping operation by moving the hand back and forth in a short time between an area A2 at a predetermined distance away from the distance sensor 21 (hereinafter, described as predetermined area A2) and an area B2 at a predetermined distance away from the distance sensor 21 (hereinafter, described as predetermined area B2). More specifically, in a state that the hand faces the distance sensor 21, the user performs the tapping operation by moving the hand close to the distance sensor 21 and then moving the hand away from the distance sensor 21. The predetermined area B2 is at a position closer to the distance sensor 21 compared to the predetermined area A2. The user performs single tapping by moving the hand back and forth once in a short time between the predetermined area A2 and the predetermined area B2. The user performs double tapping by moving the hand back and forth twice in a short time between the predetermined area A2 and the predetermined area B2. The user performs triple tapping by moving the hand back and forth three times in a short time between the predetermined area A2 and the predetermined area B2. Although an example of moving the hand in a state that the fingers are stretched has been illustrated in FIG. 38, the example is not limited to this, and the hand may be moved in a state that the fingers are bent. The predetermined areas A2 and B2 correspond to the areas A and B of FIG. 28, respectively. In the fifth embodiment, the distance from the distance sensor 21 is different between the predetermined area A2 and the predetermined area B2.

Figure 39:
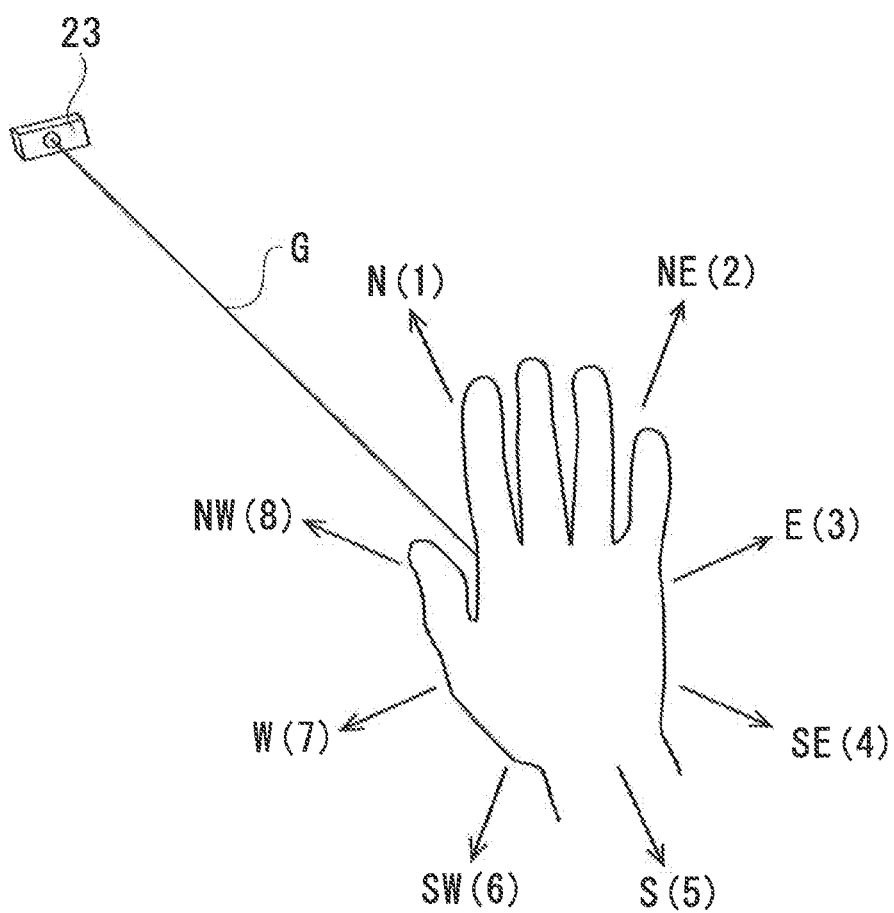
FIG. 39 is an explanatory view of scrolling operation.

FIG. 39 is an explanatory view of the scrolling operation. The user performs the scrolling operation by moving the hand in a predetermined direction in a state that the hand faces the camera 23. The predetermined direction is a direction parallel to a surface orthogonal to a straight line G connecting the hand and the camera 23. As illustrated in FIG. 39, when eight directions (N: north, NE: north east, E: east, SE: south east, S: south, SW: south west, W: west, and NW: north west) are set as the movement directions of the hand, the hand is moved in one of the eight directions in a state that the hand faces the camera 23. For example, the hand is moved in the direction N illustrated in FIG. 39 in a state that the hand faces the camera 23. Although an example of moving the hand in a state that the fingers are stretched has been illustrated in FIG. 39, the example is not limited to this, and the hand may be moved in a state that the fingers are bent.

<Detection Process of Tapping Operation>

In a detection process of the tapping operation in the fifth embodiment, a process substantially the same as the detection process of the tapping operation in the fourth embodiment described with reference to FIGS. 33 and 34 is executed. Therefore, detailed description of the tapping operation in the fifth embodiment will be omitted.

<Registration of Feature Point of Biometric Information>

In a registration process of the feature point of the biometric information in the fifth embodiment, substantially the same process as the registration process of the feature point of the biometric information in the first embodiment is executed. The fifth embodiment is different from the first embodiment in that the registration process of the feature point of the biometric information is executed by using the camera 23 in place of the fingerprint sensor 14. In the registration process of the feature point of the biometric information in the fifth embodiment, the feature point of the biometric information is extracted from the image of the face taken by the camera 23, and the feature point of the biometric information is registered in the biometric information feature database 68 stored in the ROM 422.

According to the fifth embodiment, if the biometric authentication is NG, the distance sensor 21 and the camera 23 are used to perform the tapping operation and the scrolling operation to create the authentication information, and the key authentication is performed. If the key authentication is OK, the same process as when the biometric authentication is OK is executed. More specifically, the emulation of the pressing operation of the power supply button 16 is automatically performed, the power is supplied to the second processing apparatus 50, and the second processing apparatus 50 enters the activation state. Therefore, the power is supplied to the entire information processing apparatus 1, and the entire information processing apparatus 1 enters the activation state. According to the fifth embodiment, even if the biometric authentication is NG, whether the user is the owner or the like of the information processing apparatus 1 can be determined by performing the key authentication different from the biometric authentication. As a result, if the key authentication is OK, the power can be supplied to the entire information processing apparatus 1 even if the biometric authentication is NG.

If the power is not supplied to the second processing apparatus 50, the power is not supplied to the display 10, the keyboard 12, and the like included in the information processing apparatus 1. Therefore, information is not displayed on the display 10, and the user is unable to perform the operation using the keyboard 12. Since the power is supplied to the distance sensor 21 and the camera 23 even under the condition that the power is not supplied to the display 10, the keyboard 12, and the like, whether the user is the owner or the like of the information processing apparatus 1 can be determined by performing the key authentication using the distance sensor 21 and the camera 23.

Modified Example

Figure 40:
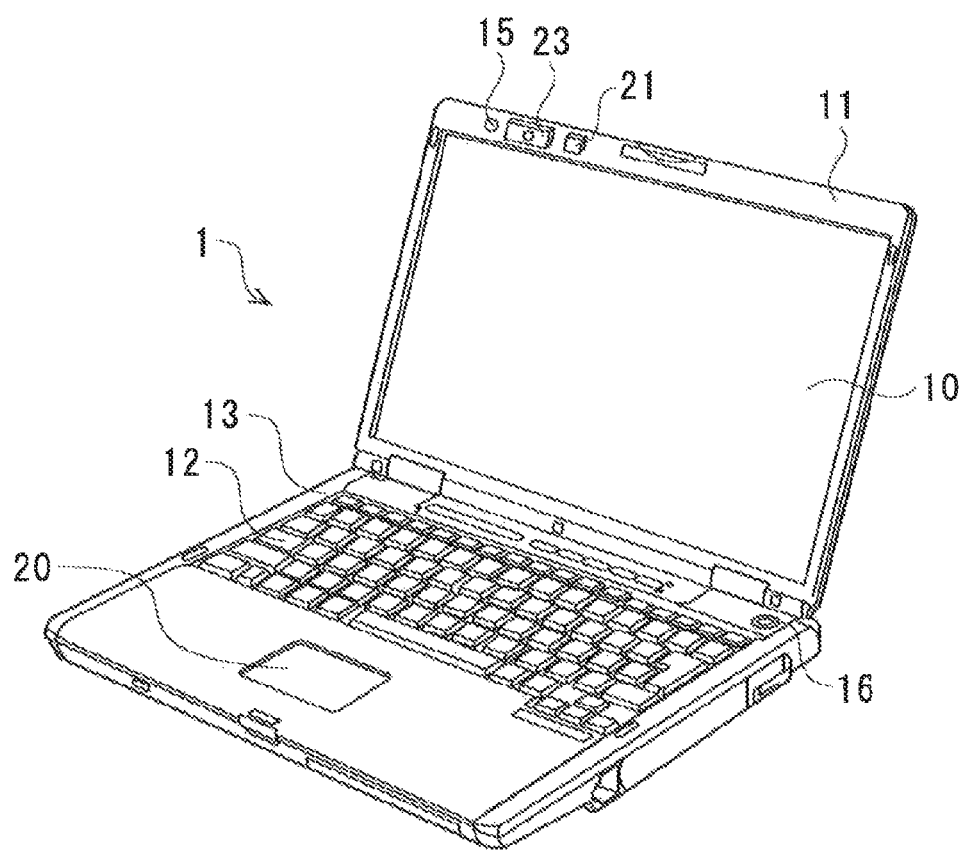
FIG. 40 is an external view of the information processing apparatus 1 according to a modified example of the fifth embodiment.

Hereinafter, the information processing apparatus 1 according to a modified example of the fifth embodiment will be described with reference to FIG. 40. Note that the same constituent elements as those of the first to fifth embodiments are designated with the same reference signs as those of the first to fifth embodiments, and the description will be omitted. FIG. 40 is an external view of the information processing apparatus 1 according to the modified example of the fifth embodiment. Although the information processing apparatus 1 is, for example, a notebook personal computer, the information processing apparatus 1 is not limited to the notebook personal computer, and the information processing apparatus 1 may be a laptop personal computer, a PDA (Personal Digital Assistance), a smartphone, a tablet terminal, a mobile phone, an electronic book, or the like.

As illustrated in FIG. 40, the information processing apparatus 1 includes the display 10, the display housing 11, the keyboard 12, the keyboard housing 13, the display lamp 15, the power supply button 16, the touch pad 20, the distance sensor 21, and the camera 23. The display 10, the display housing 11, the keyboard 12, the keyboard housing 13, the display lamp 15, and the power supply button 16 are the same as those of the first embodiment. The touch pad 20 is the same as that of the second embodiment. The distance sensor 21 and the camera 23 are the same as those of the fifth embodiment. Compared to the fifth embodiment, the modified example of the fifth embodiment is different in that the touch pad 20 is further included. The other parts are the same as those of the fifth embodiment, and the description will be omitted.

In the fifth embodiment, the distance sensor 21 and the camera 23 are used to perform the tapping operation and the scrolling operation to create the authentication information, and the key authentication is performed. In the modified example of the fifth embodiment, the touch pad 20 is used to perform the tapping operation and the scrolling operation to create the authentication information, and the key authentication is performed. The tapping operation and the scrolling operation using the touch pad 20, the creation of the authentication information, and the key authentication are the same as those of the second embodiment, and the detailed description will be omitted.

In the modified example of the fifth embodiment, the touch pad 20 is used to perform the tapping operation and the scrolling operation. Therefore, detailed shape data of the finger, the stylus, or the like and fingerprint information may not be included to detect the tapping operation and the scrolling operation. The amount of data for executing the detection process of the tapping operation and the scrolling operation can be reduced by using the touch pad 20.

The touch pad 20 may have a display function. For example, the touch pad 20 and the display apparatus may be integrated. Furthermore, for example, a touch panel having a contact detection function and a display function may be used in place of the touch pad 20. This can display, on the touch pad 20, the contact position in the tapping operation and the trajectory of the movement in the scrolling operation. The display of the contact position in the tapping operation and the trajectory of the movement in the scrolling operation on the touch pad 20 can provide the user with a feeling of security for the scrolling operation, and the user interface can be further improved.

Furthermore, for example, diagrams indicating the start point area and the end point areas may be displayed on the touch pad 20. The user can recognize the diagrams indicating the start point area and the end point areas displayed on the touch pad 20 as the start point area and the end point areas of the scrolling operation. This can provide the user with a feeling of security for the scrolling operation, and the user interface can be further improved.

In the modified example of the fifth embodiment, the tapping operation and the scrolling operation can be performed by the finger, the stylus, or the like. Therefore, the convenience can be further improved for the user who wants to use the stylus rather than the finger.

The examples of creating the authentication information by performing the tapping operation and the scrolling operation has been illustrated in the first to fifth embodiments. The examples are not limited to these, and the authentication information may be created by performing the tapping operation or the scrolling operation. Only the tapping operation may be performed to create the authentication information, or only the scrolling operation may be performed to create the authentication information. The scrolling operation may be continuously performed to perform operation of depicting drawings and characters and create the authentication information. The authentication information may be created by other operation different from the tapping operation and the scrolling operation. The operation unit 508 may be operated to create the authentication information.

The examples of performing the biometric authentication by the feature point extraction method have been illustrated in the first to fifth embodiments. The examples are not limited to these, and the biometric authentication may be performed by a pattern matching method. In the second to fifth embodiments, the same processes as those of the first embodiment are executed in the registration process of the authentication information, the registration process of the user ID and the user password, and the registration process of the BIOS password. According to the information processing apparatus, the information processing apparatus can be activated by performing other authentication different from biometric authentication.

<Computer Readable Recording Medium>

It is possible to record a program which causes a computer, machine, system (hereinafter, described as computer or the like) to implement any of the functions described above on a computer readable recording medium. By causing the computer or the like to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer or the like. Of such recording media, those detachable from the computer or the like include, e.g., a flexible disk, a magneto-optical disk, a CD-ROM, a CD-R/W, a DVD, a Blu-ray disc, a DAT, an 8-mm tape, a flash memory and a memory card. Of such recording media, those fixed to the computer or the like include a hard disk and a ROM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
  a processor configured to execute a process including:
    determining whether a relationship between biometric information acquired from a living body and biometric information stored in a storage unit satisfies a predetermined standard;
    creating first authentication information by detecting predetermined operation when the relationship between the biometric information acquired from the living body and the biometric information stored in the storage unit does not satisfy the predetermined standard;

comparing the first authentication information and second authentication information stored in the storage unit; and activating the information processing apparatus when the first authentication information and the second authentication information match;

a distance sensor configured to measure a distance to the living body; and a vein sensor or a camera configured to image the living body, wherein the predetermined operation includes tapping operation, in which the living body moves from a first area to a second area different from the first area, and then the living body moves from the second area to the first area, and scrolling operation, in which the living body moves in a predetermined direction from the first area, the first area is a first distance away from the distance sensor, the second area is a second distance away from the distance sensor, the second distance is shorter than the first distance, the distance sensor is used to detect the tapping operation, and the vein sensor or the camera is used to detect the scrolling operation.

2. A control method comprising:

determining, by a processor, whether a relationship between biometric information acquired from a living body and biometric information stored in a storage unit satisfies a predetermined standard;

creating, by the processor, first authentication information by detecting predetermined operation when the relationship between the biometric information acquired from the living body and the biometric information stored in the storage unit does not satisfy the predetermined standard;

comparing, by the processor, the first authentication information and second authentication information stored in the storage unit;

activating, by the processor, an information processing apparatus when the first authentication information and the second authentication information match;

measuring, by a distance sensor, a distance to the living body; and imaging, a vein sensor or a camera, the living body, wherein the predetermined operation includes tapping operation, in which the living body moves from a first area to a second area different from the first area, and then the living body moves from the second area to the first area, and scrolling operation, in which the living body moves in a predetermined direction from the first area, the first area is a first distance away from the distance sensor, the second area is a second distance away from the distance sensor, the second distance is shorter than the first distance, the distance sensor is used to detect the tapping operation, and the vein sensor or the camera is used to detect the scrolling operation.

3. A non-transitory computer-readable recording medium having stored therein a program for causing a computer to execute a process comprising:

determining whether a relationship between biometric information acquired from a living body and biometric information stored in a storage unit satisfies a predetermined standard;

creating first authentication information by detecting predetermined operation when the relationship between the biometric information acquired from the living body and the biometric information stored in the storage unit does not satisfy the predetermined standard;

comparing the first authentication information and second authentication information stored in the storage unit; and activating an information processing apparatus when the first authentication information and the second authentication information match, wherein the predetermined operation includes tapping operation, in which the living body moves from a first area to a second area different from the first area, and then the living body moves from the second area to the first area, and scrolling operation, in which the living body moves in a predetermined direction from the first area, the computer is connected to a distance sensor that measures a distance to the living body, the computer is connected to a vein sensor or a camera that images the living body, the first area is a first distance away from the distance sensor, the second area is a second distance away from the distance sensor, the second distance is shorter than the first distance, the distance sensor is used to detect the tapping operation, and the vein sensor or the camera is used to detect the scrolling operation.

* * * * *